United States Patent
Nakamura et al.

(10) Patent No.: US 10,761,532 B2
(45) Date of Patent: Sep. 1, 2020

(54) VEHICLE CONTROL SYSTEM, VEHICLE CONTROL METHOD, AND STORAGE MEDIUM

(71) Applicant: HONDA MOTOR CO., LTD., Minato-ku, Tokyo (JP)

(72) Inventors: Yoshifumi Nakamura, Wako (JP); Toshiyuki Kaji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/009,357

(22) Filed: Jun. 15, 2018

(65) Prior Publication Data

US 2018/0373250 A1   Dec. 27, 2018

(30) Foreign Application Priority Data

Jun. 26, 2017 (JP) .................. 2017-124493

(51) Int. Cl.
| G05D 1/00 | (2006.01) |
| G06K 9/00 | (2006.01) |
| G05D 1/02 | (2020.01) |
| B60W 10/04 | (2006.01) |
| B60W 10/20 | (2006.01) |

(52) U.S. Cl.
CPC ......... *G05D 1/0088* (2013.01); *G05D 1/0061* (2013.01); *G05D 1/0246* (2013.01); *G05D 1/0257* (2013.01); *G05D 1/0274* (2013.01); *G06K 9/0061* (2013.01); *G06K 9/00228* (2013.01); *G06K 9/00838* (2013.01); *G06K 9/00845* (2013.01); *B60W 10/04* (2013.01); *B60W 10/20* (2013.01); *B60W 2420/42* (2013.01); *B60W 2420/52* (2013.01); *B60W 2510/202* (2013.01); *B60W 2540/26* (2013.01); *B60W 2554/00* (2020.02); *B60W 2554/80* (2020.02); *B60W 2556/00* (2020.02); *B60W 2710/18* (2013.01); *B60W 2710/20* (2013.01); *B60W 2720/10* (2013.01); *G05D 2201/0213* (2013.01)

(58) Field of Classification Search
None
See application file for complete search history.

(56) References Cited

U.S. PATENT DOCUMENTS

| 2018/0105184 A1* | 4/2018 | Urano | ................ B60K 31/0008 |
| 2018/0257682 A1* | 9/2018 | Brooks | ................... B61L 3/006 |
| 2018/0281788 A1* | 10/2018 | Uchida | .................. B60K 35/00 |

FOREIGN PATENT DOCUMENTS

JP       2010-157073       7/2010

* cited by examiner

*Primary Examiner* — Tamara L Weber
(74) *Attorney, Agent, or Firm* — Amin, Turocy & Watson, LLP

(57) ABSTRACT

A vehicle control system includes a first detection unit configured to detect a direction of a face or a line of sight of an occupant of a subject vehicle, an automatic driving control unit configured to execute an automatic driving control, and a switching control unit configured to switch an automatic driving mode for causing the automatic driving control unit to execute the automatic driving control to one of a plurality of automatic driving modes including a first automatic driving mode and a second automatic driving mode. The switching control unit prevents the automatic driving control executed by the automatic driving control unit on the basis of a detection result by the first detection unit.

10 Claims, 31 Drawing Sheets

FIG. 15
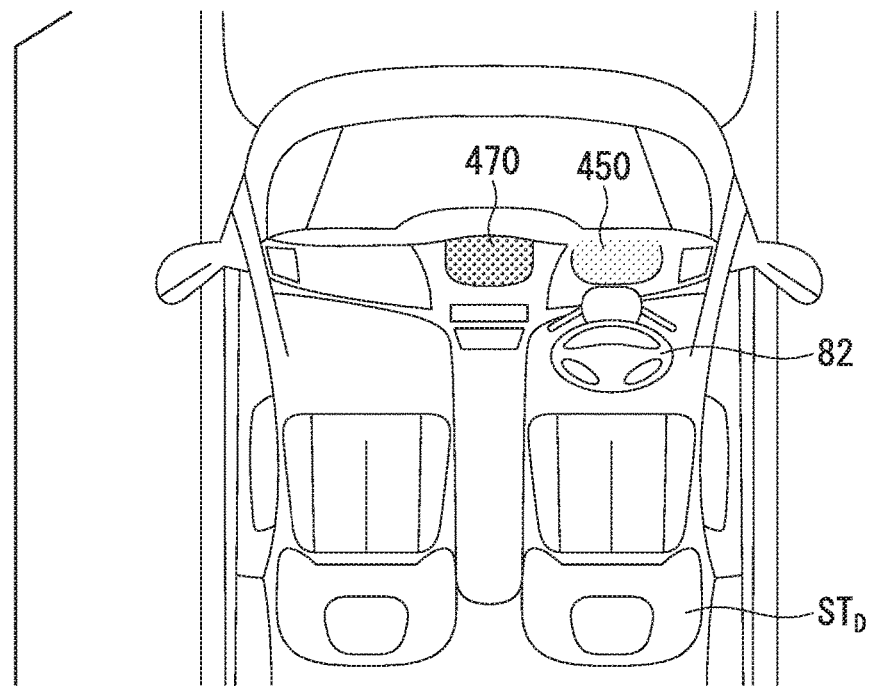
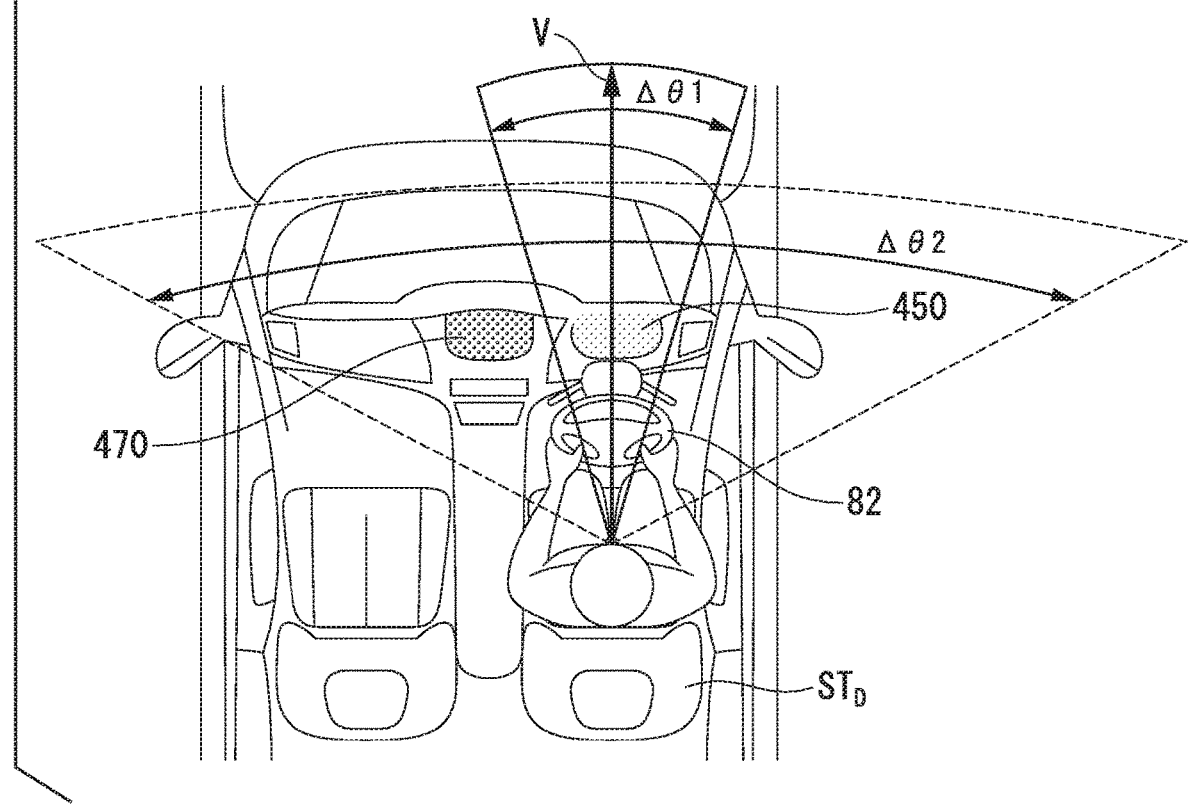

FIG. 18
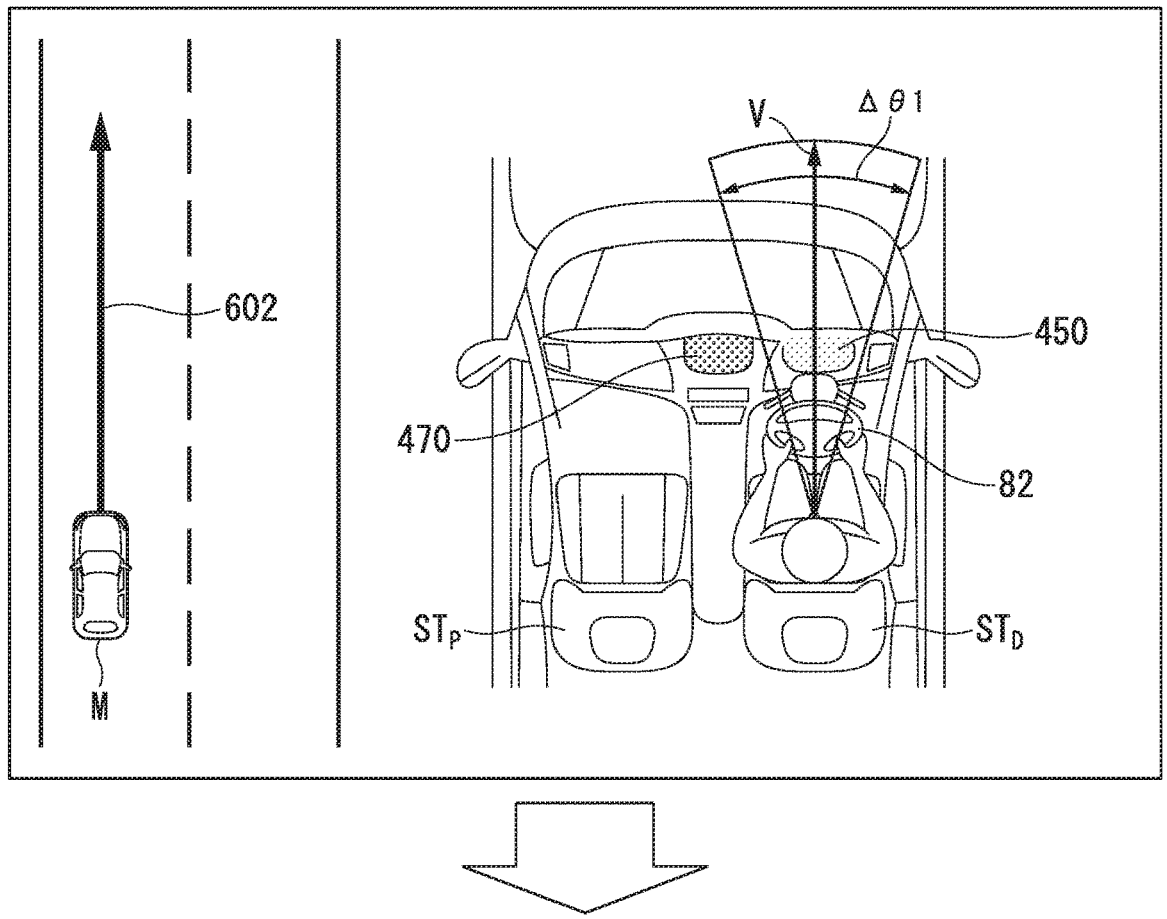
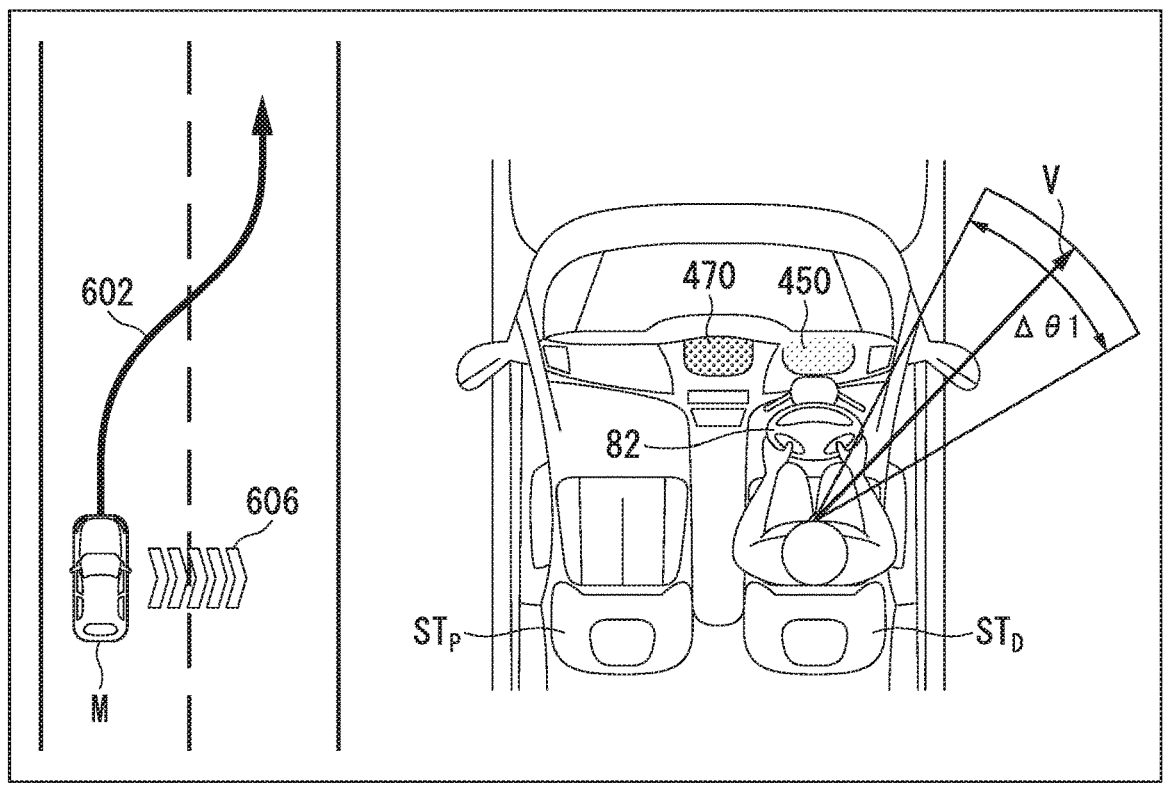

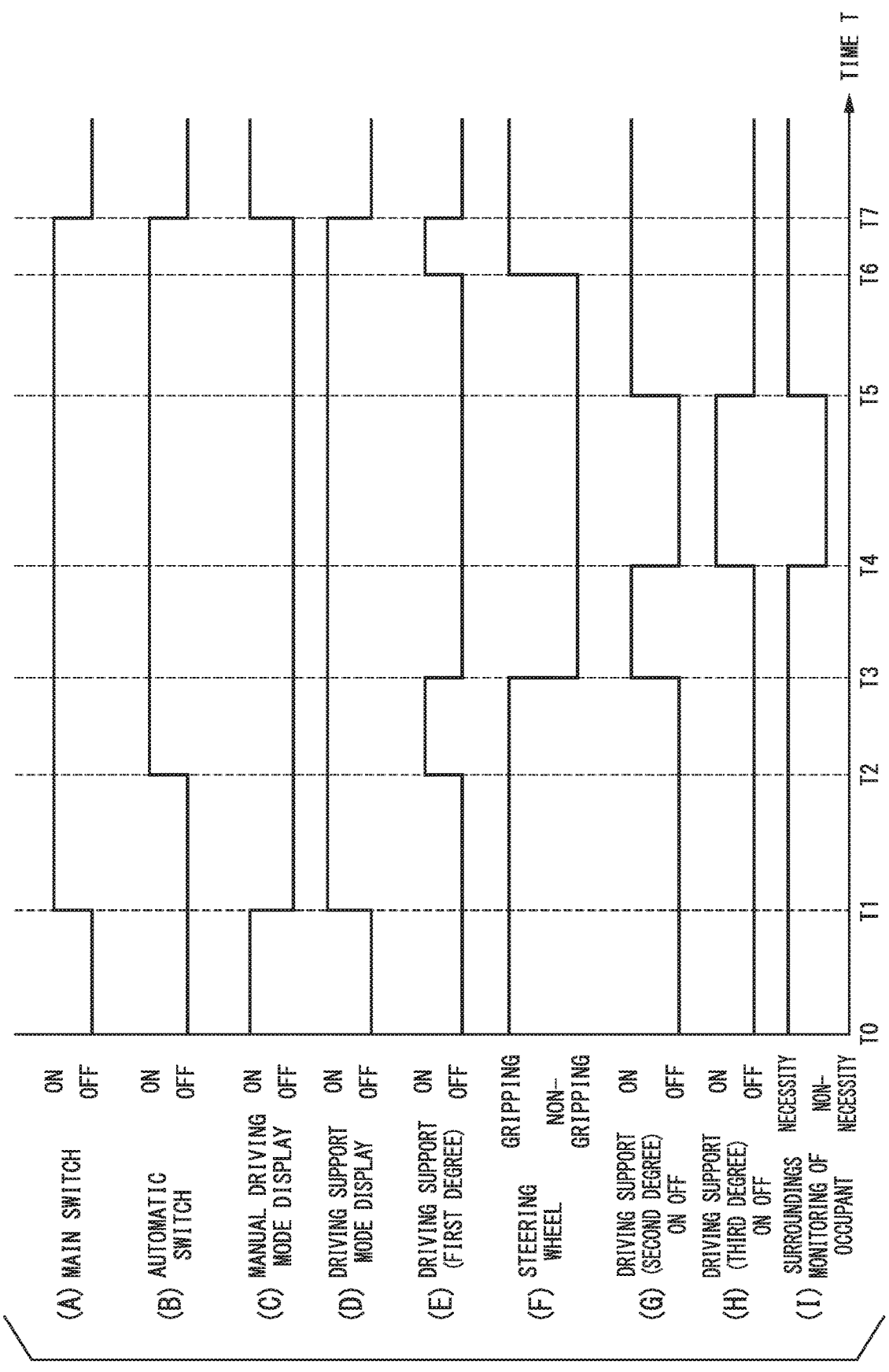

VEHICLE CONTROL SYSTEM, VEHICLE CONTROL METHOD, AND STORAGE MEDIUM

CROSS-REFERENCE TO RELATED APPLICATION

This application is based upon and claims the benefit of priority from Japanese Patent Application No. 2017-124493, filed on Jun. 26, 2017, the entire contents of which are incorporated herein by reference.

BACKGROUND OF THE INVENTION

Field of the Invention

The present invention relates to a vehicle control system, a vehicle control method, and a storage medium.

Description of Related Art

Conventionally, a technique for identifying a concealed face portion by detecting concealment of a face portion is known (for example, refer to Japanese Unexamined Patent Application, First Publication No. 2010-157073). On the other hand, in recent years, research on automatic driving of a vehicle has been conducted.

SUMMARY OF THE INVENTION

However, in techniques in the related art, there are cases where driving operations of an occupant need to be changed when a vehicle is traveling under automatic driving, and a method of designing a control mode of automatic driving according to a state of an occupant at a time of change of driving operations is not sufficiently taken into account.

An aspect of the present invention has been made in consideration of the circumstances described above, and an object of the aspect of the present invention is to provide a vehicle control system, a vehicle control method, and a storage medium in which automatic driving is able to operate in an appropriate control mode according to a state of an occupant.

A vehicle control system, a vehicle control method, and a storage medium according to the present invention adopt the following constitutions.

(1) A vehicle control system according to an aspect of the present invention includes a first detection unit configured to detect a direction of a face or a line of sight of an occupant of a subject vehicle, an automatic driving control unit configured to execute automatic driving control that automatically controls traveling of the subject vehicle, and a switching control unit configured to switch an automatic driving mode for causing the automatic driving control unit to execute automatic driving control to one of a plurality of automatic driving modes including a first automatic driving mode in which predetermined tasks are required of the occupant or a predetermined automation rate is provided and a second automatic driving mode in which a degree of tasks required of the occupant is lower than a degree of predetermined tasks in the first automatic driving mode or an automation rate is lower than a predetermined automation rate of the first automatic driving mode. The switching control unit prevents automatic driving control executed by the automatic driving control unit on the basis of detection results from the first detection unit.

(2) In the vehicle control system of the aspect of (1), the switching control unit performs one of a process of stopping automatic driving control that is already being executed, a process of prohibiting execution of automatic driving control from now on, or a process of reducing the automation rate of automatic driving control, for the prevention of automatic driving control.

(3) In the vehicle control system of the aspect of (1) or (2), a second detection unit configured to detect an arousal degree indicating a degree of arousal of the occupant is further provided. In a case where the automatic driving mode in which the automatic driving control unit is to operate in is the first automatic driving mode, the switching control unit prevents the automatic driving control executed under the first automatic driving mode in a case where the direction of a face or a line of sight of an occupant detected by the first detection unit is not within a predetermined angle range or in a case where the direction of the face or the line of sight of the occupant is not detected. In a case where the automatic driving mode of the execution target of the automatic driving control unit is the second automatic driving mode, the switching control unit prevents the automatic driving control executed under the second automatic driving mode in a case where the arousal degree of the occupant detected by the second detector is equal to or greater than a threshold value or in a case where the arousal degree of the occupant is not detected.

(4) In the vehicle control system of the aspect of (3), the first detection unit and the second detection unit share hardware including a camera and an image processing unit that performs predetermined image processing on an image captured by the camera and extracts a feature of the occupant from the image, and the switching control unit prevents the automatic driving control executed by the automatic driving control unit from a start of a calibration process as a preliminary process of the predetermined image processing of the image process unit to an end of the calibration process.

(5) In the vehicle control system of the aspect of (3) or (4), the first detection unit and the second detection unit share hardware including a camera and an image process unit that performs a predetermined image process on an image captured by the camera and extracts a feature of the occupant from the image, the image process unit detects an object covering a specific portion of the face of the occupant in the image on the basis of the extracted feature, and the switching control unit prevents the automatic driving control executed by the automatic driving control unit in a case where the object covering the specific portion of the face of the occupant is detected by the image processing unit.

(6) In the vehicle control system of one aspect of (3) to (5), the first detection unit and the second detection unit share hardware including a camera and an image process unit that performs a predetermined image process on an image captured by the camera and extracts a feature of the occupant from the image, and the image process unit detects the direction of the face or the line of sight of the occupant on the basis of the feature extracted from the image and detects a degree of opening of the eyelids of the occupant as the arousal degree.

(7) A vehicle control method according to another aspect of the present invention causes an in-vehicle computer to detect a direction of a face or a line of sight of an occupant of a subject vehicle, execute automatic driving control that automatically controls travelling of the subject vehicle, switch an automatic driving mode for executing automatic driving control to one of a plurality of automatic driving modes including a first automatic driving mode in which predetermined tasks are required of the occupant or a predetermined automation rate is provided and a second automatic driving mode in which a degree of tasks required of the occupant is lower than a degree of predetermined tasks in the first automatic driving mode or an automation rate is lower than a predetermined automation rate of the first automatic driving mode, and prevent the automatic driving control on the basis of a detection result of the direction of the face or the line of sight of the occupant.

(8) A storage medium according to another aspect of the present invention stores a vehicle control program that causes an in-vehicle computer to detect a direction of a face or a line of sight of an occupant of a subject vehicle, execute automatic driving control that automatically controls travelling of the subject vehicle, switch an automatic driving mode for executing automatic driving control to one of a plurality of automatic driving modes including a first automatic driving mode in which predetermined tasks are required of the occupant or a predetermined automation rate is provided and a second automatic driving mode in which a degree of tasks required of the occupant is lower than a degree of predetermined tasks in the first automatic driving mode or an automation rate is lower than a predetermined automation rate of the first automatic driving mode, and prevent the automatic driving control on the basis of a detection result of the direction of the face or the line of sight of the occupant.

According to the aspects of (1) to (8), it is possible to execute automatic driving in an appropriate control mode according to a state of an occupant.

BRIEF DESCRIPTION OF THE DRAWINGS

FIG. 15 is a diagram schematically illustrating a structure of a vehicle interior when the subject vehicle is viewed from above.

FIG. 18 is a diagram schematically illustrating a manner in which a direction as a reference of a first angle range is changed when the lane change is started.

FIG. 32 is a diagram illustrating a switching timing of various pieces of equipment or a control related to the driving support.

DETAILED DESCRIPTION OF THE INVENTION

Hereinafter, embodiments of a vehicle control system, a vehicle control method, and a storage medium of the present invention will be described with reference to the drawings. In the embodiment, a vehicle control system is applied to an automatic driving vehicle that may perform an automatic driving (autonomous driving). In principle, the automatic driving refers to driving in which the vehicle travels in a state in which an operation by an occupant is not required. It is considered that the automatic driving is a kind of a driving support. The automatic driving vehicle may also be traveled by a manual driving. The manual driving refers to causing the vehicle to travel according to an operation for a driving operation element of the occupant. In the following description, the "occupant" will be described as an occupant sitting on a seat of a driver, that is, a seat where a driving operation element is provided, as an example, however, is not limited thereto, may be an occupant sitting on another seat such as a passenger seat.

In the present embodiment, for example, a degree of a driving support includes a first degree, a second degree of which a control degree (an automation rate) is higher than that of the first degree, and a third degree of which a control degree is higher than that of the second degree. In the driving support of the first degree, a driving support control is executed by an operation of a driving support device such as an adaptive cruise control system (ACC) or a lane keeping assistance system (LKAS). For example, in the driving supports of the second degree and the third degree, in principle, an automatic driving in which an operation of a driving operation element by an occupant is not required and both of acceleration/deceleration and a steering of the vehicle are automatically controlled is executed. According to the execution of the driving support, the occupant is in charge of a task (duty) according to the degree of the driving support. For example, in the driving supports of the first degree and the second degree, the occupant is in charge of a surroundings monitoring obligation. In contrast, in the driving support of the third degree, the occupant is not in charge of the surroundings monitoring obligation (or a degree of the surroundings monitoring obligation is low). In a case where the occupant does not fulfill the surroundings monitoring obligation, for example, the degree of the driving support is reduced. A state in which the driving support of the second degree is executed is an example of a "first automatic driving mode", and a state in which the driving support of the third degree is performed is an example of a "second automatic driving mode".

[Overall Constitution]

Figure 1:
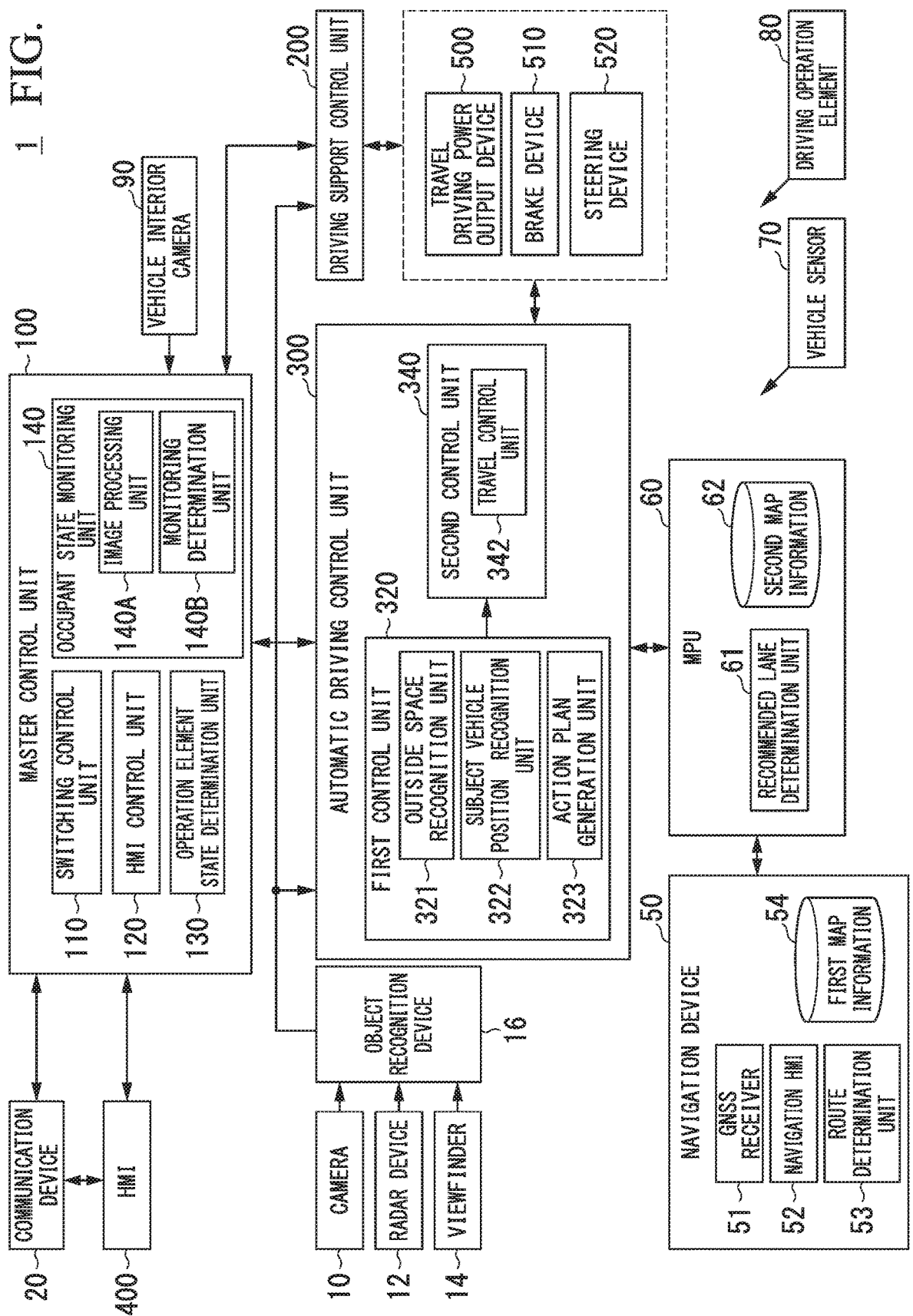
FIG. 1 is a constitution diagram of a vehicle system including a vehicle control system according to an embodiment.

FIG. 1 is a constitution diagram of a vehicle system 1 including a vehicle control system according to an embodiment. For example, a vehicle on which the vehicle system 1 is mounted (hereinafter referred to as subject vehicle M) is a vehicle such as a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power by an electric power generator connected to the internal combustion engine or discharge electric power of a secondary battery or a fuel cell.

For example, the vehicle system 1 includes a camera 10, a radar device 12, a viewfinder 14, an object recognition device 16, a communication device 20, a navigation device 50, a map positioning unit (MPU) 60, a vehicle sensor 70, a driving operation element 80, a vehicle interior camera 90, a master control unit (master controller) 100, a driving support control unit (driving support controller) 200, an automatic driving control unit (automatic driving controller) 300, a human machine interface (HMI) 400, a travel driving force output device 500, a brake device 510, and a steering device 520. Such devices and pieces of equipment are connected with each other by a multiple communication line such as a controller area network (CAN) communication line, a serial communication line, a wireless communication network, or the like. The constitution shown in FIG. 1 is merely an example, and a part of the constitution may be omitted, and another constitution may be added.

For example, among a plurality of elements included in the vehicle system 1, a combination of the vehicle interior camera 90, the master control unit 100, and the automatic driving control unit 300 is an example of a "vehicle control system".

For example, the camera 10 is a digital camera using a solid imaging element such as a charge coupled device (CCD) or a complementary metal oxide semiconductor (CMOS). One or a plurality of cameras 10 are attached to an arbitrary position of the subject vehicle M on which the vehicle system 1 is mounted. In a case of imaging a front, the camera 10 is attached to an upper portion of a front windshield, a rear surface of a room mirror, or the like. In a case of imaging a rear side, the camera 10 is attached to an upper portion of a rear windshield, a back door, or the like. In a case of imaging a side, the camera 10 is attached to a door mirror or the like. For example, the camera 10 periodically repeats imaging the surroundings of the subject vehicle M. The camera 10 may be a stereo camera.

The radar device 12 radiates radio waves such as millimeter waves or the like to the surroundings of the subject vehicle M and detects at least the position (distance and direction) of an object by detecting radio waves (reflected waves) reflected by the object. One or a plurality of radar devices 12 are attached to an arbitrary position of the subject vehicle M. The radar device 12 may detect the position and the speed of the object by a frequency modulated continuous wave (FMCW) method.

The viewfinder 14 is a light detection and ranging or laser imaging detection and ranging (LIDAR) that measures scattered light with respect to the irradiation light and detects the distance to a target. One or a plurality of viewfinders 14 are attached to an arbitrary position of the subject vehicle M.

The object recognition device 16 performs a sensor fusion process on a detection result by a part or all of the camera 10, the radar device 12, and the viewfinder 14 to recognize the position, a type, the speed, and the like of the object. The object recognition device 16 outputs a recognition result to the automatic driving control unit 300.

For example, the communication device 20 communicates with another vehicle that is present in the surroundings of the subject vehicle M using a cellular network, a Wi-Fi network, Bluetooth (registered trademark), a dedicated short range communication (DSRC), or the like, or communicates with various server devices through a wireless base station. The communication device 20 may communicate with a terminal device possessed by a person outside the vehicle.

For example, the navigation device 50 includes a global navigation satellite system (GNSS) receiver 51, a navigation HMI 52, and a route determination unit (route determiner) 53, and holds first map information 54 in a storage device such as a hard disk drive (HDD) or a flash memory. The GNSS receiver 51 specifies the position of the subject vehicle M on the basis of a signal received from a GNSS satellite. The position of the subject vehicle M may be specified or supplemented by an inertial navigation system (INS) using an output of the vehicle sensor 70. The navigation HMI 52 includes a display device, a speaker, a touch panel, a key, and the like. A part or the whole of the navigation HMI 52 may be shared with the HMI 400 that will be described later. For example, the route determination unit 53 determines a route from the position of the subject vehicle M specified by the GNSS receiver 51 (or an input arbitrary position) to a destination input by the occupant using the navigation HMI 52 (for example, including information on a route when traveling to the destination) by referring to the first map information 54. For example, the first map information 54 is information in which a road shape is expressed by a link indicating a road and a node connected by the link. The first map information 54 may include a curvature of the road, a point of interest (POI) information, or the like. The route determined by the route determination unit 53 is output to the MPU 60. The navigation device 50 may perform a route guidance using the navigation HMI 52 on the basis of the route determined by the route determination unit 53. The navigation device 50 may be realized by a function of a terminal device such as a smart phone or a tablet terminal possessed by the user. The navigation device 50 may transmit the current position and the destination to a navigation server through the communication device 20 and acquire the route returned from the navigation server.

For example, the MPU 60 functions as a recommended lane determination unit (recommended lane determiner) 61 and holds second map information 62 in the storage device such as an HDD or a flash memory. The recommended lane determination unit 61 divides the route provided from the navigation device 50 into a plurality of blocks (for example, divides the route every 100 [m] with respect to a vehicle progress direction), and determines a recommended lane for each block by referring to second map information 62. The recommended lane determination unit 61 determines that the vehicle to be traveled on a lane is spaced apart from the left by a certain number of lanes. In a case where a branch position, a merge position, or the like is present in the route, the recommended lane determination unit 61 determines the recommended lane so that the subject vehicle M may travel through a reasonable travel route for progressing to a branch destination.

The second map information 62 is map information with precision higher than that of the first map information 54. For example, the second map information 62 includes information on the center of the lane or information on a boundary of the lane. The second map information 62 may include road information, traffic regulation information, address information (an address and a postal code), facility information, telephone number information, and the like. The road information includes information indicating a type of a road such as an expressway, a toll road, a national highway, a prefectural road, or information on the number of lanes on the road, the area of an emergency parking zone, the width of each lane, a gradient of the road, the position of the road (three-dimensional coordinates including the longitude, the latitude, and the height), the curvature of a curve of the lane, the positions of junction and branch points of the lane, a sign provided on the road, and the like. The second map information 62 may be updated at any time by accessing another device using the communication device 20.

The vehicle sensor 70 includes a vehicle speed sensor that detects the speed of the subject vehicle M, an acceleration sensor that detects the acceleration, a yaw rate sensor that detects the angular speed around a vertical axis, a direction sensor that detects the direction of the subject vehicle M, and the like.

For example, the driving operation element 80 may include an accelerator pedal, a brake pedal, a shift lever, a steering wheel, and other operation elements. An operation detection sensor that detects an operation amount or a presence or absence of the operation is attached to the driving operation element 80. A detection result of the operation detection sensor is output to any one of elements or a plurality of elements among the master control unit 100, the driving support control unit 200, the automatic driving control unit 300, the travel driving force output device 500, the brake device 510, and the steering device 520.

For example, the vehicle interior camera 90 images a face of the occupant (in particular, the occupant sitting on the seat of the driver) sitting on the seat installed in the interior of the vehicle. The vehicle interior camera 90 is a digital camera using a solid imaging element such as a CCD or a CMOS. For example, the vehicle interior camera 90 periodically captures the occupant. A captured image of the vehicle interior camera 90 is output to the master control unit 100.

[Various Control Devices]

For example, the vehicle system 1 includes the master control unit 100, the driving support control unit 200, and the automatic driving control unit 300. The master control unit 100 may be integrated to any one of the driving support control unit 200 and the automatic driving control unit 300.

[Master Control Unit]

The master control unit 100 switches the degree of the driving support or controls the HMI 400. For example, the master control unit 100 includes a switching control unit (switching controller) 110, an HMI control unit (HMI controller) 120, an operation element state determination unit (operation element state determiner) 130, and an occupant state monitoring unit (occupant state monitor) 140. A combination of the vehicle interior camera 90 and the occupant state monitoring unit 140 is an example of a "first detection unit" and a "second detection unit".

Each of the switching control unit 110, the HMI control unit 120, the operation element state determination unit 130, and the occupant state monitoring unit 140 is realized by a processor such as a central processing unit (CPU) or a graphic processing unit (GPU) executing a program. A part or all of such functional units may be realized by hardware such as a large scale integration (LSI), an application specific integrated circuit (ASIC), a field-programmable gate array (FPGA), or may be realized by a cooperation of software and hardware. The program may be stored in a storage device such as a hard disk drive (HDD) or a flash memory in advance, or may be stored in a detachable storage medium such as a DVD or a CD-ROM and the storage medium and may be mounted on a drive device to be installed in a storage device.

For example, the switching control unit 110 switches the degree of the driving support from the state of the manual driving to the first degree or more or from the state the first degree or more to the state of the manual driving on the basis of an operation signal input from a predetermined switch (for example, a main switch and an automatic switch that will be described later) included in the HMI 400. For example, the switching control unit 110 may switch the degree of the driving support from the first degree or more to the state of the manual driving on the basis of an operation instructing the acceleration, the deceleration, the steering, or the like of the driving operation element 80 such as the acceleration pedal, the brake pedal, the steering wheel, or the like.

For example, in the driving support of the first degree (driving support control), a set vehicle speed (lower limit speed and upper limit speed) of the subject vehicle M may be set in a predetermined speed range (for example, about 50 to 100 [km/h]). The occupant may appropriately change the set vehicle speed.

For example, in the driving support of the second degree (automatic driving control), the set vehicle speed (lower limit speed and upper limit speed) of the subject vehicle M may be set to a reference speed such as a legal speed. For example, in a case where the subject vehicle M is traveling on an expressway, the upper limit speed may be set to about 80 [km/h] or about 100 [km/h] and the lower limit speed may be set to about 50 [km/h] according to the legal speed on the expressway.

In the driving support of the third degree (automatic driving control), a set vehicle speed similar to that of the driving support of the second degree may be set. For example, the driving support of the third degree may be started in a case where a speed of a preceding traveling vehicle is equal to or less than a predetermined speed under the driving support of the second degree. A preceding traveling vehicle is a vehicle that is present within a predetermined distance (for example, about 50 to 100 [m]) in front of the subject vehicle M and is closest to the subject vehicle M within the predetermined distance, in a travel lane on which the subject vehicle M is traveling (subject lane). For example, a predetermined speed may be 60 [km/h].

The switching control unit 110 may switch the degree of the driving support on the basis of an action plan generated by an action plan generation unit (action plan generator) 323. For example, the switching control unit 110 may end the driving support at an end schedule point of the automatic driving prescribed by the action plan.

In a case where the position of the subject vehicle M specified by the navigation device 50 is present in an area in which the travel lane of the subject vehicle is recognized by a subject vehicle position recognition unit (subject vehicle position recognizer) 322, the switching control unit 110 may switch the degree of the driving support to the third degree. In other words, in a case where the subject vehicle M travels a section including information on the number of lanes and a width of each lane in the map information, the switching control unit 110 may switch the degree of the driving support to the third degree.

The HMI control unit 120 outputs a notification or the like related to the switch of the degree of the driving support to the HMI 400. The HMI control unit 120 may output information on a process result by one or both of the operation element state determination unit 130 and the occupant state monitoring unit 140 to the HMI 400. The HMI control unit 120 may output information input to the HMI 400 to one or both of the driving support control unit 200 and the automatic driving control unit 300. Details of a function of the HMI control unit 120 will be described later. The HMI 400 is examples of an "information output unit" and a "reception unit", and the HMI control unit 120 is an example of an "output control unit".

For example, the operation element state determination unit 130 determines whether or not the steering wheel included in the driving operation element 80 is operated (specifically, in a case where the driver actually intentionally performs an operation, it is assumed that a state is an immediately operable state or gripping state). Hereinafter, a state in which the steering wheel is operated (gripped) by the occupant is referred to as "hands on", and a state in which the steering wheel is not operated is referred to as "hands off". Details of a function of the operation element state determination unit 130 will be described later.

For example, the occupant state monitoring unit 140 includes an image processing unit (image processor) 140A and a monitoring determination unit (monitoring determiner) 140B. The image processing unit 140A may be included in the vehicle interior camera 90 instead of the occupant state monitoring unit 140. The image processing unit 140A analyzes the captured image of the vehicle interior camera 90 and detects a direction of a line of sight or a direction of a face of the occupant of a seat of a driver. For example, the monitoring determination unit 140B determines whether or not the occupant of the seat of the driver is monitoring the surroundings of the subject vehicle M on the basis of the direction of the line of sight or the face detected by the image processing unit 140A. Hereinafter, a state in which the occupant is monitoring the surroundings of the subject vehicle M is referred to as "eyes on", and a state in which the occupant is not monitoring the surroundings of the subject vehicle M is referred to as "eyes off". Details of a function of the occupant state monitoring unit 140 will be described later.

[Driving Support Control Unit]

For example, in a case where the degree of the driving support of the subject vehicle M is the first degree, the driving support control unit 200 executes ACC, LKAS and other driving support controls. For example, when the ACC is executed, the driving support control unit 200 controls the travel driving force output device 500 and the brake device 510 so that the subject vehicle M travels while maintaining a constant inter-vehicle distance between the subject vehicle M and a preceding traveling vehicle, on the basis of the information input from the camera 10, the radar device 12, and the viewfinder 14 through the object recognition device 16. In other words, the driving support control unit 200 performs acceleration and deceleration controls (speed control) based on the inter-vehicle distance with the preceding traveling vehicle. When the LKAS is executed, the driving support control unit 200 controls the steering device 520 so that the subject vehicle M travels while maintains (lane keeping) a travel lane on which the subject vehicle M is currently traveling. That is, the driving support control unit 200 performs a steering control for maintaining a lane. The steering control by the driving support control unit 200 (the driving support control) is set to be smaller than a maximum steering torque given to a shaft of the steering wheel 82 at the time of the steering control by the automatic driving control unit 300 (the automatic driving control). That is, under the driving support control, a freedom degree of the operation of the steering wheel 82 of the occupant is relatively high, and under the automatic driving control, the freedom degree of the operation of the steering wheel 82 of the occupant is lower than that under the driving support control. The driving support of the first degree may also include various controls other than the automatic driving (the driving support of the second degree and the third degree) that does not require the operation of the driving operation element 80 to the occupant (driver).

[Automatic Driving Control Unit]

In a case where the degree of the driving support of the subject vehicle M is the second degree or the third degree, the automatic driving control unit 300 executes the automatic driving control. For example, the automatic driving control unit 300 includes a first control unit (first controller) 320 and a second control unit (second control) 340. Each of the first control unit 320 and the second control unit 340 is realized by a processor such as a CPU or a GPU executing a program. A part or all of such functional units may be realized by hardware such as an LSI, an ASIC, an FPGA, or may be realized by a cooperation of software and hardware. The automatic driving control unit 300 is an example of an "automatic driving control unit".

For example, the first control unit 320 includes an outside space recognition unit (outside space recognizer) 321, the subject vehicle position recognition unit 322, and the action plan generation unit 323.

The outside space recognition unit 321 recognizes a state such as the position, the speed, and the acceleration of a surroundings vehicle, on the basis of the information input from the camera 10, the radar device 12, and the viewfinder 14 through the object recognition device 16. The position of the surroundings vehicle may be indicated by a representative point such as a center of gravity or a corner of the surroundings vehicle or may be indicated by a region expressed by an outline of the surroundings vehicle. The "state" of the surroundings vehicle may include the acceleration or jerk of the surroundings vehicle, or an "action state" (for example, whether or not the surroundings vehicle is changing a lane or trying to change a lane).

The outside space recognition unit 321 may recognize a position of at least one of the above-described surroundings vehicle, an obstacle (for example, a guardrail, a utility pole, a parked vehicle, a person such as a pedestrian, and the like), a road shape, and other objects.

For example, the subject vehicle position recognition unit 322 recognizes the lane (travel lane) on which the subject vehicle M travels and a relative position and an orientation of the subject vehicle M with respect to the travel lane. For example, the subject vehicle position recognition unit 322 recognizes the travel lane by comparing a pattern of a road lane marking (for example, an arrangement of a solid line and a broken line) obtained from the second map information 62 with a pattern of a road lane marking of the surroundings of the subject vehicle M recognized from the image captured by the camera 10. In the recognition, the position of the subject vehicle M acquired from the navigation device 50 and the process result by the INS may be added.

Figure 2:
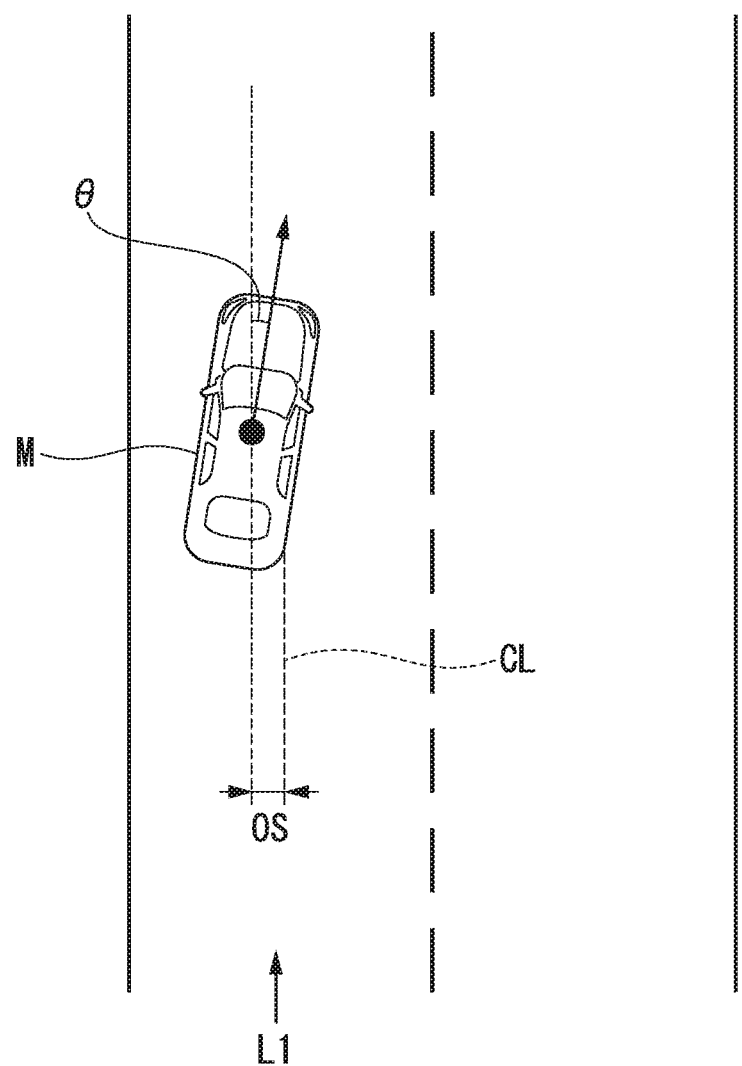
FIG. 2 is a diagram illustrating a manner in which a relative position and an orientation of a subject vehicle with respect to a travel lane are recognized by a subject vehicle position recognition unit.

In addition, for example, the subject vehicle position recognition unit 322 recognizes the position and the orientation of the subject vehicle M with respect to the travel lane. FIG. 2 is a diagram illustrating a manner in which a relative position and an orientation of the subject vehicle M with respect to a travel lane L1 are recognized by the subject vehicle position recognition unit 322. For example, the subject vehicle position recognition unit 322 recognizes a divergence OS from a travel lane center CL of a reference point (for example, a center of gravity) of the subject vehicle M and an angle θ formed with respect to a line to which the travel lane center CL of a progress direction of the subject vehicle M, as the relative position and the orientation of the subject vehicle M with respect to the travel lane L1. Alternatively, the subject vehicle position recognition unit 322 may recognize the position or the like of the reference point of the subject vehicle M with respect to one of side ends of the travel lane L1 as the relative position of the subject vehicle M with respect to the travel lane. The relative position of the subject vehicle M recognized by the subject vehicle position recognition unit 322 is provided to the recommended lane determination unit 61 and the action plan generation unit 323.

The action plan generation unit 323 generates the action plan for the subject vehicle M to execute the automatic driving with respect to the destination or the like. For example, the action plan generation unit 323 determines events to be sequentially executed in the automatic driving control so that the subject vehicle M travels on the recommended lane determined by the recommended lane determination unit 61 and cope with a surroundings situation of the subject vehicle M. The event is information that prescribes a travel manner of the subject vehicle M. For example, in the automatic driving of the embodiment, the event includes a constant speed travel event for traveling on the same travel lane at a constant speed, a low speed following event for following the preceding traveling vehicle in a condition of a low speed (for example, 60 [km/h] or less), a lane change event for changing the travel lane of the subject vehicle M, an overtaking event for overtaking the preceding traveling vehicle, a merge event for merging vehicles at a merge point, a branch event for causing the subject vehicle M to travel in a target direction at a branch point of the road, an emergency stop event for emergently stopping the subject vehicle M, and the like. In some cases, during the execution of such events, an action for avoiding may be planned on the basis of a surroundings situation (presence of the surroundings vehicle or the pedestrian, a lane narrowness due to a road construction, or the like) of the subject vehicle M.

The action plan generation unit 323 generates a target trajectory in which the subject vehicle M travels in the future. The target trajectory is expressed by sequentially arranging points (trajectory points) where the subject vehicle M reaches. The trajectory point is a point where the subject vehicle M reaches at each predetermined travel distance. Alternatively, a target speed (including a target acceleration) for each predetermined sampling time (for example, about 0 commas [sec]) are generated as a part of the target trajectory. The trajectory point may be a position where the subject vehicle M reaches at a sampling time of each predetermined sampling time. In this case, information on the target speed and the target acceleration is expressed by an interval between the trajectory points.

For example, the action plan generation unit 323 determines the target speed of the subject vehicle within a range of a set vehicle speed corresponding to the degree of the driving support. For example, in a case where the degree of the driving support is the first degree, the action plan generation unit 323 determines the target speed within a range of 50 to 100 [km/h]. In a case where the degree of the driving support is the second degree, the action plan generation unit 323 determines the target speed within a range of 50 to 80 [km/h] or 50 to 100 [km/h]. In a case where the degree of the driving support is the third degree and the preceding traveling vehicle is not present, the action plan generation unit 323 determines the target speed within a range of 50 to 80 [km/h] or 50 to 100 [km/h] similarly to the case where the degree of the driving support is the second degree, and in a case where the preceding traveling vehicle is present, the action plan generation unit 323 determines the target speed to at least the vehicle speed or less of the preceding traveling vehicle.

Figure 3:
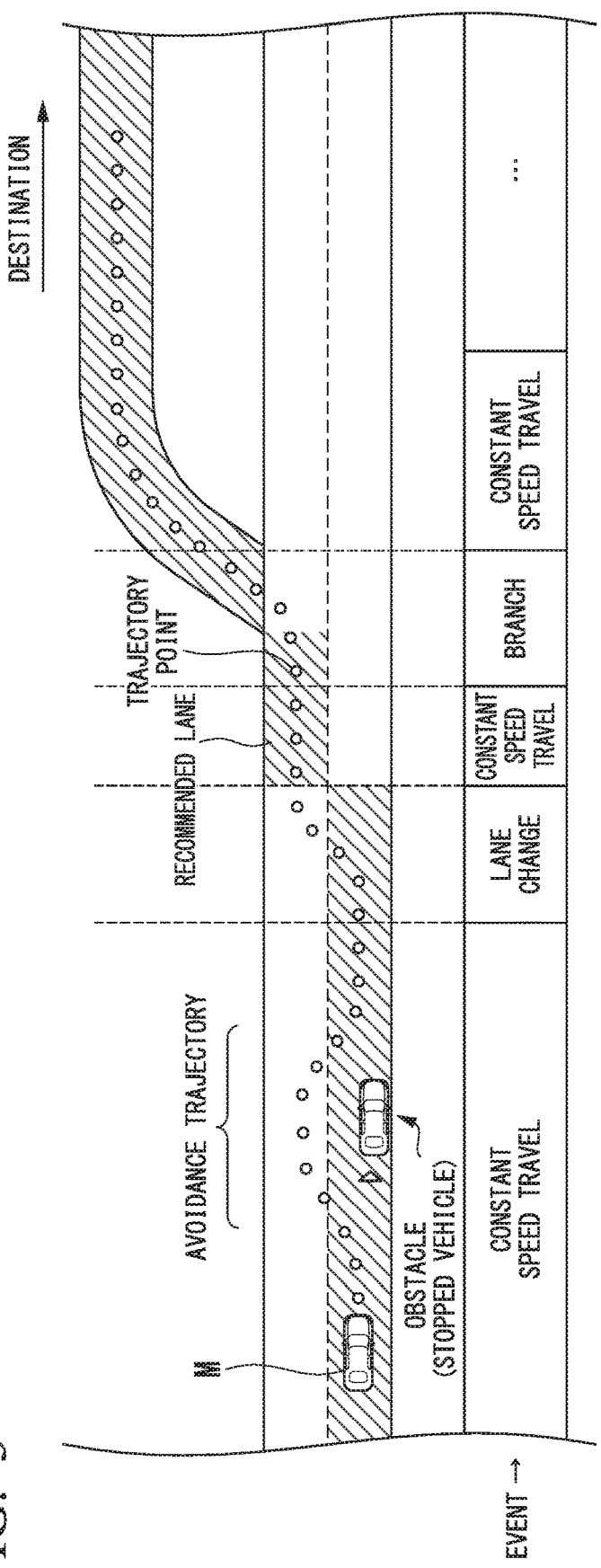
FIG. 3 is a diagram illustrating a manner in which a target trajectory is generated on the basis of a recommended lane.

FIG. 3 is a diagram illustrating a manner in which the target trajectory is generated on the basis of the recommended lane. As shown in the drawing, the recommended lane is set so that the travel to the destination along the route is convenient. When reaching a position that is a position before a switch point of the recommended lane by a predetermined distance, the action plan generation unit 323 starts the lane change event, the branch event, the merge event, and the like. The predetermined distance may be determined according to a kind of the event. During the execution of each event, in a case where it is necessary to avoid an obstacle, a target trajectory for avoiding the obstacle is generated as shown in the drawings.

Figure 4:
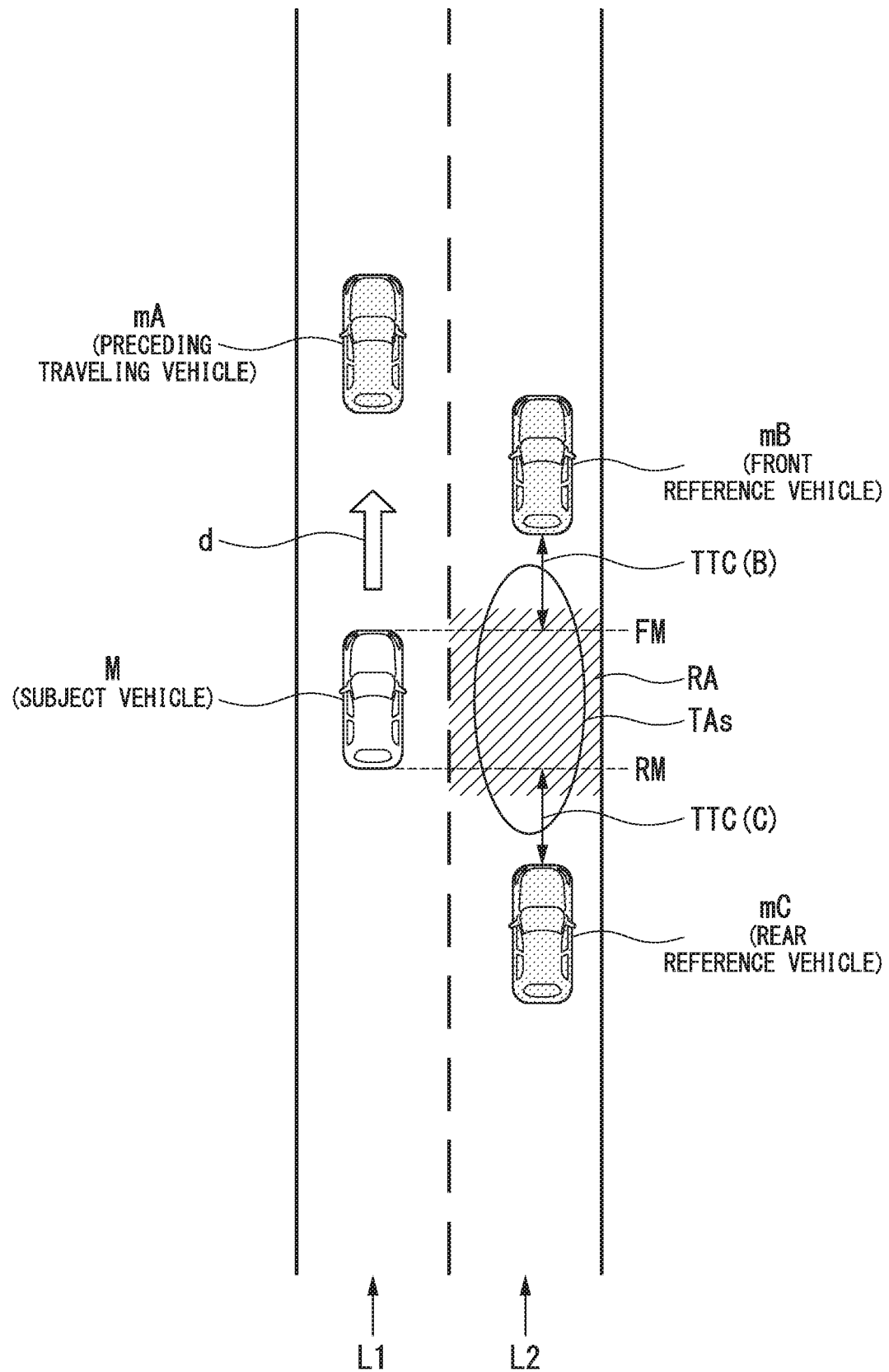
FIG. 4 is a diagram illustrating a process at the time of a lane change.
Figure 5:
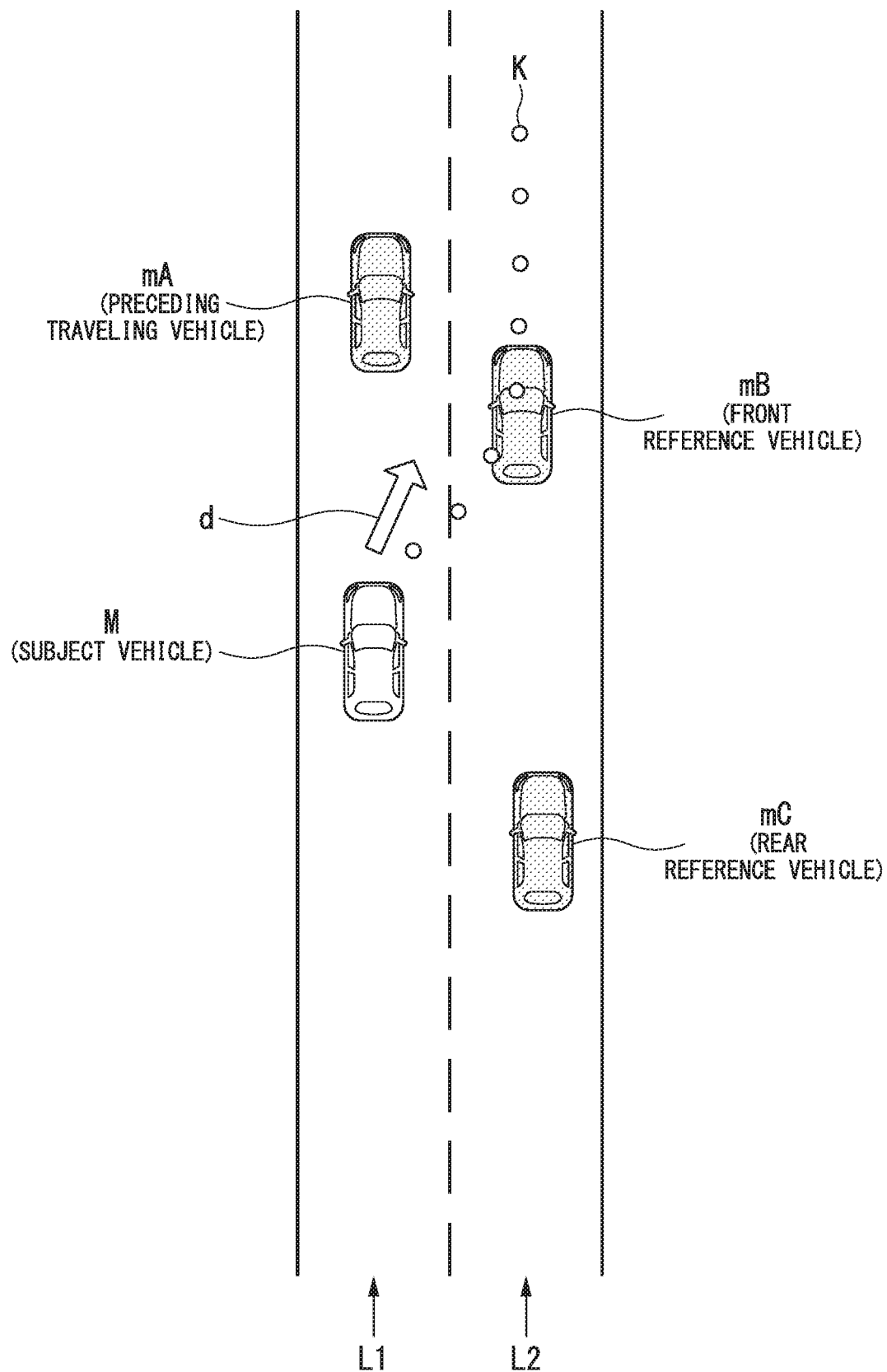
FIG. 5 is a diagram illustrating the process at the time of the lane change.

In a case where the lane change event is started, the action plan generation unit 323 generates the target trajectory for the lane change. FIGS. 4 and 5 are diagrams illustrating a process when the lane is changed. First, the action plan generation unit 323 selects two surroundings vehicles that travels on an adjacent lane L2 of a lane change destination that is an adjacent lane adjacent to the own lane L1 on which the subject vehicle M travels, from the surroundings vehicles, and sets a lane change target position TAs between such two surroundings vehicles. In the following description, a surroundings vehicle that travels immediately before the lane change target position TAs in the adjacent lane will be referred to as a front reference vehicle mB, and a surroundings vehicle that travels immediately after the lane change target position TAs in the adjacent lane will be referred to as a rear reference vehicle mC. The lane change target position TAs is a relative position based on a positional relationship among the subject vehicle M, the front reference vehicle mB, and the rear reference vehicle mC.

In the example of FIG. 4, a manner in which the action plan generation unit 323 sets the lane change target position TAs. In the drawing, a reference numeral mA denotes the preceding traveling vehicle, a reference numeral mB denotes the front reference vehicle, and a reference numeral mC denotes the rear reference vehicle. An arrow d denotes a progress (travel) direction of the subject vehicle M. In a case of the example of FIG. 4, the action plan generation unit 323 sets the lane change target position TAs between the front reference vehicle mB and the rear reference vehicle mC on the adjacent lane L2.

Next, the action plan generation unit 323 determines whether or not a first condition for determining whether or not the lane change is possible is satisfied at the lane change target position TAs (that is, the position between the front reference vehicle mB and the rear reference vehicle mC).

For example, the first condition is a condition in which there is no a part of the surroundings vehicle in a prohibition area RA provided in the adjacent lane and TTC between the subject vehicle M and the front reference vehicle mB and between the subject vehicle M and the rear reference vehicle mC is larger than a threshold value. This determination condition is an example of a case where the lane change target position TAs is set to the side of the subject vehicle M. In a case where the first condition is not satisfied, the action plan generation unit 323 resets the lane change target position TAs. At this time, the subject vehicle M may wait until the timing at which the lane change target position TAs satisfying the first condition may be set, or perform a speed control for moving to the side of the lane change target position TAs by changing the lane change target position TAs.

As shown in FIG. 4, for example, the action plan generation unit 323 projects the subject vehicle M onto the lane L2 of the lane change destination of the subject vehicle M, and sets the prohibition area RA having a slight margin distance in the front and rear. The prohibition area RA is set as an area extending from one end to the other end in a lateral direction of the lane L2.

In a case where the surroundings vehicle is not present in the prohibition area RA, for example, the action plan generation unit 323 assumes an extension line FM and an extension line RM that respectively virtually extend from the front end and the rear end of the subject vehicle M to the side of the lane L2 of the lane change destination. The action plan generation unit 323 calculates a collision margin time TTC(B) between the extension line FM and the front reference vehicle mB and a collision margin time TTC(C) between the extension line RM and the rear reference vehicle mC. The collision margin time TTC(B) is a time derived by dividing the distance between the extension line FM and the front reference vehicle mB by a relative speed of the subject vehicle M and the front reference vehicle mB. The collision margin time TTC(C) is a time derived by dividing the distance between the extension line RM and the rear reference vehicle mC by a relative speed of the subject vehicle M and the rear reference vehicle mC. In a case where the collision margin time TTC(B) is larger than a threshold value Th(B) and the collision margin time TTC(C) is larger than a threshold value Th(C), the action plan generation unit 323 determines that the first condition is satisfied. The threshold values Th(B) and Th(C) may be the same value or different values.

In a case where the first condition is satisfied, the action plan generation unit 323 generates a trajectory candidate for the lane change. In the example of FIG. 5, the action plan generation unit 323 assumes that the preceding traveling vehicle mA, the front reference vehicle mB, and the rear reference vehicle mC travel in a predetermined speed model, and generates the trajectory candidate so that the subject vehicle M does not interfere with the preceding traveling vehicle mA and is positioned between the front reference vehicle mB and the rear reference vehicle mC at any future time on the basis of the speed model of such three vehicles and the speed of the subject vehicle M. For example, the action plan generation unit 323 smoothly connects the current position of the subject vehicle M, the position of the front reference vehicle mB at any future time, the center of the lane of the lane change destination, and an end point of the lane change to each other, using a polynomial curve such as a spline curve, and disposes a predetermined number of trajectory points K on the curve at equal intervals or unequal intervals. At this time, the action plan generation unit 323 generates a trajectory so that at least one of the trajectory points K is disposed in the lane change target position TAs.

In various scenes, the action plan generation unit 323 generates a plurality of target trajectory candidates, and at that time point, selects an optimum target trajectory appropriate for the route to the destination among the plurality of target trajectory candidates. For example, the optimum target trajectory is a target trajectory set so that a yaw rate expected to occur when the subject vehicle M is caused to travel on the basis of the target trajectory is less than a threshold value and the speed of the subject vehicle M is within a predetermined vehicle speed range. For example, the threshold value of the yaw rate is set to a yaw rate that does not cause an overload (the acceleration of the vehicle width direction is equal to or greater than the threshold value) to the occupant when the lane change is performed. In addition, for example, the predetermined vehicle speed range is set to a vehicle speed range of about 70 to 110 [km/h].

For example, the second control unit 340 includes a travel control unit (travel controller) 342. The travel control unit 342 controls the travel driving force output device 500, the brake device 510, and the steering device 520 such that the subject vehicle M passes along the target trajectory generated by the action plan generation unit 323 according to scheduled times.

For example, the travel control unit 342 determines a control amount of the travel driving force output device 500 and the brake device 510 according to the target speed included in the target trajectory and controls the travel driving force output device 500 and the brake device 510 by the control amount such that speed control of the subject vehicle M is performed.

For example, the travel control unit 342 determines a target steering angle of the subject vehicle at a trajectory point ki that is an arbitrary trajectory point included in the target trajectory on the basis of an angle formed by a line connecting the trajectory point ki and a trajectory point ki−1 reached before the trajectory point ki, and a line connecting the trajectory point ki and a trajectory point ki+1 reached next after the trajectory point ki. In addition, the travel control unit 342 determines a control amount of the electric motor in the steering device 520 so that a displacement corresponding to the target steering angle is applied to the vehicle wheel. In addition, the travel control unit 342 controls the steering device 520 using the determined control amount such that steering control of the subject vehicle M is performed.

The HMI 400 suggests various pieces of information to the occupant in the vehicle and is operated by the occupant. For example, the HMI 400 includes a part or all of various display devices, a light emitting unit, a speaker, a buzzer, a touch panel, various operation switches, a key, and the like. The HMI 400 may include a part of a seat belt device that holds the occupant setting on the seat by a seat belt. Details of a function of the HMI 400 will be described later.

The travel driving force output device 500 outputs the travel driving force (torque) for enabling the vehicle to travel to a driving wheel. For example, the travel driving force output device 500 includes a combination of an internal combustion engine, an electric motor, a transmission, and the like, and a power electronic control unit (ECU) that controls the internal combustion engine, the electric motor, the transmission, and the like. The power ECU controls the above-described constitutions according to the information input from the travel control unit 342 or the information input from the driving operation element 80.

For example, the brake device 510 includes a brake caliper, a cylinder that transfers oil pressure to the brake caliper, an electric motor that generates the oil pressure in the cylinder, and a brake ECU. The brake ECU controls the electric motor according to the information input from the travel control unit 342 or the information input from the driving operation element 80, so that the brake torque corresponding to the control operation is output to each wheel. The brake device 510 may include a mechanism for transferring the oil pressure generated by the operation of the brake pedal included in the driving operation element 80 to the cylinder through a master cylinder as a backup. The brake device 510 is not limited to the constitution described above, and may be an electronic control method oil pressure brake device that controls an actuator according to the information input from the travel control unit 342 or the information input from the driving operation element 80 to transfer the oil pressure of the master cylinder to the cylinder. The brake device 510 may include a brake device of a plurality of systems such as oil pressure or electric motion.

For example, the steering device 520 includes a steering ECU and an electric motor. For example, the electric motor changes the direction of steerable wheels by applying a force to a rack and pinion mechanism. The steering ECU changes the direction of the steerable wheels according to the information input from the travel control unit 342 or the information input from the driving operation element 80.

During the manual driving, the information input from the driving operation element 80 is directly output to the travel driving force output device 500, the brake device 510, and the steering device 520. The information input from the driving operation element 80 may be output to the travel driving force output device 500, the brake device 510, and the steering device 520 through the automatic driving control unit 300. Each ECU of the travel driving force output device 500, the brake device 510, and the steering device 520 performs each operation on the basis of the information input from the driving operation element 80.

[Constitution of HMI 400]

Figure 6:
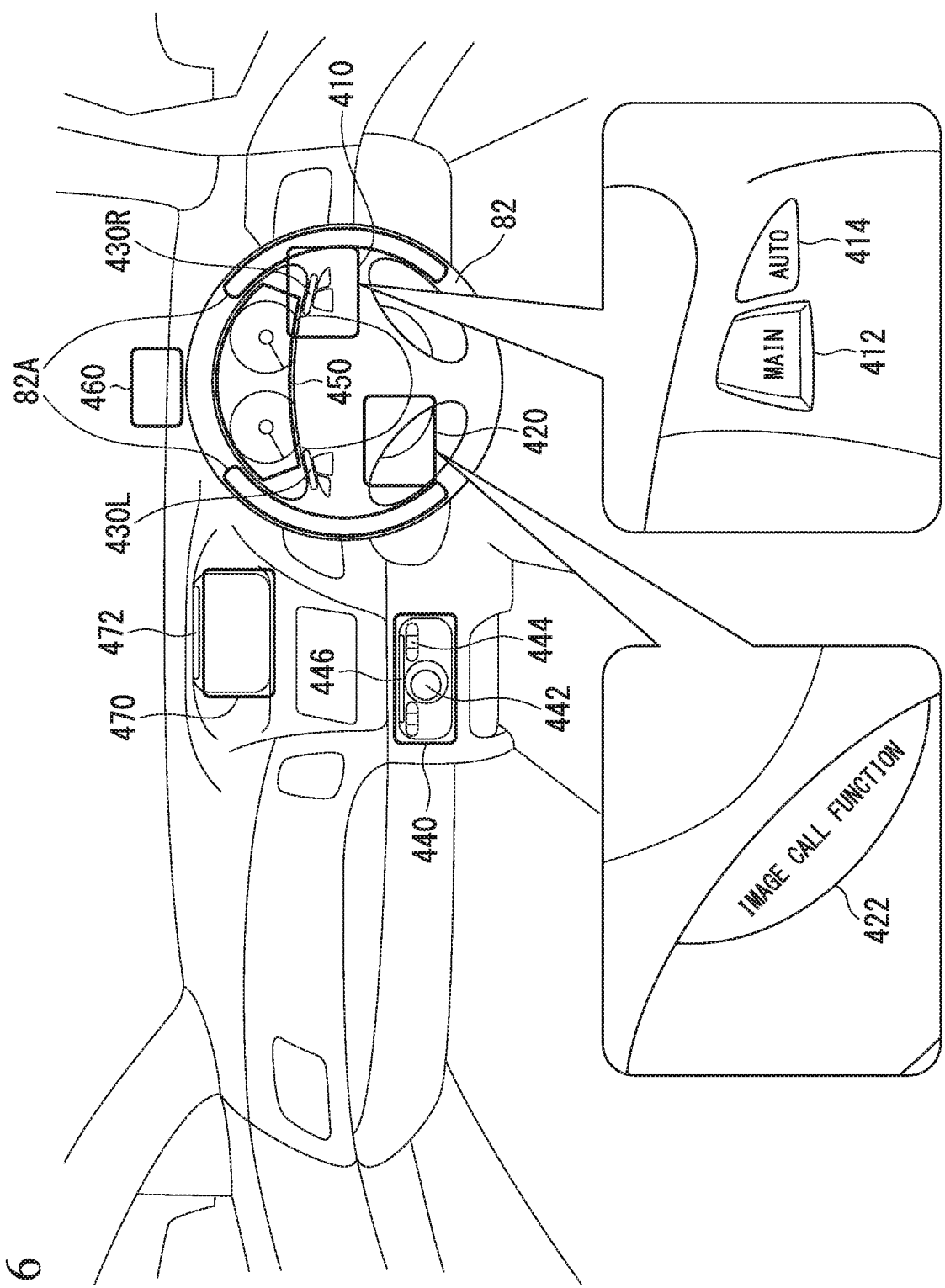
FIG. 6 is a diagram illustrating an example of an HMI in the subject vehicle.

Hereinafter, a constitution example of the HMI 400 according to an embodiment will be described. FIG. 6 is a diagram illustrating an example of the HMI 400 in the subject vehicle M. For example, the HMI 400 includes a first operation unit (first operator) 410, a second operation unit (second operator) 420, light emitting units (light emitter) 430R and 430L, a third operation unit (third operator) 440, a first display unit (first display) 450, a head up display (HUD) 460, and a third display unit (third display) 470.

The first operation unit 410, the second operation unit 420, and the light emitting units 430R and 430L are provided in a steering wheel 82 that is one of the driving operation elements 80. The steering wheel 82 is provided with a grip sensor 82A. For example, the grip sensor 82A is a capacity sensor provided along a circumferential direction of the steering wheel 82. The grip sensor 82A detects that the object approaches or comes into contact with an area of a detection target as a change of the capacitance. In a case where the detected capacitance is equal to or greater than a threshold value, the grip sensor 82A outputs a predetermined detection signal to the operation element state determination unit 130 of the master control unit 100. For example, the threshold value is set as a value less than a capacitance generated in a case where the occupant grips the steering wheel 82. The grip sensor 82A may output the detection signal indicating the capacitance to the operation element state determination unit 130 regardless of whether or not the capacitance is equal to or greater than the threshold value.

Instead of or in addition to the grip sensor 82A, a steering torque sensor 82B may be provided in the steering wheel 82. For example, the steering torque sensor 82B detects the steering torque given to the shaft of the steering wheel 82, and in a case where the detected steering torque is equal to or greater than a threshold value, the steering torque sensor 82B outputs a predetermined detection signal to the operation element state determination unit 130. For example, the threshold value is set to a value lower than the steering torque given to the shaft in a case where the occupant grips the steering wheel 82. The steering torque sensor 82B may output a detection signal indicating the steering torque to the operation element state determination unit 130 regardless of whether or not the steering torque is equal to or greater than the threshold value.

For example, the first operation unit 410 includes a main switch 412 and an automatic switch 414. The main switch 412 is a switch for setting a state in which the driving support may be started (a standby state). In other words, the main switch 412 is a switch for starting a process (an internal process) in a preparation step before executing the driving support, that will be described later, or a switch for determining whether or not it is possible to start the driving support.

In a case where the main switch 412 is operated, the driving support is not immediately started and a preliminary process for executing the driving support is performed under the manual driving. For example, the preliminary process is a process for causing the object recognition device 16 to continuously perform the process of the object recognition for a predetermined time in advance (specifically, a sequential recognition process of a target using a Kalman filter or the like). After the main switch 412 is operated and thus the state is in the standby state (that is, a certain time has elapsed after the operation), when the automatic switch 414 is further operated, the driving support of the first degree of the smallest degree is started. That is, the automatic switch 414 is a switch for switching the driving from the manual driving to the driving support control.

The second operation unit 420 includes an operation switch 422 for starting a provision of an image call function (hereinafter, referred to as a video phone). For example, the light emitting units 430R and 430L are disposed in a spoke portion extending from the center boss portion of the steering wheel 82 toward an annular rim portion. A lighting state of the light emitting unit 430R is controlled by a control of the HMI control unit 120.

For example, the third operation unit 440 includes a rotation operation unit (rotation operator) 442 that is protruded to a front side from a view of the occupant and a switch operation unit (switch operator) 444. The rotation operation unit 442 is formed in a substantially cylindrical shape and may be rotated around an axis line. The switch operation unit 444 is provided in a surroundings of the rotation operation unit 442 or a top surface of the rotation operation unit 442. The third operation unit 440 includes a rotation sensor (not shown) such as an encoder that detects the rotation angle and the rotation speed of the rotation operation unit 442, and a displacement sensor (not shown) that detects the displacement of the switch operation unit 444. The third operation unit 440 outputs detection values output from each of the sensors to the master control unit 100. The detection values output to the master control unit 100 is used in operations of an arrow or selection button, a confirmation button, and the like output to a screen of the third display unit 470, or a selection or confirmation of an input character, and the like.

The third operation unit 440 may be a so-called touch panel type operation unit that performs a selection or confirmation operation, or the like by touching a display screen with a fingertip. In a vicinity of the third operation unit 440, a light emitting unit (light emitter) 446 capable of emitting light of a predetermined color (light of a predetermined wavelength) is provided.

For example, the first display unit 450 is a display device that is provided in the vicinity of the front of the seat of the driver in an instrument panel and is visually recognized by the occupant from a gap of the steering wheel 82 or through the steering wheel 82. For example, the first display unit 450 is a liquid crystal display (LCD), an organic electro luminescence (EL) display device, or the like. On the first display unit 450, information necessary for the travel at the time of the manual driving or at the time of the automatic driving of the subject vehicle M or information on an instruction to the occupant are displayed. For example, the information necessary for the travel at the time of the manual driving of the subject vehicle M is the speed, the engine speed, the remaining fuel amount, the radiator water temperature, the travel distance, and other pieces of information of the subject vehicle M. On the other hand, for example, the information necessary for the travel at the time of the automatic driving of the subject vehicle M is information on the future trajectory of the subject vehicle M, the degree of the driving support, the instruction to the occupant, and the like.

For example, the HUD 460 is disposed at a position higher than that of the first display unit 450. The HUD 460 projects an image on a predetermined image forming unit. For example, the HUD 460 causes a line of sight of the occupant sitting on the seat of the driver to view a virtual image by projecting an image on a portion of a front windshield in front of the seat of the driver. A display area of the image projected by the HUD 460 is smaller than a display area of the image on the first display unit 450, and which is for preventing the occupant from missing a real object located in front of the occupant by the image projected by the HUD 460. In the embodiment, instead of the HUD 460, the front windshield of the subject vehicle M may be used as the third display unit 470. In this case, for example, a light emitting diode (LED) incorporated in the instrument panel may emit light and the light emission of the LED may be reflected in the front windshield.

The third display unit 470 is provided to the central portion of the instrument panel. For example, the third display unit 470 is an LCD, an organic EL display device, or the like. For example, the third display unit 470 displays an image corresponding to a navigation process executed by the navigation device 50, or a picture showing the call counterpart in the video phone. The third display unit 470 may display a television program, reproduce a DVD, or display contents of a downloaded movie or the like.

Figure 7:
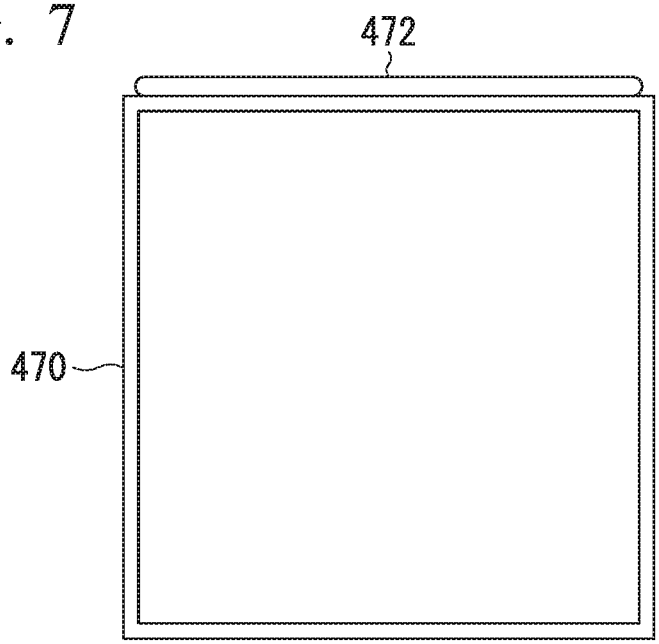
FIG. 7 is a diagram illustrating one aspect of a positional relationship between a third display unit and a light emitting unit.

The third display unit 470 may be provided with a light emitting unit 472. FIG. 7 is a diagram illustrating one aspect of a positional relationship between the third display unit 470 and the light emitting unit 472. For example, the light emitting unit 472 is provided in a part or in the vicinity of the third display unit 470. For example, the "vicinity" is a close range in which the shortest distance between the light emitting unit 472 and the third display unit 470 is about equal to or less than several [cm] (more specifically, about 3 [cm]). In the example of FIG. 7, for example, the light emitting unit 472 is attached so as to extend along at least one side forming a screen shape of the third display unit.

Figure 8:
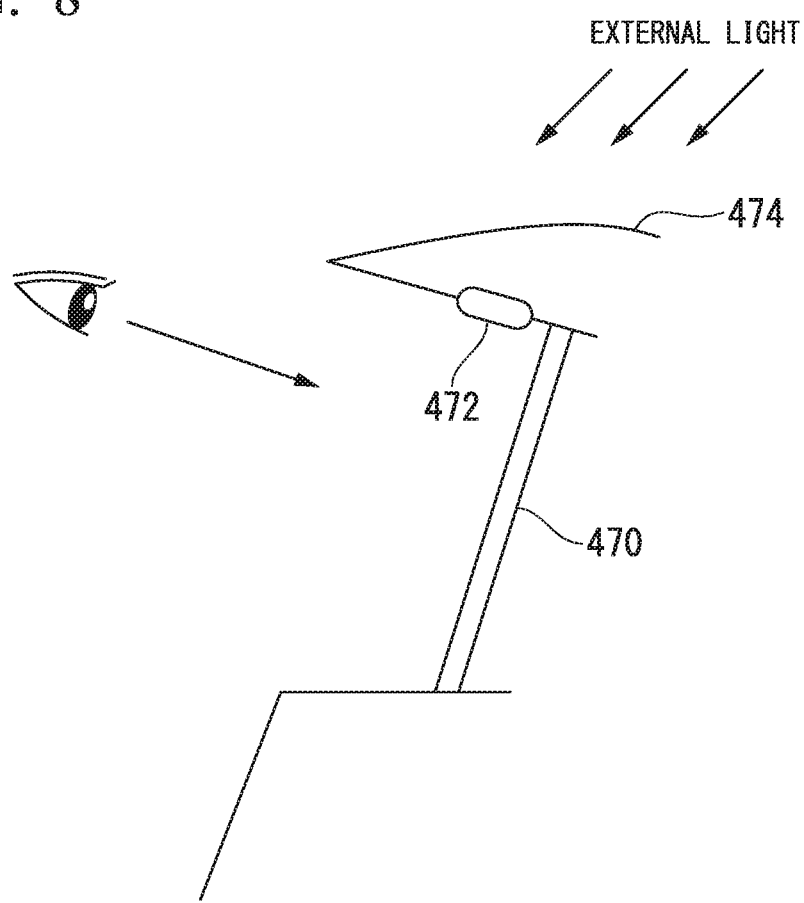
FIG. 8 is a diagram illustrating another aspect of the positional relationship between the third display unit and the light emitting unit.

FIG. 8 is a diagram illustrating another aspect of the positional relationship between the third display unit 470 and the light emitting unit 472. In the example of FIG. 8, the third display unit 470 is provided at a lower portion of the a visor portion 474 of the instrument panel portion at the upper portion in front of the third display unit 470. The light emitted by the light emitting unit 472 is not blocked by the visor portion 474 and may be visually recognized by the occupant. By adopting this shape, the visor portion 474 may prevent an irradiation of external light such as sunlight on the third display unit 470 and shield at least a part of the external light to be inserted into the light emitting unit 472, and thus, visibility of the occupant with respect to the third display unit 470 is improved.

The light emitting unit 472 is controlled by the HMI control unit 120 so as to emit the light in a case where the third display unit 470 is usable. For example, the term "usable" means that the third display unit 470 may display the image related to the image call function by the operation of the second operation unit 420, or the third display unit 470 may display the movie or the image related to the television program by the operation of the third operation unit 440.

Figure 9:
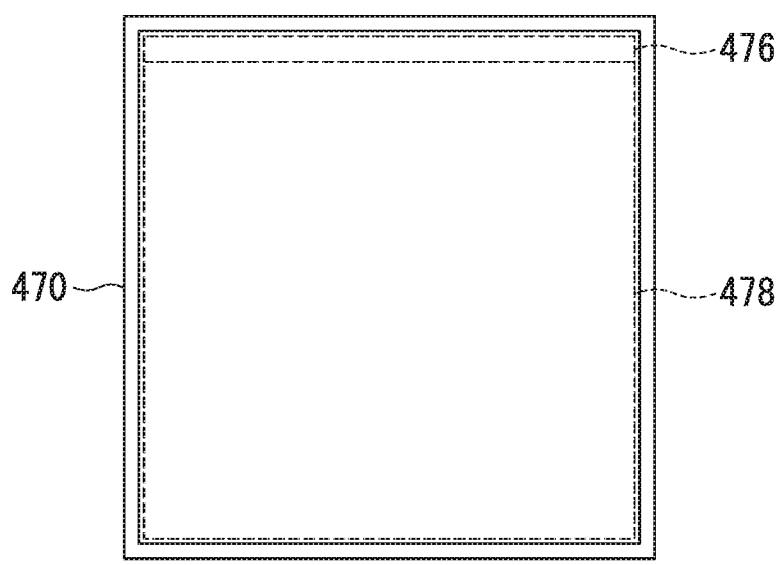
FIG. 9 is a diagram illustrating a notification that the third display unit is usable using an area of a portion of a screen of the third display unit.

FIG. 9 is a diagram illustrating a notification that the third display unit 470 is usable using an area of the portion of a screen of the third display unit 470. The HMI control unit 120 allocates a first display area 476 and a second display area 478 to the entire screen area of the third display unit 470. The first display area 476 is a pixel area of an area extending along any one side of the entire screen of the third display unit 470. In a case where the third display unit 470 is usable, the HMI control unit 120 turns on light of the first display area 476 or causes the first display area 476 to blink by a predetermined color (light of a predetermined wavelength) or turns on light of the first display area 476 or causes the first display area 476 to blink by a predetermined shape. Therefore, it is possible to notify the occupant that the third display unit 470 is in a usable state without providing the light emitting unit 472.

The HMI control unit 120 displays a content operated by the second operation unit 420 or the third operation unit 440 or a content executed by the operation, on the second display area 478.

[Display Control of HMI 400 Related to Automatic Driving] Next, the display control of the HMI 400 related to the automatic driving will be described. A layout on a display screen described below is merely an example and may be arbitrary changed. The layout refers to a disposition, a color, a scale, and others.

Figure 10:
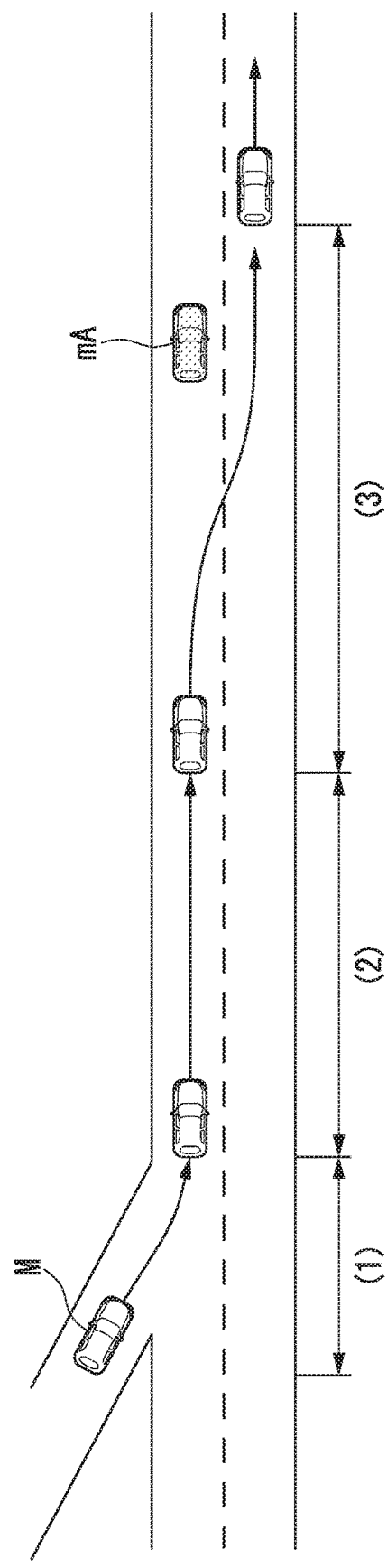
FIG. 10 is a diagram illustrating various scenes in which a switch from a manual driving to a driving support is performed and then the lane change by the driving support is executed.

FIG. 10 is a diagram illustrating various scenes in which the switch from the manual driving to the driving support is performed and then the lane change by the driving support is executed. In an example of FIG. 10, a scene (1) is a scene in which the subject vehicle M enters an expressway from a general road by the manual driving. A scene (2) is a scene in which the switch from the manual driving to the driving support of the first degree is performed. A scene (3) is a scene in which the subject vehicle M executes the lane change by the automatic driving control. Hereinafter, display controls corresponding to each of the scenes (1) to (3) will be described.

<Scene (1)>

For example, the scene (1) is a scene before entering the expressway. In this scene, since the main switch 412 and the automatic switch 414 of the first operation unit 410 are not operated, the driving support is not executed, and the manual driving is performed. In a case where the manual driving is performed, the HMI control unit 120 displays the information necessary for the occupant of the seat of the driver to manually drive the subject vehicle M using the driving operation element 80 on the first display unit 450 as an image. The HMI control unit 120 displays a part of the information that is being displayed on the first display unit 450 on the HUD 460 as an image. A screen of this case is shown in FIG. 11.

Figure 11:
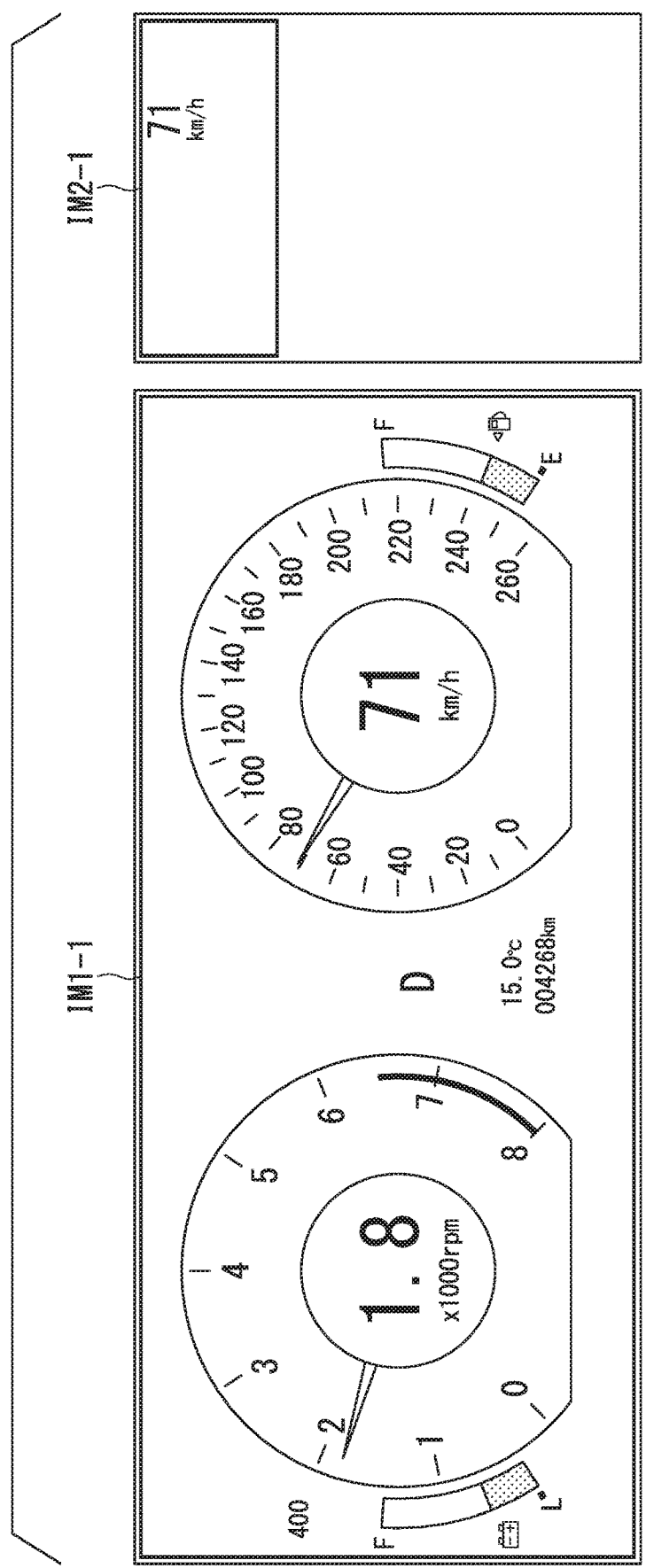
FIG. 11 is a diagram illustrating an example of a first screen and a second screen displayed at the time of the manual driving.

FIG. 11 is a diagram illustrating an example of a first screen IM1-1 and a second screen IM2-1 displayed at the time of the manual driving. The first screen IM1-1 is a screen displayed by the first display unit 450, and the second screen IM2-1 is a screen viewed by the eyes of the occupant by the projection by the HUD 460. For example, the HMI control unit 120 displays information on the battery remain amount, the rotation speed, the shift position, the interior temperature, the travel distance, the travel speed, the fuel remain amount, and the like of the subject vehicle M, as the information necessary for the travel of the subject vehicle M at the time of the manual driving, on the first screen IM1-1. The HMI control unit 120 displays the information on the speed among images displayed on the first screen IM1-1 on the second screen IM2-1 smaller than the first screen IM1-1. As described above, the area of the image projected by the HUD 460 is smaller than the area of the image displayed by the first display unit 450. Therefore, the HMI control unit 120 displays detailed information that is relatively detailed (first information) on the driving support of the subject vehicle M on the first display unit 450 and displays simple information on the driving support (second information) on the HUD 460. For example, the simple information is information of which an amount is smaller than that of the detailed information. The simple information may be information in which a type or the number of displayed items is smaller than a type or the number of the items displayed as the detailed information. The simple information may be an image of which a resolution is reduced, a simplified image, or a deformed image with respect to an image displayed as the detailed information. The simple information may be information of which importance is high or information of which emergency is high among the pieces of the detailed information.

For example, the HMI control unit 120 displays information of a part of the detailed information as the simple information on the HUD 460. For example, in FIG. 11, the HMI control unit 120 extracts information indicating the speed of the subject vehicle M from the detailed information displayed on the first screen IM1-1 and displays the extracted information on the second screen IM2-1. As described above, the detailed information is displayed on the first display unit 450 and the simple information is displayed on the HUD 460. Therefore, it is possible to appropriately provide the information on the driving support to the occupant and prevent the eyes of the occupant from being tired.

<Scene (2)>

In the scene (2), the subject vehicle M enters the expressway. In a case where the main switch 412 is operated by the occupant, the HMI control unit 120 changes the screens to be displayed on the first display unit 450 and the HUD 460. The screen after the change is shown in FIG. 12.

Figure 12:
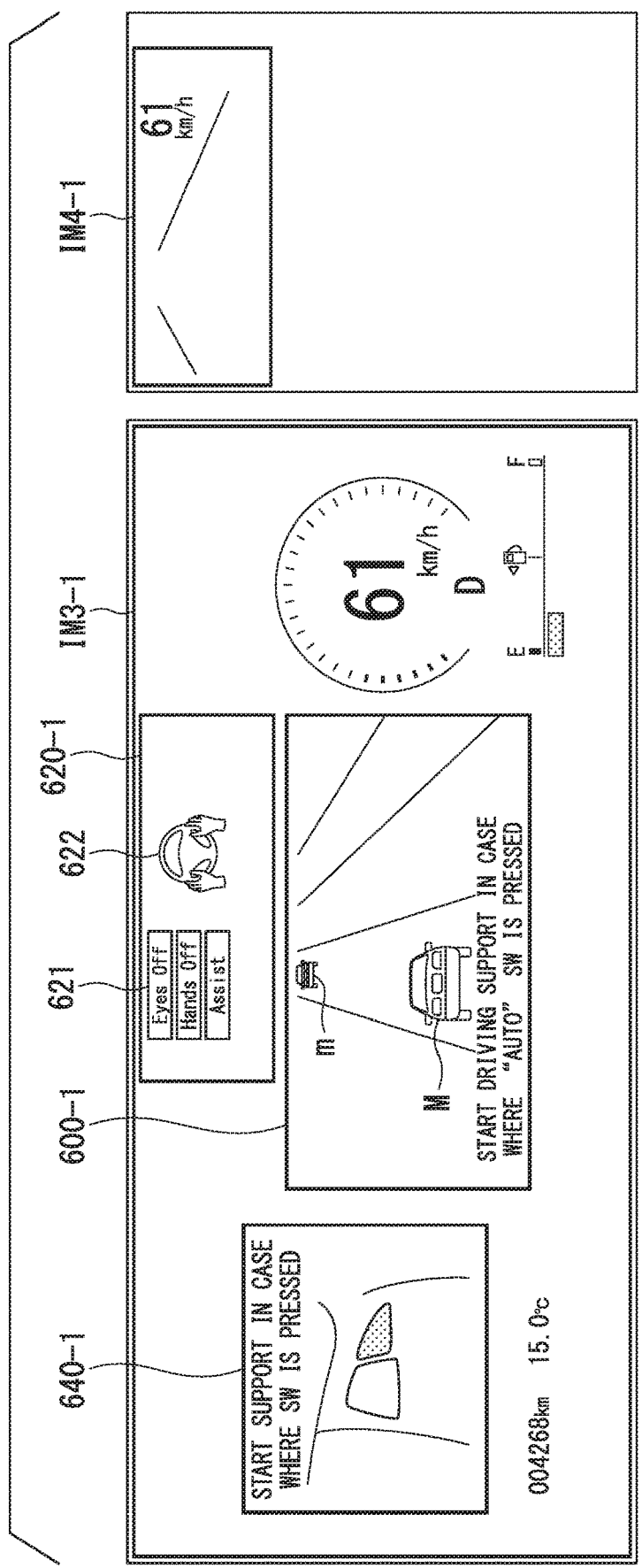
FIG. 12 is a diagram illustrating an example of a third screen and a fourth screen displayed by an operation of a main switch.

FIG. 12 is a diagram illustrating an example of a third screen IM3-1 and a fourth screen IM4-1 displayed by the operation of the main switch 412. The third screen IM3-1 is a screen displayed by the first display unit 450, and the fourth screen IM4-1 is a screen projected by the HUD 460. The same applies to a third screen IM3-X (X is an arbitrary natural number) and a fourth screen IM-X shown in the following drawings. The third screen IM3-X and the fourth screen IM4-X are continuously displayed in a state in which the driving support is executable and in a state in which the driving support is being executed.

The third screen IM3-1 includes a surroundings detection information display area 600-1, a driving support state display area 620-1, and a driving support start operation guide area 640-1 as areas for displaying the state in which the start of the driving support is possible (the standby state). Hereinafter, each area of a third screen IM3-X is referred to as a surroundings detection information display area 600-X, a driving support state display area 620-X, and a driving support start operation guide area 640-X.

The HMI control unit 120 displays, for example, the image indicating the road shape on which the subject vehicle M is traveling acquired from the second map information 62, the image indicating the subject vehicle M recognized by the subject vehicle position recognition unit 322, and the image indicating the surroundings vehicle m recognized by the outside space recognition unit 321, in the surroundings detection information display area 600-1. The HMI control unit 120 displays the image indicating all surroundings vehicles m recognized by the outside space recognition unit 321, on the first display unit 450. The HMI control unit 120 may display only surroundings vehicle m that affects the future trajectory of the subject vehicle M among all surroundings vehicles m recognized by the outside space recognition unit 321, on the first display unit 450. Therefore, it is possible to reduce the number of vehicles to be monitored by the occupant and it is possible to reduce burden of monitoring.

The HMI control unit 120 displays the information indicating the degree of the driving support (including the automatic driving) executable by the subject vehicle M, in the driving support state display area 620-1. In the example of FIG. 12, an image 621 indicating three indicators "Assist", "Hands Off", and "Eyes Off" is shown as the information indicating the degree of the driving support. The degree of the driving support is expressed by each indicator alone or a combination of a plurality of indicators. The indicator "Assist" is an indicator indicating that the state is in a state in which the driving support of the first degree is being executed (an on state) or a state in which the transition to the driving support of the first degree is possible (an off state).

The indicator "Hands Off" is an indicator indicating that the state is in a state in which the driving support of the second degree is being executed (an on state) or a state in which the transition to the driving support of the second degree is possible (an off state).

The indicator "Eyes Off" is an indicator indicating that the state is in a state in which the driving support of the third degree is being executed (an on state) or a state in which the transition to the driving support of the third degree is possible (an off state).

As the indicators, indicators corresponding to each of the state in which the driving support is being executed and the state in which the transition to the driving support is possible may be prepared. It is possible to grasp whether the driving supports of each degree are being executed or the state is in the state in which the transitions to the driving supports of each degree are possible by a requested action notification image 622 that will be described later. For example, in a case where the driving support of the corresponding degree is being executed, each indicator is highlighted. In a case where the transition to the driving support of the corresponding degree is possible, each indicator is displayed in a gray out state. In the example of FIG. 12, since all of the indicators are displayed in a gray out state, FIG. 12 shows that the driving support of any degree is not executed, that is, the manual driving is performed.

The HMI control unit 120 displays the requested action notification image 622 at the display position corresponding to the image 621 indicating the three indicators "Assist", "Hands Off", and "Eyes Off" in the driving support state display area 620-1. The term "corresponding" means that correspondence may be recognized by a person, such as side by side positioning, vertical alignment, or guideline indicating correspondence. As an example, the "a display position corresponding to the image 621 of the indicator" indicates a display position adjacent to the image 621 and indicates a display position spaced apart from the image 621 by a several [cm] or less (for example, 3 [cm] or less) in at least one direction of up, down, right, and left on the basis of the display position of the image 621. For example, the requested action notification image 622 is an image indicating a predetermined action performed on the driving operation element 80 by the occupant. For example, the requested action notification image 622 includes an image indicating the driving operation element 80 and an image indicating a predetermined portion of the occupant. For example, the requested action notification image 622 is an image that schematically indicates a positional relationship between the steering wheel 82 and a hand of the occupant.

The HMI control unit 120 displays information for guiding the operation of the occupant that is for starting the driving support, in the driving support start operation guide area 640-1. In an example of FIG. 12, in the driving support start operation guide area 640-1, the start of the driving support is guided by the occupant operating the automatic switch 414.

In addition to or instead of displaying the start of the driving support by the occupant operating the automatic switch 414 in the driving support start operation guide area 640-1, the HMI control unit 120 may causes the speaker included in the HMI 400 to output a sound indicating that the driving support is started by the occupant operating the automatic switch 414.

At least a part of the pieces of the information displayed in each of the surroundings detection information display area 600-1, the driving support state display area 620-1, and the driving support start operation guide area 640-1 may be displayed in another display area. In the third screen IM3-1, the information on the travel distance, the temperature inside the vehicle, the fuel, the speed, and the shift position of the subject vehicle M may be displayed.

With respect to the detailed information displayed on the third screen IM3-1, the HMI control unit 120 displays the simple information obtained by extracting the part of the detailed information on the fourth screen IM4-1 of the HUD 460. On the fourth screen M4-1 of the HUD 460, the information on the road shape in front of the subject vehicle M and the information on the speed of the subject vehicle M are displayed among the pieces of the information on the driving support displayed on the third screen IM3-1 of the first display unit 450.

In a state shown in FIG. 12, in a case where the operation of the automatic switch 414 by the occupant is detected, the master control unit 100 causes the driving support control unit 200 to execute the driving support of the first degree. The HMI control unit 120 changes the screens to be displayed on the first display unit 450 and the HUD 460 to, for example, screens shown in FIG. 13.

Figure 13:
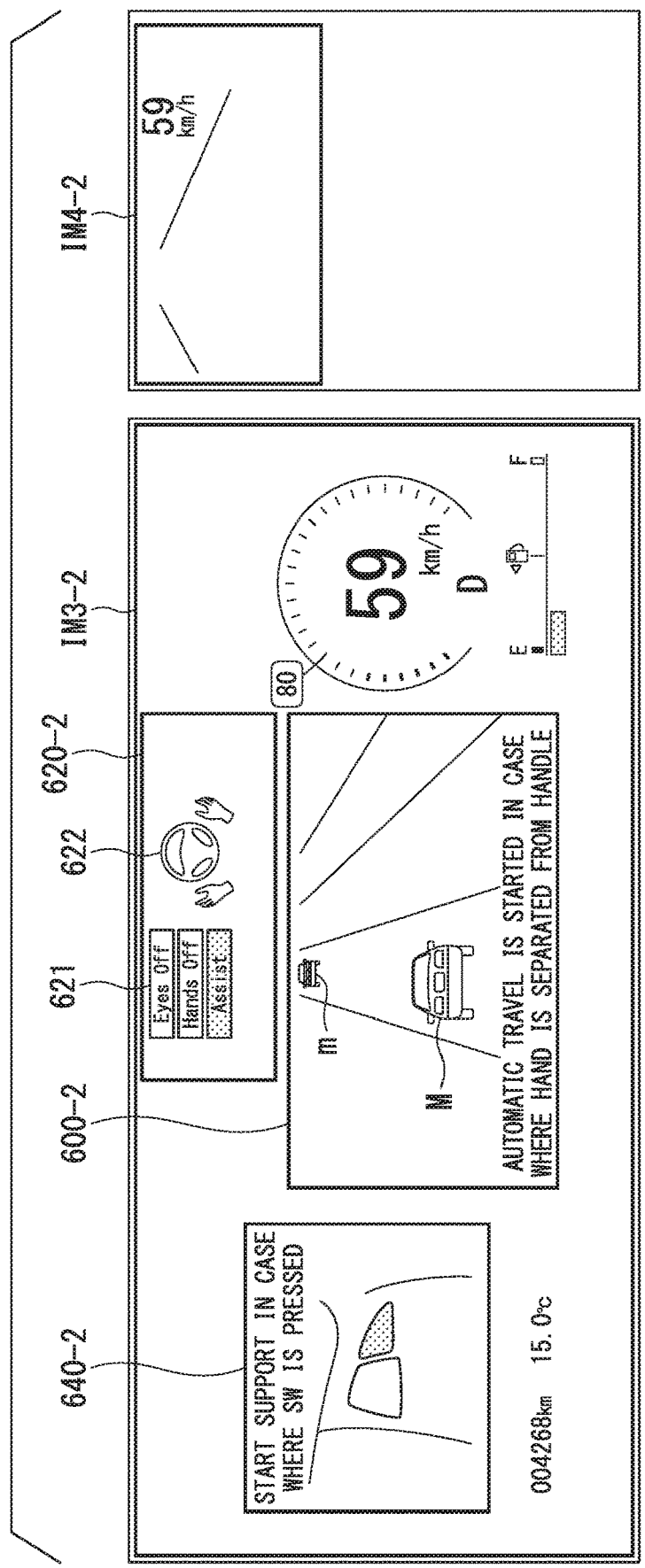
FIG. 13 is a diagram illustrating an example of a third screen and a fourth screen displayed in a case where an automatic switch is operated.

FIG. 13 is a diagram illustrating an example of a third screen IM3-2 and a fourth screen IM4-2 displayed in a case where the automatic switch 414 is operated. The HMI control unit 120 displays the image indicating the degree of the driving support that is being executed so that the image indicating the degree of the driving support that is being executed is distinguishable from an image indicating a degree of another driving support (for example, the highlight display and the gray out display). For example, the HMI control unit 120 highlights the indicator of the "Assist" corresponding to the driving support of the first degree in a driving support state display area 620-2 of the third screen IM3-2. Therefore, the occupant may grasp that the driving support of the first degree is being performed.

Here, as the requested action notification image 622, the HMI control unit 120 displays a moving image for requiring the occupant to perform an operation necessary for the transition to the degree of the driving support corresponding to the "Hands Off" (automatic driving) as the requested action notification image 622. For example, the moving image is an image including a dynamic object in which a predetermined object dynamically moves as time goes by. The moving image includes an animation.

For example, in a case where the driving support of the first degree is being executed and the driving support of the second degree is executable, the HMI control unit 120 displays the requested action notification image 622 schematically indicating an operation content of the occupant for a state in which the hand of the occupant is separated from the steering wheel 82 in the driving support state display area 620-2 of the third screen IM3-2. The requested action notification image 622 is an image indicating the operation to be performed by the occupant in order to switch the driving support to the driving support of the second degree.

For example, in a case where the driving support of the first degree is being executed and the driving support of the second degree is executable, the HMI control unit 120 displays the above-described requested action notification image 622 in the driving support state display area 620-2 of the third screen IM3-2.

The HMI control unit 120 may display an image schematically showing a positional relationship between the accelerator pedal and the foot of the occupant or an image schematically showing a positional relationship between the brake pedal and the foot of the occupant in the driving support state display area 620-2 of the third screen IM3-2 as a requested action notification image 623.

The HMI control unit 120 may display information indicating that the driving support is started by the occupant executing the action corresponding to the requested action notification image 622, on a surroundings detection information display area 600-2. In an example of FIG. 13, information indicating that the driving support (an "automatic travel" in the drawing") is started in a case where the hand is separated from the steering wheel 82 (a "handle" in the drawing) is displayed in the surroundings detection information display area 600-2.

In a case where the HMI control unit 120 requires the occupant to perform the separation of the hand from the steering wheel 82, the HMI control unit 120 may turn on the light emitting units 430R and 430L provided on the steering wheel 82 or cause the light emitting units 430R and 430L to blink.

In a case where the HMI control unit 120 requires the occupant to perform the separation of the hand from the steering wheel 82, the HMI control unit 120 may output a sound indicating the requirement from the speaker included in the HMI 400. The HMI control unit 120 may combine a plurality of aspects among the display of the requested action notification image 622, turning on the light emitting units 430R and 430L or causing the light emitting units 430R and 430L to blink, and the sound output corresponding to the action of separating the hand from the steering wheel 82 and may output the combination from various pieces of equipment.

The HMI control unit 120 displays the same information as the fourth screen IM4-1 on a fourth screen IM4-2 of the HUD 460.

Here, the operation element state determination unit 130 determines whether the occupant is in the hands on state or the hands off state on the basis of a presence or an absence of the detection signal input from the grip sensor 82A. For example, in a case where the detection signal is input from the grip sensor 82A, the operation element state determination unit 130 determines that the occupant is in the hands on state, and in a case where the detection signal is not input from the grip sensor 82A, the operation element state determination unit 130 determines that the occupant is in the hands off state. For example, the operation element state determination unit 130 may determine whether a capacitance has changed by a threshold or more on the basis of a signal strength of the detection signal input from the grip sensor 82A, and in a case where the capacitance has changed by the threshold or more, the operation element state determination unit 130 may determine that the occupant is in the hands on state.

In a case where the detection signal from the steering torque sensor 82B is input, the operation element state determination unit 130 may determine that the occupant is in the hands on state, and in a case where the detection signal is not input, the operation element state determination unit 130 may determine that the occupant is in the hands off state. The operation element state determination unit 130 may determine the steering torque is equal to or greater than the threshold value on the basis of a signal strength or the like of the detection signal input from the steering torque sensor 82B, and in a case where the steering torque is equal to or greater than the threshold value, the operation element state determination unit 130 may determine that the occupant is in the hands on state.

Instead of or in addition to the capacitance or the steering torque, the operation element state determination unit 130 may determine whether the occupant is in the hands on state or the hands off state on the basis of a grip force of the occupant when the steering wheel 82 is gripped (a pressure applied to a wheel), or a control amount (a steering amount) of the electric motor in the steering device 520.

The switching control unit 110 of the master control unit 100 maintains the first degree as the degree of the driving support until it is determined that the occupant is in the hands off state by the operation element state determination unit 130, after the operation of the automatic switch 414 is received and the degree of the driving support is switched to the first degree. On the other hand, in a case where all conditions for transiting the driving support to the driving support of the second degree are satisfied and it is determined that the occupant is in the hands off state by the operation element state determination unit 130, the switching control unit 110 switches the degree of the driving support from the first degree to the second degree. By such a control, the driving support control unit 200 performs the driving support until the occupant is in the hands off state, and in a case where the occupant is in the hands off state, a control authority is transferred from the driving support control unit 200 to the automatic driving control unit 300 and the automatic driving control unit 300 starts the automatic driving control.

Figure 14:
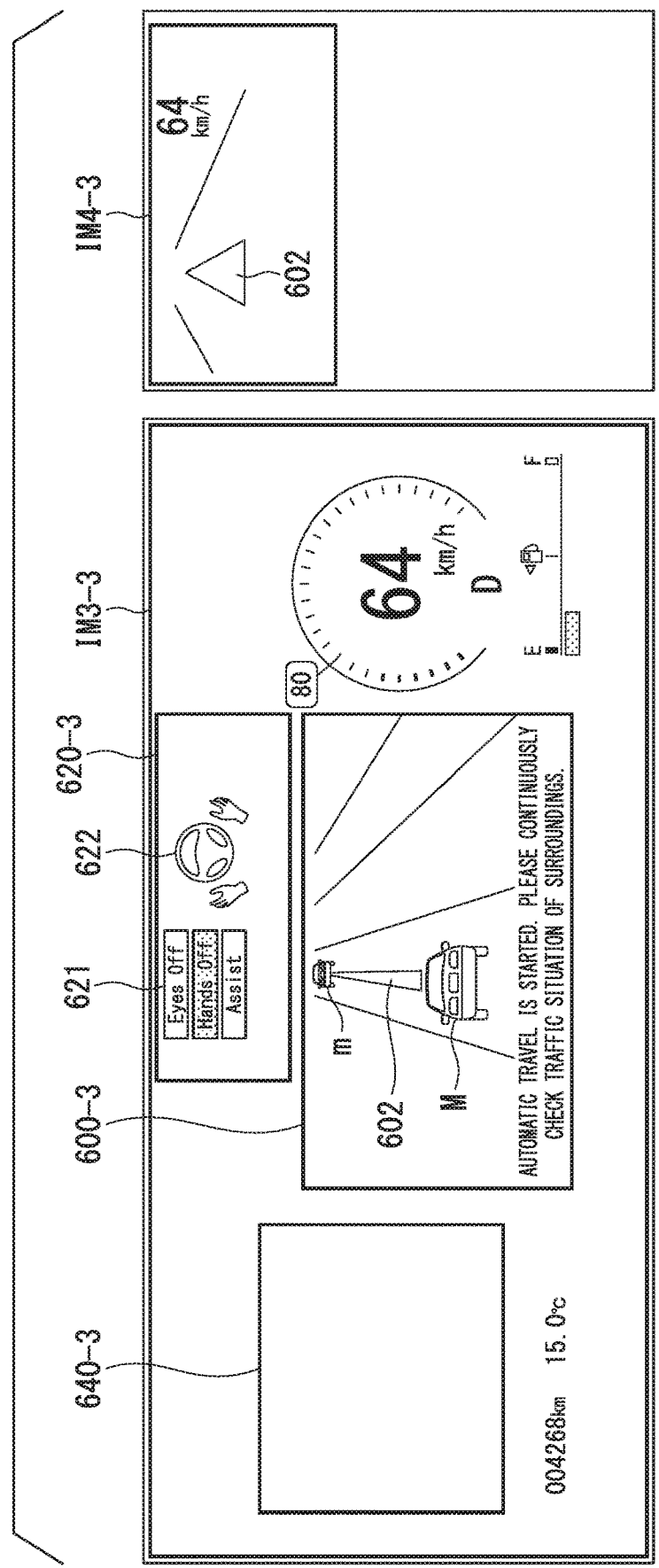
FIG. 14 is a diagram illustrating an example of the screens displayed on the first display unit and the HUD in the driving support of a second degree.

When the degree of the driving support is second degree, in a case where the automatic driving control unit 300 executes the automatic driving control, the HMI control unit 120 changes the screens displayed on the first display unit 450 and the HUD 460 to, for example, screens shown in FIG. 14.

FIG. 14 is a diagram illustrating an example of the screens displayed on the first display unit 450 and the HUD 460 in the driving support of the second degree. The HMI control unit 120 highlights the indicator of "Hands Off" corresponding to the driving support of the second degree in a driving support state display area 620-3 of a third screen IM3-3. Therefore, the occupant may grasp that the driving support of the second degree is being performed.

For example, the HMI control unit 120 displays the image indicating the road shape in front of the subject vehicle M acquired from the second map information 62, the image indicating the subject vehicle M recognized by the subject vehicle position recognition unit 322, the image indicating the surroundings vehicle m recognized by the outside space recognition unit 321, and a future trajectory image 602 indicating the future trajectory of the subject vehicle M generated by the action plan generation unit 323 in a surroundings detection information display area 600-3. In addition, the HMI control unit 120 displays information for causing the occupant to continuously monitor a peripheral traffic situation although the driving support of the second degree (the "automatic travel" in the drawing) is started, in the surroundings detection information display area 600-3.

In a case where the degree of the driving support is the second degree, the occupant state monitoring unit 140 of the master control unit 100 determines whether the occupant is in the eyes on state or the eyes off state on the basis of the captured image of the vehicle interior camera 90 for checking whether or not the occupant is fulfilling the surrounding monitoring obligation. For example, the image processing unit 140A of the occupant state monitoring unit 140 extracts an image area including a face feature (for example, a feature of a specific portion such as an eye, the nose, and the mouth) from the captured image of the vehicle interior camera 90 and detects a direction of the line of sight or a direction of the face of the occupant based on a position of a feature point such as the pupil, the iris, the eyelids, or the like of the occupant in the extracted image area. At this time, the image processing unit 140A may detect the direction of the line of sight or the direction of the face of the occupant of the subject vehicle M using a neural network or the like that has been learned in advance so as to detect (output) the direction of the line of sight or the face from a face image of a person.

For example, in a case where the degree of the driving support is the second degree, the monitoring determination unit 140B of the occupant state monitoring unit 140 determines whether or not the direction of the face or the line of sight detected by the image processing unit 140A is within a first angle range $\Delta\theta 1$ using a certain direction as a reference. In a case where the direction of the face or the line of sight of the occupant is within the first angle range $\Delta\theta 1$ the monitoring determination unit 140B determines that the occupant is in the eyes on state, and in a case where the direction of the face or the line of sight is not within the first angle range $\Delta\theta 1$ the monitoring determination unit 140B determines that the occupant is in the eyes off state. For example, the "certain direction" as a reference for the first angle range $\Delta\theta 1$ may be a direction of the face or the line of sight when the occupant is facing in front (a front windshield side) when the occupant is sitting on the seat of the driver. For example, the first angle range $\Delta\theta 1$ may be determined as an angle range when a predetermined angle toward a vehicle width direction (a lateral direction as viewed from the occupant) from this direction is taken.

In a case where it is determined that the occupant is in the eyes on state by the monitoring determination unit 140B, that is, in a case where the occupant is fulfilling the surroundings monitoring obligation, the switching control unit 110 maintains the second degree as the degree of the driving support. At this time, as shown in FIG. 14, nothing is displayed in a driving support start operation guide area 640-3 of the third screen IM3-1 of the first display unit 450 and new information on the future trajectory 602 of the subject vehicle M is displayed on the fourth screen IM4-3 of the HUD 460 in addition to the same information as the fourth screen IM4-2 of FIG. 13.

On the other hand, in a case where it is determined that the occupant is in the eyes off state by the monitoring determination unit 140B, that is, in a case where the occupant is not fulfilling the surroundings monitoring obligation, the HMI control unit 120 displays an image on the first display unit 450 or the third display unit 470 of the HMI 400 or causes the speaker to output sound to warn the occupant to perform the surroundings monitoring. In a case where the eyes off state continues for a predetermined time or more, the switching control unit 110 may switch the degree of the driving support from the second degree to the first degree to cause the driving support control unit 200 to perform the driving support control.

In a case where the eyes off state continues for a predetermined time or more after it is determined that the occupant is in the eyes off state by the monitoring determination unit 140B, the switching control unit 110 may cause the automatic driving control unit 300 to perform an alternative control rather than causing the automatic driving control unit 300 to perform the automatic driving control corresponding to the second degree. For example, the alternative control is an automatic driving control for stopping the subject vehicle M in an area in which the subject vehicle M may be stopped such as a shoulder after gradually decelerating the subject vehicle M. Therefore, for example, in a case where the occupant loses occupant's consciousness and thus the occupant is not able to perform the surroundings monitoring, it is possible to stop the subject vehicle M without the operation of the occupant.

In a case where the degree of the driving support is the third degree and in a case where although the occupant is not in charge of the surroundings monitoring, the driving support is switched from the driving support of the third degree to the driving support in which the occupant is in charge of the surroundings monitoring, since the occupant is required to promptly perform the surroundings monitoring, the monitoring determination unit 140B continuously monitors an arousal degree of the occupant. For example, in a case where the degree of the driving support is the third degree, since there is a likelihood that transition to driving support of which a degree is smaller than the degree of the driving support of the second degree or the like will be performed according to change in a surrounding environment, in preparation for a requirement of the surroundings monitoring from a system side, the occupant is required to be in an attitude for quickly performing the transition to the surroundings monitoring. Therefore, although the occupant is not in charge of the surroundings monitoring, the monitoring determination unit 140B continuously monitors the occupant to determine whether or not the occupant is in a state in which the occupant is able to quickly perform the surroundings monitoring.

For example, the monitoring determination unit 140B determines whether or not the direction of the face or the line of sight detected by the image processing unit 140A is within a second angle range $\Delta\theta 2$ wider than the first angle range $\Delta\theta 1$, and in a case where the direction of the face or the line of sight of the occupant is within the second angle range $\Delta\theta 2$, the monitoring determination unit 140B determines that the occupant is in the state in which the occupant is able to quickly perform the surroundings monitoring. For example, the reference direction of the second angle range $\Delta\theta 2$ is, for example, the same direction as the reference direction of the first angle range $\Delta\theta 1$.

FIG. 15 is a diagram schematically illustrating a structure of a vehicle interior when the subject vehicle M is viewed from above. In the drawing, a reference numeral STD denotes the seat of the driver and an arrow V denotes the reference direction of the first angle range $\Delta\theta 1$. For example, the first angle range $\Delta\theta 1$ is determined so that the first display unit 450 is included in the angle range when the subject vehicle M is viewed from above. The second angle range $\Delta\theta 2$ is determined so that at least both of the first display unit 450 and the third display unit 470 are included in the angle range when the subject vehicle M is viewed from above. As shown in the drawing, it is not necessary for the first angle range Δθ1 and the second angle range Δθ2 to be laterally symmetrical with respect to the direction V and the angle range may be biased to any one direction of the first angle range Δθ1 and the second angle range Δθ2.

In a case where it is determined that the occupant in the state in which the occupant is able to quickly monitor the surroundings monitoring by the monitoring determination unit 140B, the switching control unit 110 maintains the third degree as the degree of the driving support. On the other hand, in a case where it is determined by the monitoring determination unit 140B that the occupant is in a state in which the occupant is not able to promptly perform the surroundings monitoring, the HMI control unit 120 displays an image on the first display unit 450 or the third display unit 470 of the HMI 400 or causes the speaker to output a sound to alert the occupant to adopt an orientation such that at least the first display unit 450 or the third display unit 470 are brought into view. In a case where the state in which the surroundings monitoring is not able to be continuously performed for a predetermined time or more, the switching control unit 110 may switch the degree of the driving support from the third degree to the second degree.

In a case where the degree of the driving support is the second degree, the occupant state monitoring unit 140 may determine the arousal degree of the occupant. For example, when detecting the pupil or the iris of the occupant in a captured image of the vehicle interior camera 90, the image processing unit 140A may detect the eyelids of the occupant. In addition, the monitoring determination unit 140B may derive an extent of an opening or closing time of the eyelids detected by the image processing unit 140A, and as the degree of opening of the eyelids decreases or the closing time of the eyelids increases, the monitoring determination unit 140B may determine that the arousal degree of the occupant decreases. The monitoring determination unit 140B may whether or not there is arousal of the occupant on the basis of detection results from a pressure sensor (not shown) provided on the seat STD of the driver. For example, in a case where a change of the pressure detected by the pressure sensor is equal to or less than a threshold value, the monitoring determination unit 140B determines that the occupant is not awake.

The switching control unit 110 determines whether to continue the driving support of the second degree or to switch the subject vehicle to a driving support to another degree or manual driving according to the arousal degree of the occupant obtained during a procedure of the determination process of the occupant state monitoring unit 140. For example, in a case where the arousal degree when the occupant is awake is set to 1 and the arousal degree when the occupant is not awake is set to 0, the switching control unit 110 determines that the occupant is awake and maintains the degree of the driving support as the second degree in a case where a numerical value of the arousal degree is equal to or greater than a threshold value (for example, about 0.5).

<Scene (3)>

In the scene (3), at the time of the driving support of the second degree, the automatic driving control unit 300 changes the lane of the subject vehicle M using automatic driving control. In this case, the HMI control unit 120 displays a screen corresponding to the automatic driving control of the lane change on the first display unit 450 and the HUD 460.

For example, the HMI control unit 120 displays the image indicating the generation of the lane change event of the subject vehicle M executed by the automatic driving control unit 300 in a first aspect at a first timing before a behavior of the subject vehicle M changes (for example, five seconds before the behavior changes).

Figure 16:
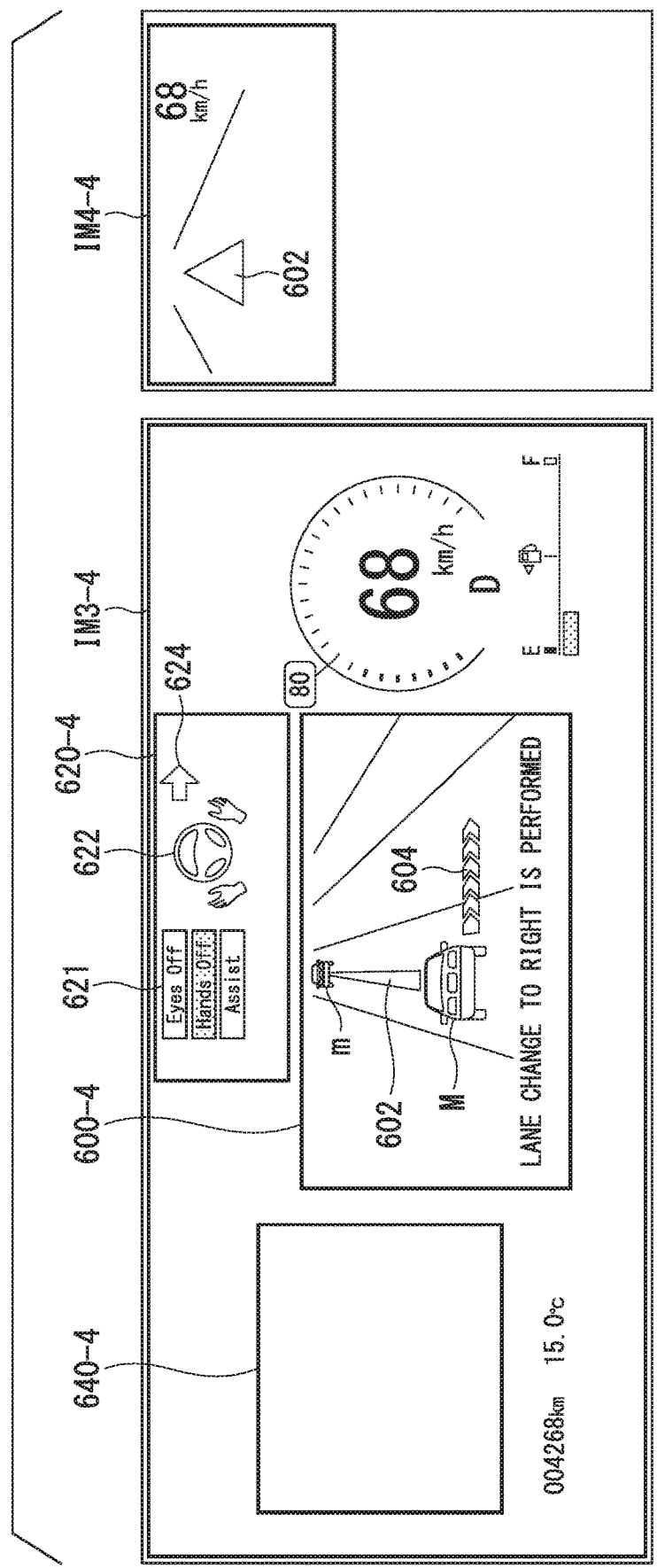
FIG. 16 is a diagram illustrating an example of a third screen and a fourth screen displayed at a first timing before a behavior of the subject vehicle changes.

FIG. 16 is a diagram illustrating an example of a third screen IM3-4 and a fourth screen IM4-4 displayed at the first timing before the behavior of the subject vehicle M changes. In addition to a content displayed in the surroundings detection information display area 600-3, the HMI control unit 120 displays, for example, an image 604 indicating the direction in which the subject vehicle M performs the lane change, in a surroundings detection information display area 600-4 of the third screen IM3-4. In an example of FIG. 16, the image 604 in which the subject vehicle M changes the lane to a right lane adjacent to the travel lane is displayed.

For example, the image 604 is an image that does not include a text. In an example of FIG. 16, the image 604 is a figure indicating a course change direction of the subject vehicle M along a road width direction. For example, the HMI control unit 120 gives an outside frame to the figure indicating the course change direction of the subject vehicle M and displays the image to which the outside frame is given on the first display unit 450. The HMI control unit 120 divides the image 604 into a plurality of areas, gives the outside frame to each of the plurality of divided areas, and displays the image 604. The HMI control unit 120 may display the outside frames of each of the plurality of divided areas as an animation in which the outside frames of each of the plurality of divided areas are sequentially displayed along the course change direction of the subject vehicle M.

The HMI control unit 120 displays a winker indicator 624 indicating the course change of the subject vehicle M in a driving support state display area 620-4. For example, the winker indicator 624 is a figure such as an arrow indicating the course change direction. The HMI control unit 120 displays the winker indicator 624 on the first display unit 450 at a timing synchronized with the first timing at which the image 604 is displayed.

The HMI control unit 120 displays the same information as the fourth screen IM4-3 on the fourth screen IM4-4 of the HUD 460.

The HMI control unit 120 displays an image in which the image 604 is highlighted at a second timing after first timing and before the behavior of the subject vehicle M changes (for example, two seconds before the behavior changes), in the surroundings detection information display area 600-4.

Figure 17:
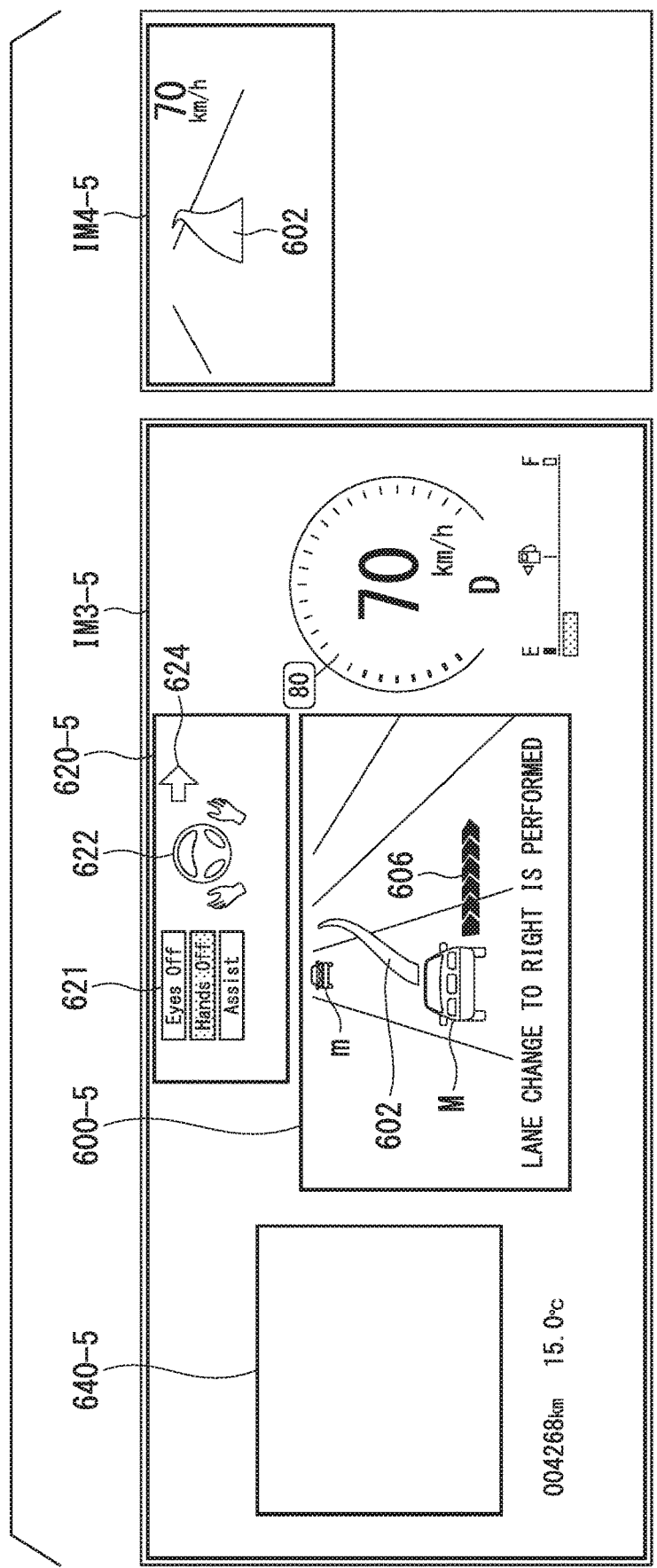
FIG. 17 is a diagram illustrating an example of the third screen and the fourth screen displayed at a second timing before the behavior of the subject vehicle changes.

FIG. 17 is a diagram illustrating an example of a third screen IM3-5 and a fourth screen IM4-5 displayed at the second timing before the behavior of the subject vehicle M changes. The HMI control unit 120 displays an image 606 in which the image 604 is highlighted in a surroundings detection information display area 600-5 of the third screen IM3-5. For example, the HMI control unit 120 displays a display mode in which the inside of the outside frame of the image 604 is colored in the surroundings detection information display area 600-5. The HMI control unit 120 may display the outside frame of each of the plurality of areas divided in the image 604 by an animation so that the outside frames are sequentially highlighted along the course change direction of the subject vehicle M. The HMI control unit 120 may display the image 606 at the first timing and may cause the image 606 to blink at the second timing. The HMI control unit 120 may display the image 606 at the first timing and display the image 606 at the second timing in a color that is more conspicuous than the color displayed at the first timing. Therefore, the occupant may intuitively grasp the course change direction.

The HMI control unit 120 changes the future trajectory image 602 displayed in the surroundings detection information display area 600-5 to a direction corresponding to the course change direction at the timing synchronized with the second timing. Therefore, the occupant may intuitively grasp that the change of the behavior is started in the lane change of the subject vehicle M.

The HMI control unit 120 displays the same information as the fourth screen IM4-4 on the fourth screen IM4-5 of the HUD 460. The HMI control unit 120 changes the future trajectory image 602 displayed on the fourth screen IM4-5 of the HUD 460 in the direction corresponding to the course change direction at the timing synchronized with the second timing and displays the future trajectory image 602.

As described above, in a case where lane change is started by the automatic driving control at the time of the driving support of the second degree, that is, in a case where the course direction of the subject vehicle M is changed, the occupant state monitoring unit 140 may change one or both of the direction used as the reference of the first angle range $\Delta\theta 1$ and the first angle range $\Delta\theta 1$ according to a future progress direction of the subject vehicle M.

FIG. 18 is a diagram schematically illustrating a manner in which the direction as the reference of the first angle range $\Delta\theta 1$ is changed when the lane change is started. For example, as shown in the drawing, in a case where it is scheduled to change the lane to an adjacent lane on a right side, as shown in FIG. 18, since a trajectory indicating the course direction of the subject vehicle M is displayed on the first display unit 450, it is assumed that the occupant stops a front monitoring and monitors a course direction destination. Therefore, the occupant state monitoring unit 140 tilts the direction V as the reference of the first angle range $\Delta\theta 1$ to a course direction side (a right hand side) of the subject vehicle M in order to shift the first angle range $\Delta\theta 1$ to the direction in which the occupant is scheduled to monitor. Therefore, even in a case where the line of sight of the occupant is removed from in front, it is determined that the surroundings monitoring is being continuously performed. The occupant state monitoring unit 140 may support removal of the line of sight of the occupant from in front at the time of lane change by expanding the first angle range $\Delta\theta 1$ toward the course direction side of the subject vehicle M.

<Process Flow Corresponding to Scenes (1) to (3)>

Figure 19:
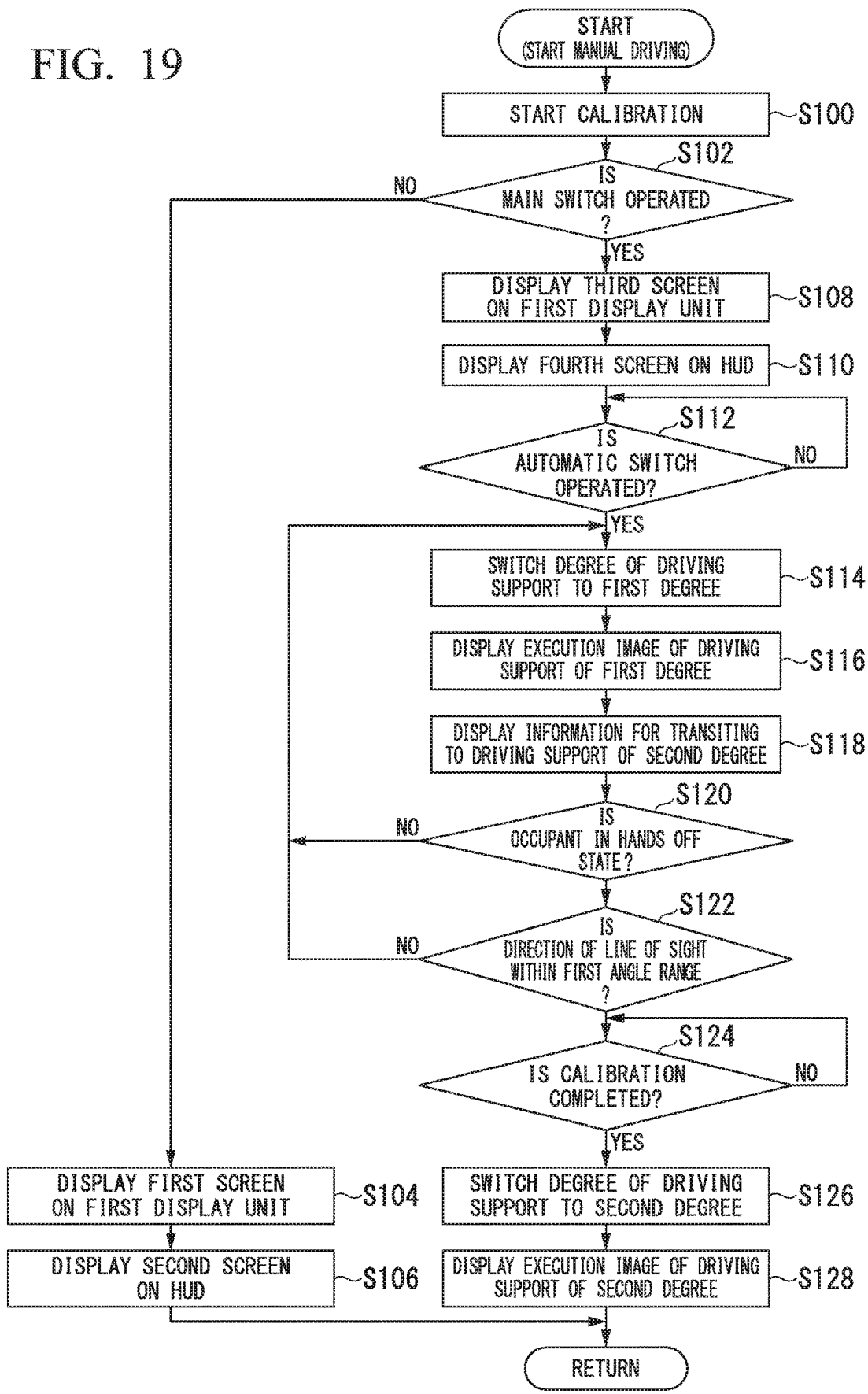
FIG. 19 is a flowchart illustrating an example of a flow of a process executed by a master control unit in scenes (1) to (3).

FIG. 19 is a flowchart illustrating an example of the flow of a process executed by the master control unit 100 in the scenes (1) to (3). For example, the process of the present flowchart is executed in a case where traveling of the subject vehicle M is started by manual driving.

First, the image processing unit 140A of the occupant state monitoring unit 140 starts a calibration process for smoothing the feature of the occupant of the seat of the driver that is an imaging target of the vehicle interior camera 90 as a preliminary process of the process of detecting the direction of the face or the line of sight of the occupant (step S100).

For example, the image processing unit 140A causes the vehicle interior camera 90 to repeatedly capture images at predetermined time invervals until a predetermined time has elapsed. In a case where the captured image is output by the vehicle interior camera 90, the image processing unit 140A extracts the feature of a specific portion such as the eye, the nose, or the mouth from the captured image and derives a position on an image of the extracted face feature. The image processing unit 140A may extract a feature of a shoulder or a head from the captured image and derive a central axis in a vertical direction of a body of the occupant. The image processing unit 140A performs such processes on each captured image that is captured by the vehicle interior camera 90 over a predetermined time and derives an average of the positions of the faces and an average of the central axes of the bodies. That is, the image processing unit 140A derives an orientation that is assumed to be the most natural body (highly probable) as a driving orientation of the occupant. In addition, the image processing unit 140A determines the direction of the line of sight or the direction of the face assumed from the derived orientation of the occupant as the reference direction of the first angle range $\Delta\theta 1$ and the second angle range $\Delta\theta 2$. Therefore, in the following processes, the direction of the line of sight or the direction of the face of the occupant at the time of the manual driving is used as the reference, and it is determined whether or not the occupant is performing the surroundings monitoring by a degree of separation of the direction of the line of sight or the face of the occupant from the reference direction.

The image processing unit 140A may start the above-described calibration process at any of a timing at which an ignition is turned on (a state in which an electric current is applied to equipment in the vehicle such as the HMI 400), a timing at which the driving support of the first degree is started, and a timing at which the driving support of the second degree is started.

Next, the HMI control unit 120 determines whether or not the main switch 412 has been operated (step S102). In a case where it is determined that the main switch 412 has not been operated, the HMI control unit 120 displays the first screen IM1-1 on the first display unit 450 (step S104) and displays the second screen IM2-1 on the HUD 460 (step S106).

On the other hand, in a case where it is determined that the main switch 412 is operated, the HMI control unit 120 displays the third screen IM3-1 on the first display unit 450 (step S108) and displays the fourth screen IM4-1 on the HUD 460 (step S110).

Next, the switching control unit 110 determines whether the automatic switch 414 is operated (step S112). In a case where it is determined that the automatic switch 414 is operated, the switching control unit 110 switches the subject vehicle from the manual driving to the first degree to cause the driving support control unit 200 to start the driving support control (step S114).

Next, the HMI control unit 120 displays the image indicating that the driving support of the first degree is being executed on the third screen IM3-1 and the fourth screen IM4-1 (step S116). Next, the HMI control unit 120 displays information regarding transition to driving support of the second degree on the third screen IM3-2 (step S118).

Next, the operation element state determination unit 130 determines whether or not the occupant is in the hands off state (step S120). In a case where it is determined that the occupant is in the hands on state by the operation element state determination unit 130, the switching control unit 110 returns to the process of S114 and maintains the first degree as the degree of the driving support.

On the other hand, in a case where it is determined that the occupant is in the hands off state by the operation element state determination unit 130, the monitoring determination unit 140B determines whether or not the direction of the face or the line of sight of the occupant is within the first angle range $\Delta\theta 1$ (step S122).

In a case where it is determined that the direction of the face or the line of sight of the occupant is not within the first angle range $\Delta\theta 1$ by the monitoring determination unit 140B, that is, in a case where the occupant is in the eyes off state, the switching control unit 110 returns to the process of S114 and maintains the first degree as the degree of the driving support.

In a case where a direction of a face or a line of sight of an occupant is not detected after a predetermined time or more by the image processing unit 140A, the monitoring determination unit 140B may determine that the occupant is in the eyes off state.

On the other hand, in a case where it is determined that the direction of the face or the line of sight of the occupant is within the first angle range $\Delta\theta1$ by the monitoring determination unit 140B, that is, in a case where the occupant is in the eyes on state, the switching control unit 110 determines whether or not the calibration process by the image processing unit 140A is completed (step S124).

For example, when the result of the calibration process is that the direction serving as a reference for the first angle range $\Delta\theta1$ has been determined by the image processing unit 140 A, or that a predetermined time has elapsed since the processing of step S100 was started, the switching control unit 110 may determine that the calibration process has been completed.

In a case where the calibration process is not completed, the switching control unit 110 prohibits the execution of the driving support of the second degree (the automatic driving control) by maintaining the current first degree without switching the degree of the driving support to the second degree until the calibration process is completed.

In a case where the reference direction of the first angle range $\Delta\theta1$ is not determined until the predetermined time has elapsed, the switching control unit 110 may prohibit the execution of the driving support of the second degree (the automatic driving control). For example, a situation is assumed in which the occupant is wearing a mask or sunglasses when the calibration process is being performed. In this case, the image processing unit 140A may detect a boundary (an edge) of an object such as the mask or the sunglasses covering the specific portion although the image processing unit 140A being able to extract a feature of a specific portion from the captured image of the vehicle interior camera 90. In a case where the switching control unit 110 detects the edge of the object such as the sunglasses or the mask in a vicinity of the face of the occupant (for example, inside an edge indicating an outline of the face) by the image processing unit 140A, the switching control unit 110 determines that the specific portion is covered by the object and prohibits the execution of the driving support of the second degree (the automatic driving control) by maintaining the current first degree without switching the degree of the driving support to the second degree.

On the other hand, in a case where the calibration process is completed, the switching control unit 110 switches the degree of the driving support from the first degree to the second degree (step S126).

Next, the HMI control unit 120 displays the image indicating that the driving support of the second degree is being executed on the third screen IM3-3 of the first display unit 450 (step S128). Therefore, the process of the present flowchart is ended.

Figure 20:
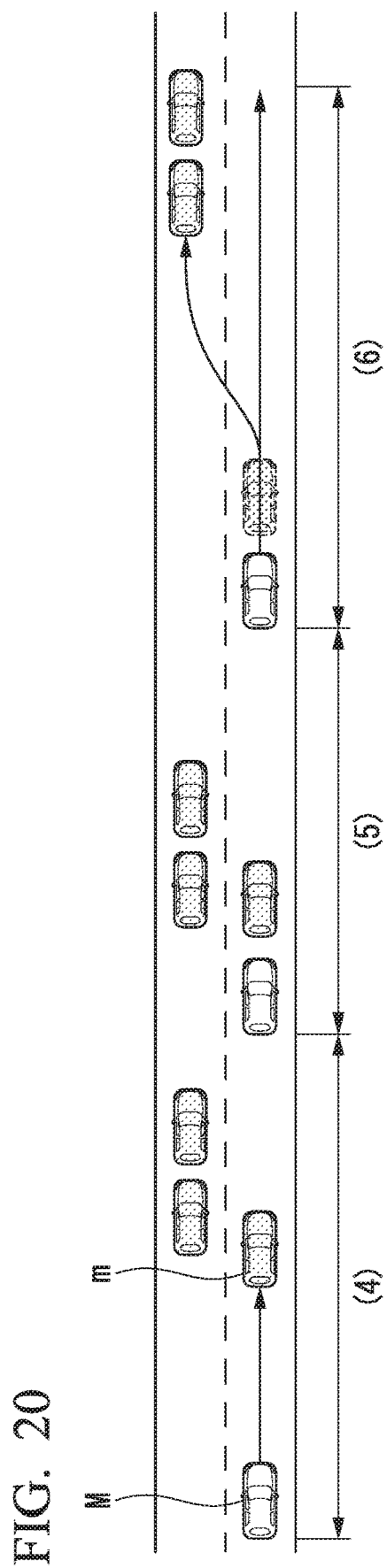
FIG. 20 is a diagram illustrating various scenes in which the switch from the driving support of the second degree to the driving support of the third degree is performed, and then the switch from the driving support of the third degree to the driving support of the second degree is performed.

Next, scenes (4) to (6) after the transition to the driving support of the second degree will be described. FIG. 20 is a diagram illustrating various scenes in which switching from the driving support of the second degree to the driving support of the third degree is performed, and then the switch from the driving support of the third degree to the driving support of the second degree is performed. In an example of FIG. 20, the scene (4) is a scene in which the subject vehicle M follows a surrounding vehicle m in a traffic jam and is switched from the driving support of the second degree to the driving support of the third degree. The term "follow" means, for example, traveling while maintaining a constant relative distance between the subject vehicle M and a preceding traveling vehicle (inter-vehicle distance).

The scene (5) is a scene in which low speed following travel (a traffic jam pilot (TJP)) that is an example of the driving support of the third degree is being executed. Low speed following travel is a control mode for following the preceding traveling vehicle at a predetermined speed or less. Low speed following travel is executed under a condition in which the speed of the preceding traveling vehicle m is equal to or less than a predetermined speed and a distance between the subject vehicle M and the preceding traveling vehicle m is less than a predetermined distance (for example, about 50 [m]). In the low speed following travel, it is possible to realize the automatic driving in which the occupant is not in charge of the surroundings monitoring or the degree of surroundings monitoring imposed on the occupant as an obligation is reduced by continuously performing a relatively easy automatic driving control such as following the preceding traveling vehicle on a crowded road. The term "degree of the surroundings monitoring is reduced" is for allowing the occupant to continuously and more easily fulfill the surroundings monitoring obligation by expanding the first angle range $\Delta\theta1$ to the second angle range $\Delta\theta2$ as described above and the space allowed for the direction of the face or the line of sight of the occupant being increased. For example, in the low speed following travel, the degree of the surroundings monitoring obligation may be reduced by eliminating the requirement for surroundings monitoring until a predetermined time (for example, five seconds) has elapsed from the start of control. The activation condition of the low speed following travel may be any one of the fact that the subject vehicle M travels at the predetermined speed or less and the fact that the subject vehicle M follows the preceding traveling vehicle m.

The scene (6) is a scene in which the driving support is switched from the driving support of the third degree to the driving support of the second degree. Hereinafter, display controls corresponding to each of the scenes (4) to (6) will be described.

<Scene (4)>

In the scene (4), the automatic driving control unit 300 does not reach the low speed following travel yet and performs an acceleration control of the subject vehicle M. In this case, the HMI control unit 120 displays the image corresponding to the driving support on one or both of the first display unit 450 and the HUD 460.

Figure 21:
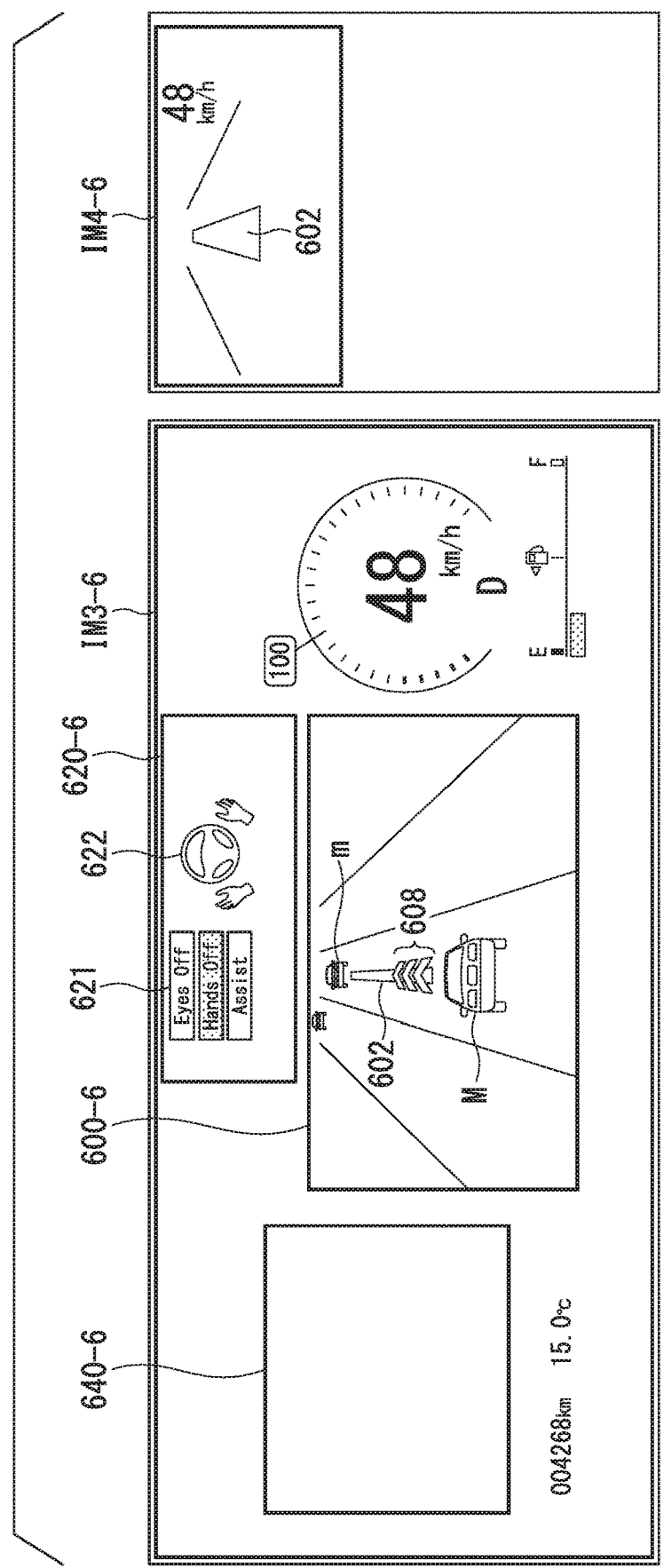
FIG. 21 is a diagram illustrating an example of a third screen and a fourth screen displayed at the time of an acceleration control of the subject vehicle.

FIG. 21 is a diagram illustrating an example of a third screen IM3-6 and a fourth screen IM4-6 displayed at the time of the acceleration control of the subject vehicle M. In the screen shown in this drawing, the activation condition of the low speed following is not yet satisfied. The HMI control unit 120 displays an image 608 indicating that the acceleration control is being executed in a surroundings detection information display area 600-6 of the third screen IM3-6. The image 608 is a figure indicating the acceleration of the subject vehicle M. The image 608 is displayed in front of the image indicating the subject vehicle M. In this case, the HMI control unit 120 may display the image 608 in a first display mode in which an outside frame is given to the image 608 at a first timing before the subject vehicle M accelerates and display the image 608 in a second display mode in which the inside of the outside frame of the image is colored at a second timing before the subject vehicle M accelerates. At the time of acceleration, the HMI control unit 120 may display an animation in which the image 608 moves in the progress direction of the subject vehicle. Conversely, at the time of a deceleration, the HMI control unit 120 may display an animation in which the image 608 moves toward the subject vehicle. Therefore, the occupant may intuitively ascertain that the acceleration control of the subject vehicle M is being executed.

<Scene (5)>

In the scene (5), the switching control unit 110 switches the degree of the driving support from the second degree to the third degree and the low speed following travel is executed by the automatic driving control unit 300. In this case, the HMI control unit 120 displays a screen corresponding to the driving support of the third degree (the low speed following travel) on the first display unit 450 and the HUD 460.

Figure 22:
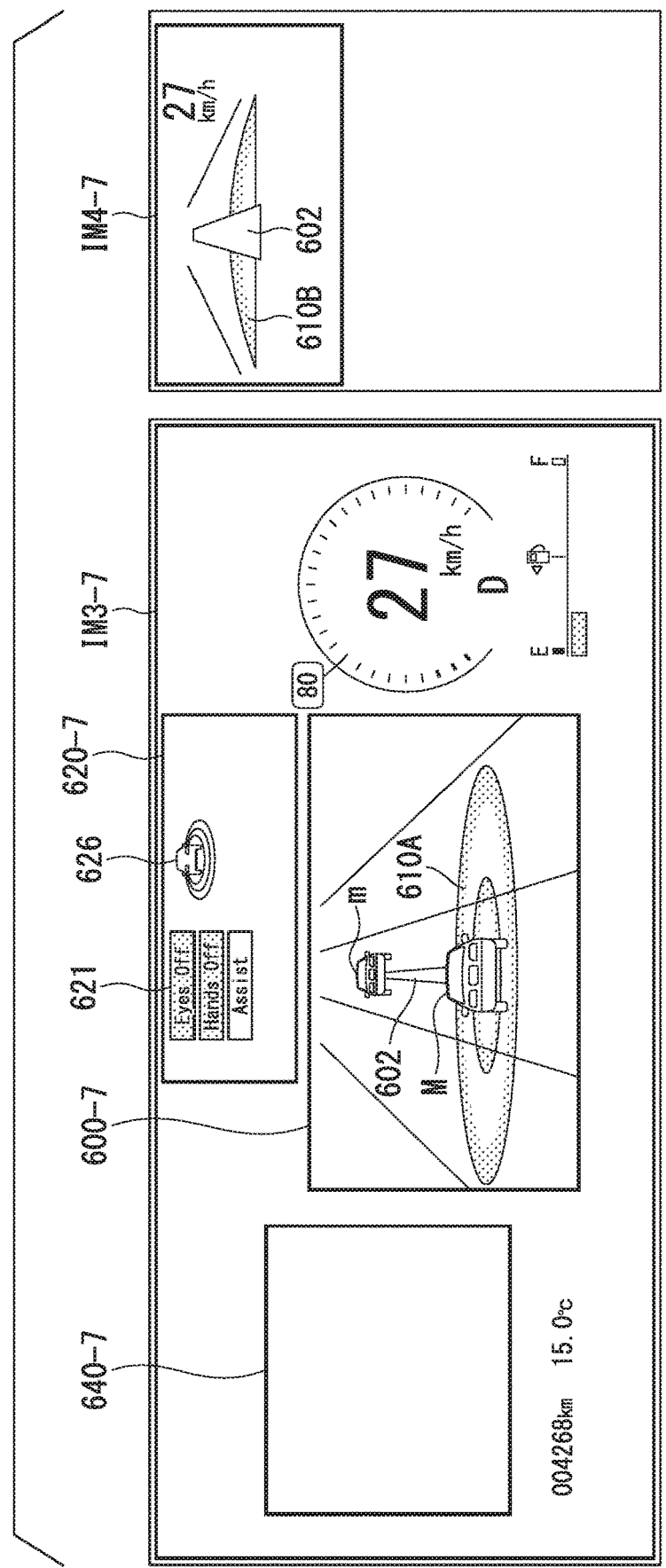
FIG. 22 is a diagram illustrating an example of a third screen and a fourth screen displayed at the time of a low speed following travel.

FIG. 22 is a diagram illustrating an example of a third screen IM3-7 and a fourth screen IM4-7 displayed at the time of the low speed following travel. The HMI control unit 120 displays a surroundings detection image 610A indicating that the driving support of the third degree is being executed in a surroundings detection information display area 600-7. The surroundings detection image 610 is an image indicating that the monitoring of the surroundings of the subject vehicle M is being performed by the camera 10, the radar device 12, the viewfinder 14, the object recognition device 16, and the outside space recognition unit 321. For example, the surroundings detection image 610 is an animation (a video) in which a ripple spreads out from the center of the subject vehicle M toward the outside.

For example, the HMI control unit 120 highlights the indicator "Eyes Off" indicating that the occupant is not in charge of the surroundings monitoring obligation and the indicator "Hands Off" indicating that the operation of the diving operation element 80 is not required, in a driving support state display area 620-7 of the third screen IM3-7. The HMI control unit 120 displays an image 626 indicating that the monitoring of the surroundings of the subject vehicle M is being performed by the camera 10, the radar device 12, the viewfinder 14, the object recognition device 16, and the outside space recognition unit 321, in the driving support state display area 620-7.

In addition to the same information as the fourth screen IM4-6, the HMI control unit 120 displays the image 610 indicating that the driving support of the third degree is being executed on the fourth screen IM4-7 of the HUD 460.

In a case where the driving support of the third degree is performed, since the occupant is not in charge of the surroundings monitoring, the occupant may newly use equipment installed outside the first angle range Δθ1 such as the third display unit 470 during the automatic driving. Therefore, the HMI control unit 120 performs a control for notifying the occupant of newly usable equipment by an increase of the degree of the driving support.

For example, in a case where the degree of the driving support is switched from the second degree to the third degree by the switching control unit 110, the HMI control unit 120 notifies the occupant that the third display unit 470 is newly usable by controlling the light emitting unit 472 provided in the third display unit 470 to emit light of a predetermined color. Therefore, the occupant may enjoy contents such as a video phone or a television program using the third display unit 470.

In a case where it is necessary to operate the third operation unit 440 for performing a selection or the like of the contents displayed on the third display unit 470, the HMI control unit 120 causes the light emitting unit 446 provided in the third operation unit 440 to emit light of a predetermined color. For example, the HMI control unit 120 causes the light emitting unit 472 and the light emitting unit 446 to emit light of the same color. Therefore, the occupant may intuitively grasp the usable equipment and an operation unit of the usable equipment.

For example, in a case where the third operation unit 440 is operated in a state in which the third display unit 470 is usable, the HMI control unit 120 displays a screen corresponding to operation details on the third display unit 470. In a case where the operation switch 422 of the second operation unit 420 is operated in a state in which the third display unit 470 is usable, the HMI control unit 120 displays an image of the call counterpart on the third display unit 470. Therefore, the occupant may enjoy the call while watching the counterpart displayed on the third display unit 470.

<Scene (6)>

In the scene (6), since the preceding traveling vehicle of a target of the low speed following travel is not present, the switching control unit 110 switches the degree of the driving support from the third degree to the second degree. In this case, as shown in FIG. 23, on the basis of the change of the degree of the driving support, the HMI control unit 120 displays information implying a monitoring target or an operation target of the occupant to the occupant on one or both of the first display unit 450 and the HUD 460 as an image.

Figure 23:
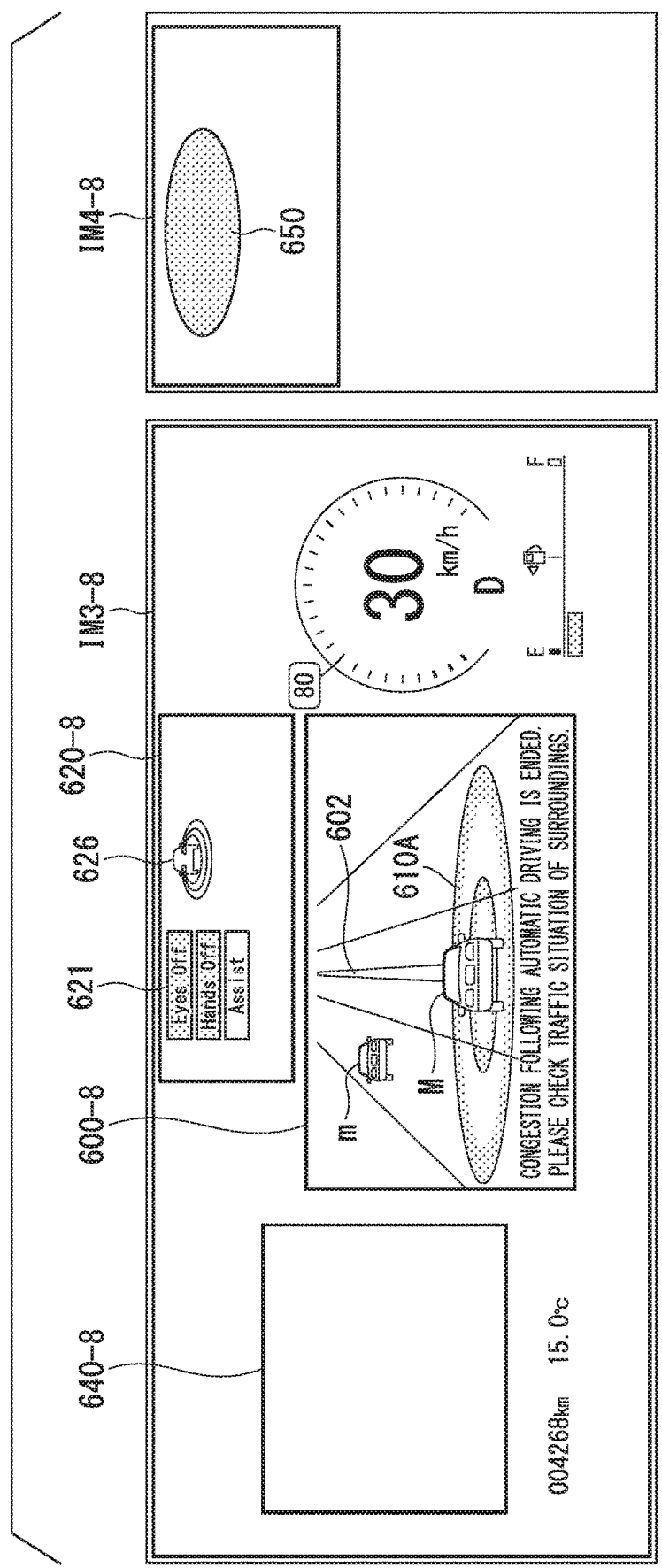
FIG. 23 is a diagram illustrating an example of a third screen and a fourth screen displayed for causing the occupant to perform a surroundings monitoring.

FIG. 23 is a diagram illustrating an example of a third screen IM3-8 and a fourth screen IM4-8 displayed for causing the occupant to perform the surroundings monitoring. The HMI control unit 120 displays information indicating that the low speed following travel (in the drawing, "congestion following automatic driving") is ended and information for causing the occupant to check the traffic situation of the surroundings, in a surroundings detection information display area 600-8.

The HMI control unit 120 displays a front line of sight requirement image 650 for requiring the occupant to line of sight in front of the subject vehicle M on the fourth screen IM4-8. For example, the front line of sight requirement image 650 an elliptical area indicating a predetermined area in front of the vehicle M. The forward line of sight requirement image 650 may have a predetermined shape such as a circle or a quadrangle, or may be information such as a mark or an alphabetic symbol for drawing the attention of an occupant. The HMI control unit 120 may light up the forward line of sight requirement image 650 or flash the forward line of sight requirement image 650 in a predetermined color. The HMI control unit 120 may rush the front line of sight to the occupant by causing the LED incorporated in the instrument panel to light and the light emission of the LED to be reflected in the front windshield.

In a case where the degree of the driving support is switched from the third degree to the second degree by the switching control unit 110, the HMI control unit 120 displays the image corresponding to the driving support of the second degree on the first display unit 450 and the HUD 460.

Figure 24:
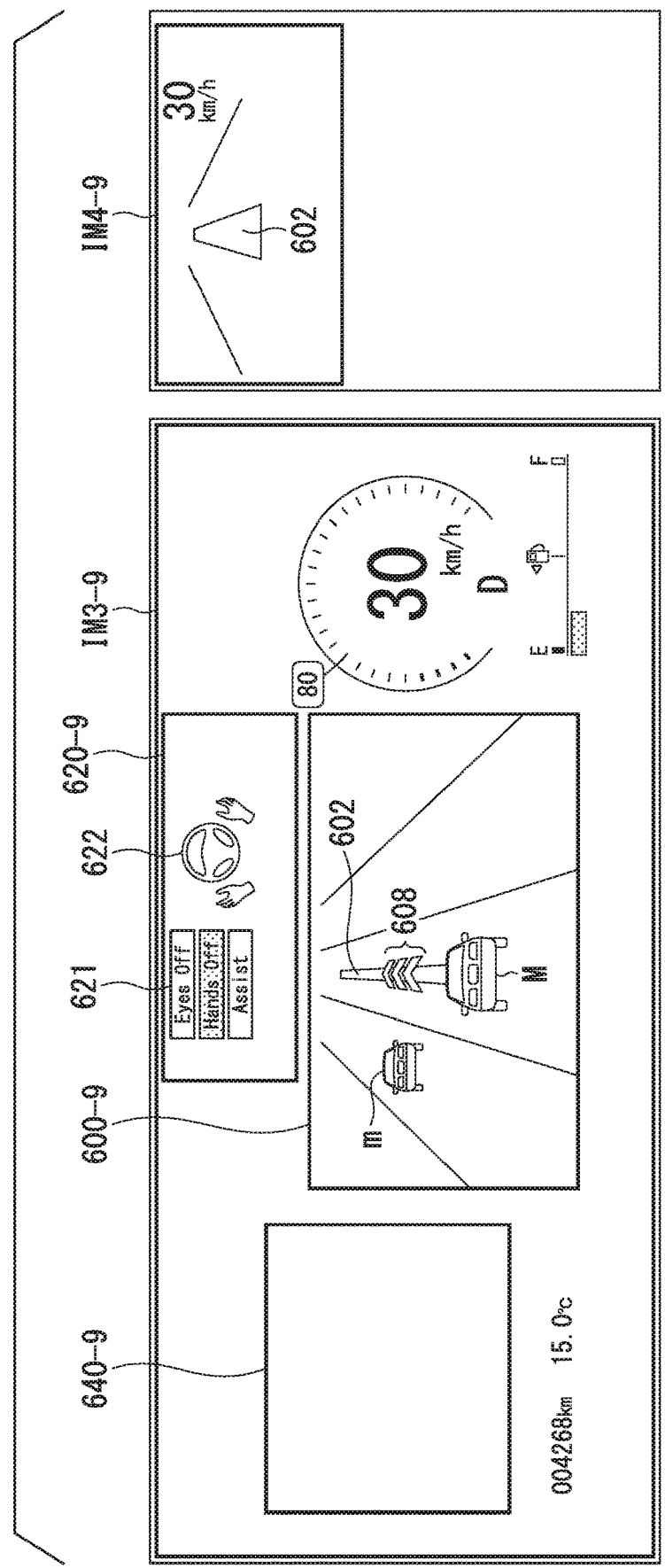
FIG. 24 is a diagram illustrating an example of a third screen and a fourth screen displayed in a case where the driving support is switched from the driving support of the third degree to the driving support of the second degree.

FIG. 24 is a diagram illustrating an example of a third screen IM3-9 and a fourth screen IM4-9 displayed in a case where the driving support is switched from the driving support of the third degree to the driving support of the second degree. In the example of FIG. 24, the acceleration is performed to a target speed (for example, 80 [km/h]) set by the action plan generation unit 323 by the driving support of the second degree. For example, the HMI control unit 120 displays an image 608 indicating that the acceleration control is being executed in a surroundings detection information display area 600-9 of the third screen IM3-9.

The HMI control unit 120 highlights the indicator of "Hands Off" corresponding to the driving support of the second degree in a driving support state display area 620-9 of the third screen IM3-9. The HMI control unit 120 displays the requested action notification image 622 indicating the operation content of the occupant corresponding to the driving support of the second degree in the driving support state display area 620-9. Therefore, the occupant may intuitively grasp that the driving support is switched from the driving support of the third degree to the driving support of the second degree.

<Process Flow Corresponding to Scenes (4) to (6)>

Figure 25:
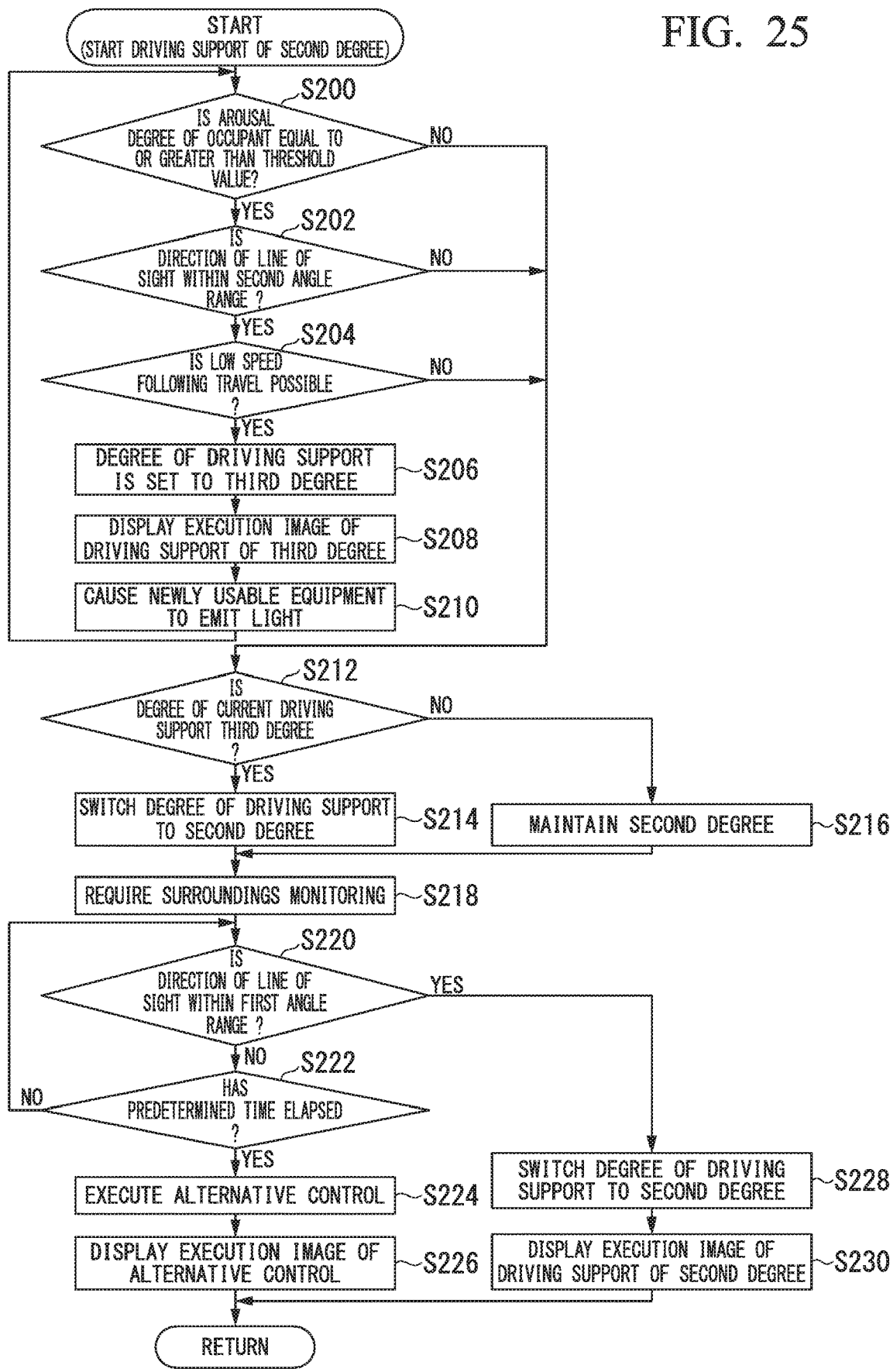
FIG. 25 is a flowchart illustrating an example of a flow of a process executed by the master control unit and an automatic driving control unit in scenes (4) to (6).

FIG. 25 is a flowchart illustrating an example of the flow of a process executed by the master control unit 100 and the automatic driving control unit 300 in the scenes (4) to (6). The process of the present flowchart is executed when the degree of the driving support is switched to the second degree.

First, the occupant state monitoring unit 140 determines whether or not the arousal degree of the occupant who is not in charge of the surroundings monitoring obligation is equal to or greater than the threshold value (step S200). In a case where it is determined that the arousal degree of the occupant is equal to or greater than the threshold value, the occupant state monitoring unit 140 further determines whether or not the direction of the face or the line of sight of the occupant is within the second angle range Δθ2 (step S202). That is, the occupant state monitoring unit 140 determines the separation degree of the current direction of the line of sight or the face of the occupant from the reference direction determined by the calibration process.

In a case where it is determined that the direction of the face or the line of sight of the occupant is within the second angle range Δθ2 by the monitoring determination unit 140B, that is, in a case where the occupant is able to promptly perform surroundings monitoring, the switching control unit 110 determines whether or not the low speed following travel is possible (step S204).

For example, in a case where all of the facts that the preceding traveling vehicle is present, the inter-vehicle distance to the preceding traveling vehicle is equal to or less than a predetermined distance, and the speed of the preceding traveling vehicle is equal to or less than a threshold value are true, the switching control unit 110 determines that the low speed following travel is possible.

In a case where the switching control unit 110 determines that the low speed following travel is possible, the switching control unit 110 sets the degree of the driving support to the third degree (step S206).

Next, the HMI control unit 120 displays the image indicating that the driving support of the third degree is being executed on the third screen IM3 and the fourth screen IM4 (step S208). Next, the HMI control unit 120 causes the light emitting unit corresponding to the newly usable equipment by the switch of the degree of the driving support to the third degree to emit light (step S210).

On the other hand, in a case where the arousal degree of the occupant is not equal or greater than the threshold value, in a case where the arousal degree is not detected, in a case where the direction of the face or the line of sight of the occupant is not within the second angle range Δθ2, in a case where the direction of the face or the line of sight of the occupant is not detected, or in a case where the low speed following travel is not possible, the switching control unit 110 determines whether or not the degree of the current driving support is the third degree (step S212).

In a case where the degree of the current driving support is the third degree, the switching control unit 110 switches the degree of the driving support from the third degree to the second degree (step S214). That is, in a case where the driving support of the third degree is already being performed by the automatic driving control unit 300, the switching control unit 110 stops the driving support of the third degree and starts the driving support of the second degree of which the automation rate is lower than that of the driving support of the third degree.

On the other hand, in a case where the degree of the current driving support is not the third degree but the second degree, the switching control unit 110 maintains the second degree as the degree of the driving support (step S216). That is, the switching control unit 110 causes the automatic driving control unit 300 to continuously execute the driving support of the second degree without starting the driving support of the third degree.

Next, from the degree of the driving support has reached the second degree, the HMI control unit 120 requests the occupant to monitor surroundings (eyes on) using the HMI 400 (step S218).

As a result of the requirement of the surroundings monitoring, the occupant state monitoring unit 140 determines whether or not the direction of the face or the line of sight of the occupant is within the first angle range Δθ1 (step S220). In a case where the direction of the face or the line of sight of the occupant is not within the first angle range 401, the occupant state monitoring unit 140 determines whether or not a predetermined time has elapsed (step S222).

In a case where the direction of the face or the line of sight of the occupant is not within the first angle range Δθ1 until the predetermined time has elapsed, the switching control unit 110 causes the automatic driving control unit 300 to perform alternative control (step S224). At this time, the HMI control unit 120 displays an image indicating that the alternatively control is being executed on the third screen IM3 and the fourth screen IM4 (step S226).

In a case where the direction of the face or the line of sight of the occupant is not within the first angle range Δθ1 until a predetermined time has elapsed, the automatic driving control unit 300 may not perform the alternative control and continue the driving support of the third degree. In this case, the action plan generation unit 323 of the automatic driving control unit 300 determines a target speed when the driving support of the third degree is continued as a speed equal to or lower than a reference speed (that is, a speed equal to or lower than 80 [km/h] or 100 [km/h]) or a speed equal to or lower than the current speed of the subject vehicle M (that is, a speed equal to or lower than 60 [km/h]). Therefore, in a case where the occupant is not in the eyes on state, it is possible to relatively gradually accelerate the subject vehicle M or to cause the subject vehicle M to travel so that the subject vehicle M maintains the current vehicle speed without accelerating the subject vehicle M up to an original speed determined as an upper limit of the driving support of the third degree.

In a case where the direction of the face or the line of sight of the occupant is within the first angle range Δθ1 until the predetermined time has elapsed, the switching control unit 110 switches the degree of the driving support from the third degree to the second degree (step S228). Therefore, the HMI control unit 120 displays the image indicating that the driving support of the second degree is being executed on the third screen IM3 and the fourth screen IM4 (step S230). Therefore, the process of the present flowchart is ended.

In the process of step S202 or the process of step S220 of the flowchart described above, in a case where the object covering the specific portion is detected by the image processing unit 140A, the switching control unit 110 may switch the degree of the current driving support to a degree lower than the degree of the current driving support and prevent the automatic driving control.

Figure 26:
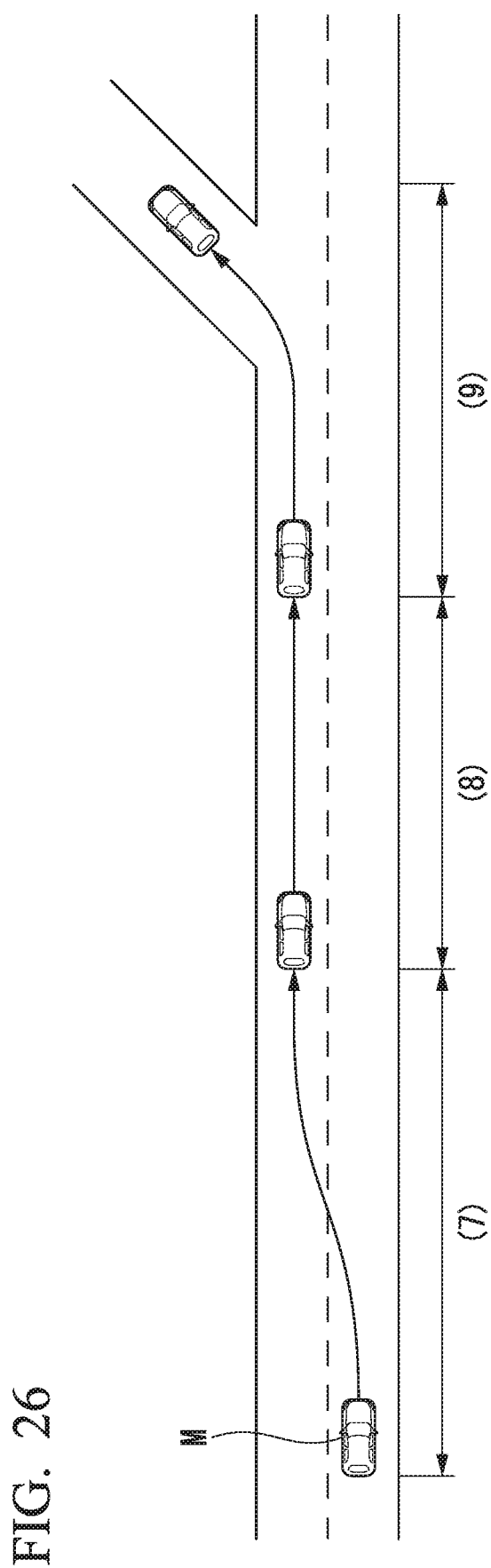
FIG. 26 is a diagram illustrating various scenes in which the switch from the driving support of the second degree to a travel by the manual driving is performed.

Next, scenes (7) to (9) will be described. FIG. 26 is a diagram illustrating various scenes in which the switch from the driving support of the second degree to the travel by the manual driving is performed. In an example of FIG. 26, the scene (7) is a scene in which the subject vehicle M performs the lane change for getting out of the expressway based on the action plan. The scene (8) is a scene in which the subject vehicle M is switched to the manual driving. The scene (9) is a scene in which the subject vehicle M moves from the expressway to the general road by the manual driving. Hereinafter, display controls corresponding to each of the scenes (7) to (9) will be described.

<Scene (7)>

In the scene (7), the automatic driving control unit 300 executes the driving support for the subject vehicle M to perform the land change to the left side. In this case, the HMI control unit 120 displays the image corresponding to the driving support on one or both of the first display unit 450 and the HUD 460. For a display example at the time of the start or execution of the lane change, since the same display is performed by substituting the content of the lane change to the right land of the subject vehicle M shown in FIG. 16 and FIG. 17 with the land change to the left lane, a detailed description thereof will be omitted.

<Scene (8)>

In the scene (8), the automatic driving control unit 300 performs a control for switching the subject vehicle M to the manual driving. In this case, the HMI control unit 120 displays the image for causing the occupant to execute the manual driving on one or both of the first display unit 450 and the HUD 460.

Figure 27:
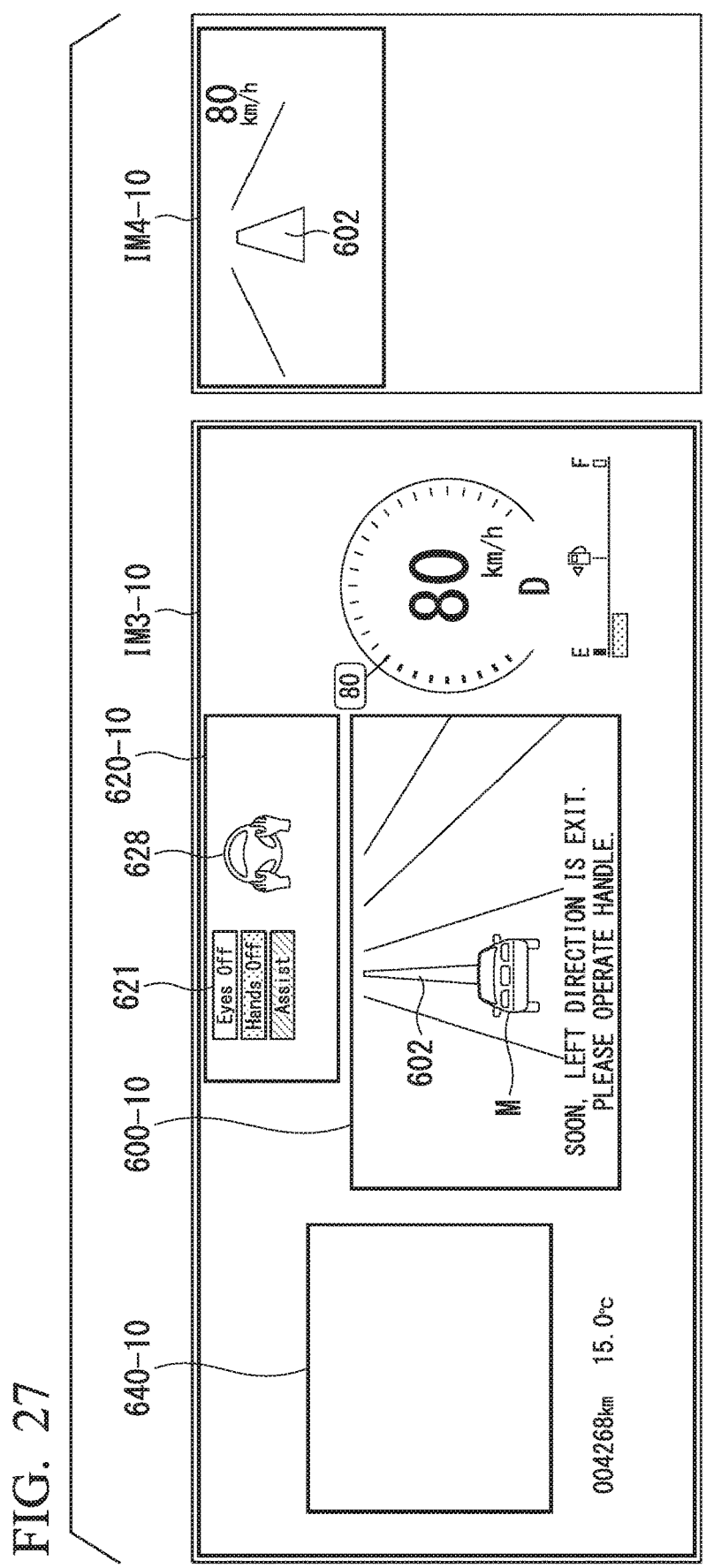
FIG. 27 is a diagram illustrating an example of a third screen and a fourth screen displayed at the time of a requirement for switching the subject vehicle to the manual driving.

FIG. 27 is a diagram illustrating an example of a third screen IM3-10 and a fourth screen IM4-10 displayed at the time of the requirement for switching the subject vehicle to the manual driving. Since an exit of the expressway is approaching, the HMI control unit 120 displays a requested action notification image 628 for requiring the occupant to perform the hands on (causing the operation of the steering wheel 82 to be performed) in a surroundings detection information display area 600-10 of the third screen IM3-10. The HMI control unit 120 may display an animation in which the image indicating the hand of the occupant is approaching to the image indicating the steering wheel 82 as the requested action notification image 628.

The HMI control unit 120 highlights the image of "Hands Off" corresponding to the driving support of the second degree and the image of "Assist" corresponding to the driving support of the first degree in a driving support state display area 620-10 of the third screen IM3-10.

Here, the operation element state determination unit 130 determines whether or not the occupant is in the hands on state. In a case where it is not determined that the occupant is in the hands on state by the operation element state determination unit 130 although a predetermined time has elapsed, the HMI control unit 120 displays an image for causing the occupant to execute the manual driving by intensifying the warning in stages such as an image shown in FIG. 28 on one or both of the first display unit 450 and the HUD 460.

Figure 28:
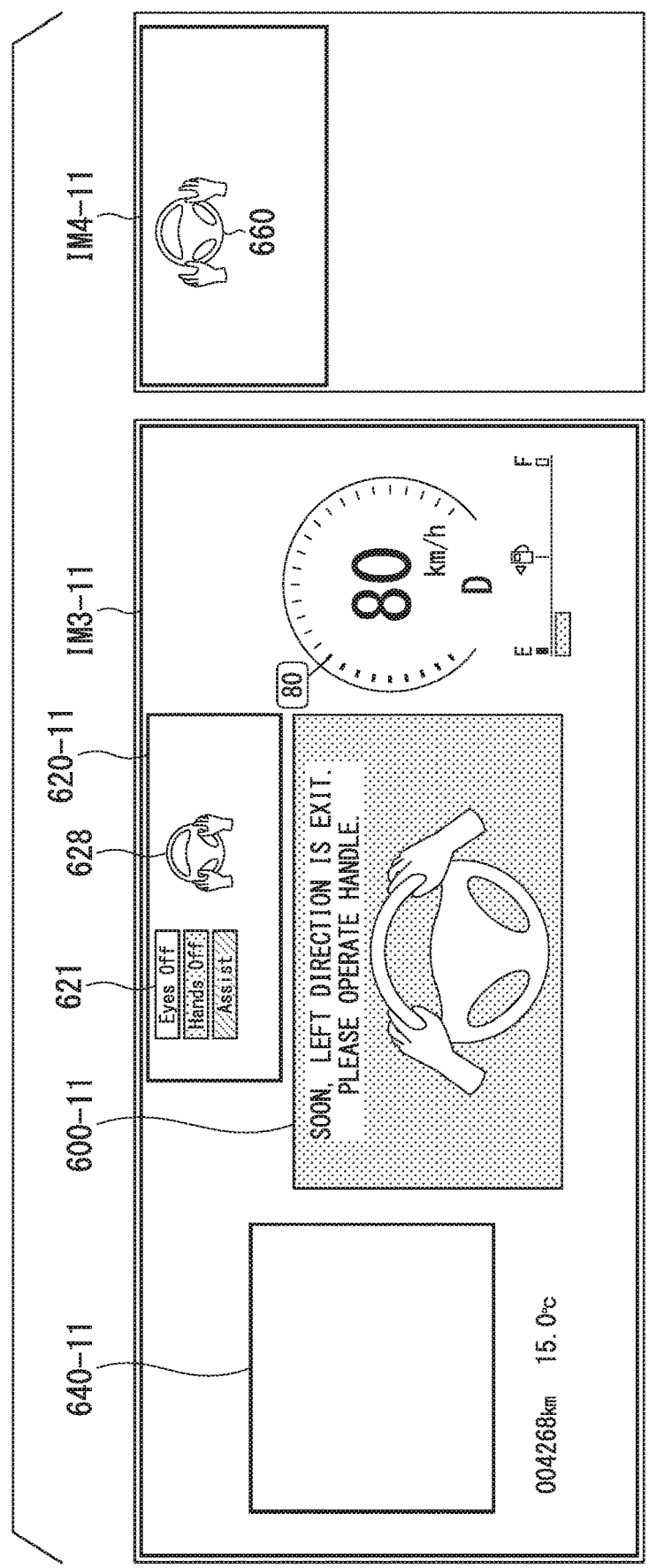
FIG. 28 is a diagram illustrating an example of a third screen and a fourth screen in which a warning is intensified for causing the occupant to execute the manual driving.

FIG. 28 is a diagram illustrating an example of a third screen IM3-11 and a fourth screen IM4-11 in which the warning is intensified for causing the occupant to execute the manual driving. For example, the HMI control unit 120 displays information implying a monitoring target to be monitored by the occupant or an operation target by emphasizing the display of the surroundings situation of the subject vehicle M in a driving support state display area 600-11 of the third screen IM3-11. Specifically, instead of the image indicating the road shape in front of the subject vehicle M, the image indicating the subject vehicle M, and the image indicating the future trajectory of the subject vehicle M, the HMI control unit 120 superimposes and displays information indicating that the occupant operates the steering wheel 82 in the driving support state display area 600-11 of the third screen IM3-11.

The HMI control unit 120 displays a requested action notification image 660 that schematically showing a positional relationship between the steering wheel 82 and the hand of the occupant on the fourth screen IM4-11. The HMI control unit 120 may display an animation in which the image indicating the hand of the occupant approaches and operates the image indicating the steering wheel 82 as the requested action notification image 660. The HMI control unit 120 may issue a warning by a sound or the like to causes the occupant to operate the steering wheel 82.

The HMI control unit 120 causes the light emitting units 430R and 430L provided in the steering wheel 82 to emit light, blink, or stop the light emission so as to cause the occupant to operate the steering wheel 82. Therefore, the occupant may easily recognize the content required to the occupant according to the change of the degree of the driving support.

For example, in a case where the hands on is required to the occupant in a state in which the light emitting units 430R and 430L are caused to emit light and blink according to the degree of the driving support of the subject vehicle M, the HMI control unit 120 causes the light emission state of the light emitting units 430R and 430L to be different from the current light emission state. For example, the HMI control unit 120 causes at least one of the light emission, blinking, a light emission color, and a light emission luminance of the light emitting units 430R and 430L to be different from the current light emission state.

In a case where the degree of the driving support changes to a degree lower than the degree of the current driving support, the HMI control unit 120 causes the light emitting units 430R and 430L to emit light, blink, or stop the light emission. Therefore, it is possible to notify the occupant that the driving support is a driving support in which it is highly necessary to operate the steering wheel 82.

In a case where it is not determined that the occupant is in the hands on state by the operation element state determination unit 130 until the predetermined time has elapsed after requiring the hands on to the occupant, the HMI control unit 120 may cause the speaker to output the sound by intensifying the warning in stages. The HMI control unit 120 may warn the occupant by operating an actuator that vibrates the seat on which the occupant sits or the seat belt to vibrate the seat or the seat belt at a stepwise strength.

Figure 29:
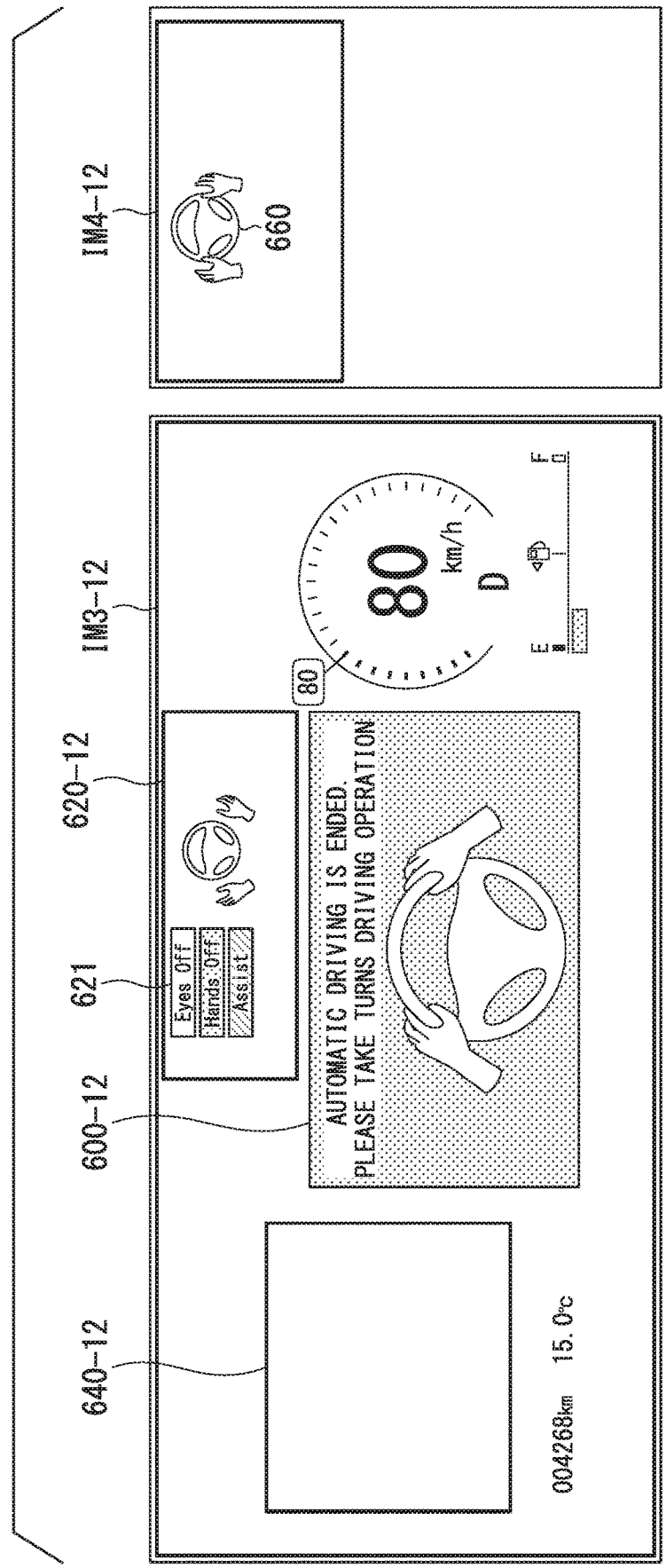
FIG. 29 is a diagram illustrating an example of a third screen and a fourth screen that displays information indicating that an automatic driving is ended.

In a case where it is not determined that the occupant is in the hands on state until the predetermined time has elapsed after displaying the image shown in FIG. 28 by the operation element state determination unit 130, the HMI control unit 120 displays a screen for ending the driving support (the automatic driving control) as shown in FIG. 29.

FIG. 29 is a diagram illustrating an example of a third screen IM3-12 and a fourth screen IM4-12 that display information indicating that the automatic driving is ended. The HMI control unit 120 displays information requiring a take-over so that the information is superimposed on the image indicating the road shape in front of the subject vehicle M, the image indicating the subject vehicle M, and the image indicating the future trajectory of the subject vehicle M, in a driving support state display area 600-12 of the third screen IM3-12. The requirement of the take-over refers to requiring the operation of the driving operation element 80 (including the hands on) to the occupant in order to end the driving support and start the manual driving. The HMI control unit 120 highlights the image of the "Hands Off" in a driving support state display area 620-12 of the third screen IM3-12, however, the HMI control unit 120 may highlight the image of the "Hands Off" in a color or the like different from the highlight display shown in FIG. 28.

On the fourth screen IM4-12, the requested action notification image 660 schematically showing the positional relationship between the screen steering wheel 82 and the hand of the occupant is displayed. For causing the occupant to operate the steering wheel 82, the HMI control unit 120 may issue a warning stronger than the warning by the display on the third screen IM3-12 and the fourth screen IM4-12 shown in FIG. 29.

For example, the HMI control unit 120 may vibrate at least one of the seat and the seat belt by operating the actuator that vibrates the seat or the seat belt at a timing at which the third screen IM3-12 is displayed on the first display unit 450 and the fourth screen IM4-12 is displayed on the HUD 460. In this case, the HMI control unit 120 may operate the actuator so that the vibration is stronger than the vibration when the third screen IM3-11 and the fourth screen IM4-11 are displayed. Therefore, the occupant may intuitively grasp that the automatic driving is ended.

In a case where it is not determined that the occupant is in the hands on state until the predetermined time has elapsed after displaying the screen shown in FIG. 29 by the operation element state determination unit 130, the master control unit 100 causes the automatic driving control unit 300 to execute the alternatively control. In this case, as shown in FIG. 30, the HMI control unit 120 displays a screen indicating that the automatic driving for executing the alternative control is executed.

Figure 30:
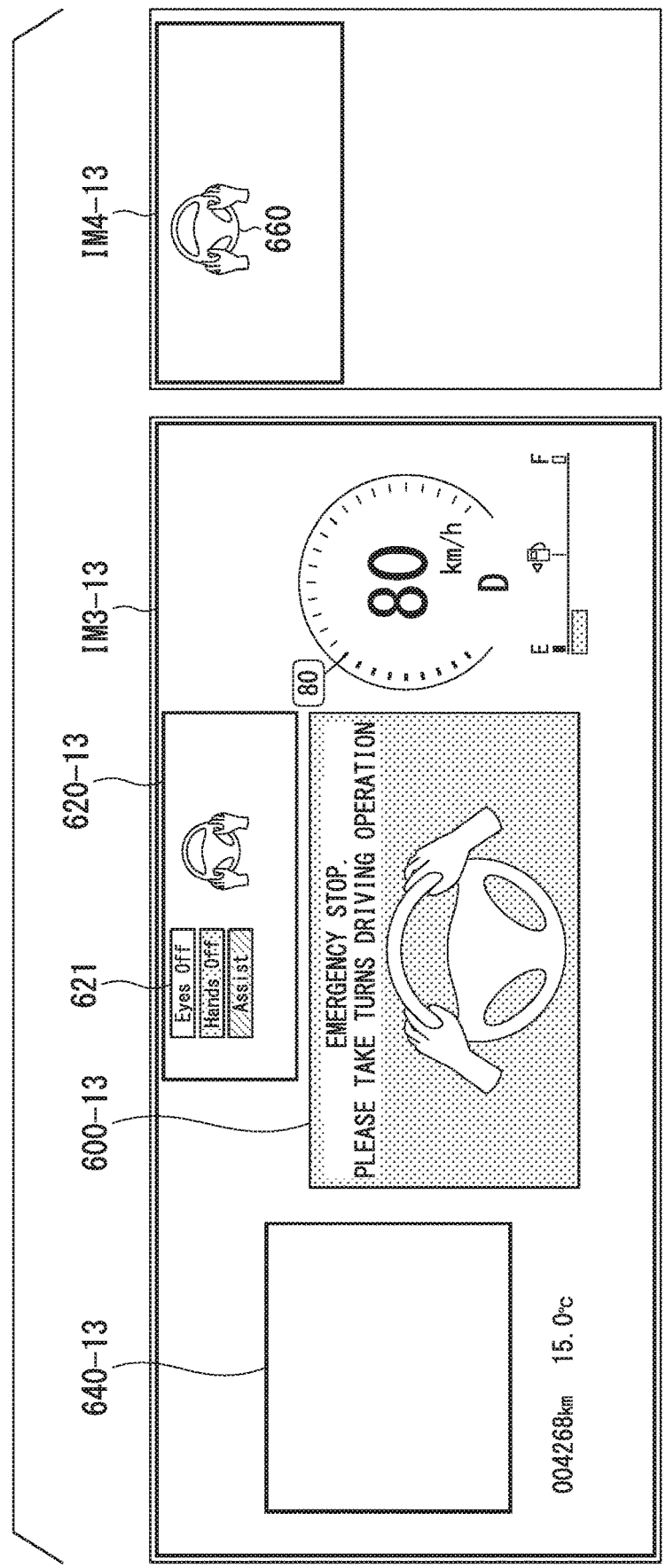
FIG. 30 is a diagram illustrating an example of a third screen and a fourth screen in an alternative control.

FIG. 30 is a diagram illustrating an example of a third screen IM3-13 and a fourth screen IM4-13 in the alternative control. In a driving support state display area 600-13 of the third screen IM3-12, information for stopping the subject vehicle M (in the drawing, "emergency stop, please take turns the driving operation") is displayed as the alternative control.

<Scene (9)>

In the scene (9), the occupant receives an instruction for causing the occupant to operate the steering wheel 82, the occupant operates the steering wheel 82 until the driving support is ended, the manual driving is started, the subject vehicle M enters the general road from the expressway. The switching control unit 110 switches the travel state of the subject vehicle M to a state in which the subject vehicle M is performed by the manual driving of the occupant. The HMI control unit 120 controls the first display unit 450 and the HUD 460 so that the first display unit 450 displays the first screen IM1-1 and the HUD 460 displays the second screen IM2-1.

<Process Flow Corresponding to Scene (7) to (9)>

Figure 31:
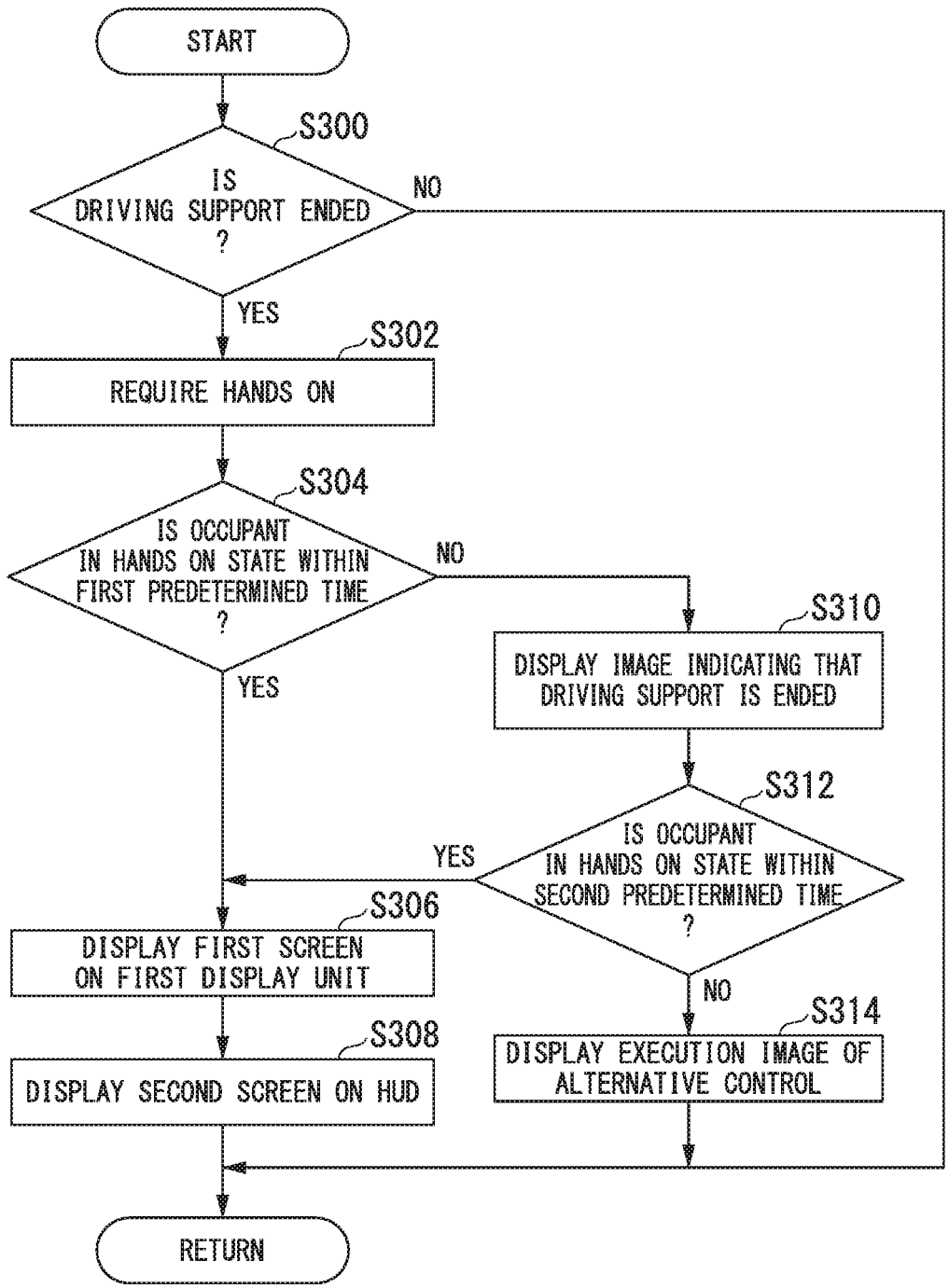
FIG. 31 is a flowchart illustrating an example of a flow of a process executed by a master control unit in scenes (7) to (9).

FIG. 31 is a flowchart illustrating an example of a flow of a process executed by the master control unit 100 in the scenes (7) to (9).

First, the HMI control unit 120 determines whether or not the driving support is ended (step S300) For example, in a case where the automatic switch 414 is operated and the switching control unit 110 switches the subject vehicle from the driving support to the manual driving, the HMI control unit 120 determines that the driving support is ended.

In a case where it is determined that the driving support is ended, the HMI control unit 120 displays the screen for requiring the hands on of the occupant (causing the occupant to grip the steering wheel 82) (step S302). Next, the operation element state determination unit 130 determines whether or not the occupant is in the hands on state within a first predetermined time (step S304).

In a case where it is determined that the occupant is in the hands on state within the first predetermined time by the operation element state determination unit 130, the HMI control unit 120 displays the first screen IM1 on the first display unit 450 (step S306) and displays the second screen IM2 on the HUD 460 (step S308).

On the other hand, in the process of step S304, in a case where it is not determined that the occupant is in the hands on state within the first predetermined time by the operation element state determination unit 130, the HMI control unit 120 displays the image indicating that the driving support is ended on the first display unit 450 (step S310).

Next, the operation element state determination unit 130 determines whether or not the occupant is in the hands on state within a second predetermined time (step S312). In a case where it is determined that the occupant is in the hands on state within the second predetermined time by the operation element state determination unit 130, the HMI control unit 120 performs the process of step S306 described above.

On the other hand, in the process of step S304, in a case where it is not determined that the occupant is in the hands on state within the second predetermined time by the operation element state determination unit 130, the HMI control unit 120 displays the image indicating that the alternative control is executed on the first display unit 450 (step S314). Therefore, the process of the present flowchart is ended.

<Switching Timing of Various Pieces of Equipment or Control Related to Driving Support>

Hereinafter, the switching timing of the various pieces of equipment or the control related to the driving support of the subject vehicle M will be described with reference to the drawings. FIG. 32 is a diagram illustrating the switching timing of the various pieces of equipment or the control related to the driving support.

In FIG. 32, as the switch related to the driving support, the switching timings with respect to (A) on/off of the main switch 412, (B) on/off of the automatic switch 414, (C) on/off of a manual driving display, (D) on/off a driving support mode display, (E) on/off of the driving support of the first degree, (F) gripping/non-gripping the steering wheel 82, (G) on/off of the driving support of the second degree, (H) on/off of the driving support of the third degree, and (I) the elapse of time of necessity/non-necessity of the driving monitoring of the occupant are shown.

At time T0, the subject vehicle M is traveling by the manual driving of the occupant. In this case, the main switch 412 and the automatic switch 414 are not operated, and the screens (the first screen IM1 and the second screen IM2) of the manual driving are displayed on the first display unit 450 and the HUD 460. At time T0, since any degree of the driving support is not implemented, the occupant necessarily operates the steering wheel 82 and performs the surroundings monitoring.

At time T1, an operation of turning on the main switch 412 is being executed by the occupant. In this case, the screens (the third screen IM3 and the fourth screen IM4) of the driving support mode are displayed on the first display unit 450 and the HUD 460. Until the times T1 and T2, the travel control by the driving support is not performed and the manual driving is being continued.

At time T2, an operation of turning on the automatic switch 414 is being executed by the occupant. In this case, the switching control unit 110 of the master control unit 100 switches the degree of the driving support to the first degree. In this way, the driving support control unit 200 executes the driving support of the first degree. Therefore, the HMI control unit 120 displays the image indicating that the driving support of the second degree is executed by the occupant separating the hand of the occupant from the steering wheel 82 in a driving support mode display.

At time T3, the occupant is separating the hand from the steering wheel 82 in a state in which the driving support of the second degree is possible by the subject vehicle M. In this case, the switching control unit 110 switches the degree of the driving support from the first degree to the second degree. Therefore, the driving support control unit 200 stops the driving support control and the new automatic driving control unit 300 starts the driving support of the second degree (that is, the automatic driving control).

At time T4, for example, a start condition of the low speed following travel is satisfied and the switching control unit 110 switches the degree of the driving support to the third degree. Therefore, the automatic driving control unit 300 starts the low speed following travel as the driving support control of the third degree. Thus, the surroundings monitoring of the occupant is not required.

At time T5, the driving support of the third degree is ended and the driving support is switched to the driving support of the second degree. Therefore, the occupant is in charge of the surroundings monitoring. At the time T5, a display for switching the subject vehicle M from the driving support of the second degree to the manual driving is performed. In this case, in the driving support mode display, the HMI control unit 120 displays the information for causing the occupant to operate the steering wheel 82.

At time T6, the occupant is in the hands on state in which the occupant operates the steering wheel 82. In this case, the switching control unit 110 switches the degree of the driving support from the second degree to the first degree. Therefore, the automatic driving control unit 300 stops the driving support of the second degree and the driving support control unit 200 starts the driving support of the first degree. At this time, the switching control unit 110 may switch the subject vehicle M to the manual driving after a predetermined time has elapsed since the driving support of the first degree.

At time T7, the subject vehicle M is switched to the manual driving. In this case, the main switch 412 and the automatic switch 414 are switched to the off state, for example, at the timing at which the subject vehicle M is switched to the manual driving.

According to the embodiments described above, the occupant state monitoring unit 140 that detects the direction of the face or the line of sight of the occupant of the subject vehicle M, the automatic driving control unit 300 that executes the automatic driving control, and the switching control unit 110 that switches the driving support causing the automatic driving control unit 300 to execute the automatic driving control to one of the plurality of driving supports including the driving support of the second degree and the driving support of the third degree are provided. The switching control unit 110 prevents the automatic driving control executed by the automatic driving control unit 300 on the basis of the detection result of the direction of the face or the line of sight of the occupant. Therefore, the switching control unit 110 is able to execute the automatic driving of the appropriate control mode according to the state of the occupant.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control system comprising:
   at least one camera configured to capture an image of a face of an occupant of a subject vehicle; and
   at least one processor configured to execute a program to:
   detect a direction of the face or a line of sight of the occupant based on the image;
   execute automatic driving control that automatically controls travelling of the subject vehicle; and
   switch an automatic driving mode to execute an automatic driving control to one of a plurality of automatic driving modes including a first automatic driving mode in which predetermined tasks are required of the occupant or a predetermined automation rate is provided and a second automatic driving mode in which a degree of tasks required of the occupant is lower than a degree of predetermined tasks in the first automatic driving mode or an automation rate is higher than the predetermined automation rate of the first automatic driving mode,
   wherein the at least one processor performs predetermined image processing on the image and extracts a feature of the occupant from the image;
   wherein the at least one processor performs a calibration process as the plume and every process of the predetermined image and prevents the automatic driving control executed from a start of the calibration process to an end of the calibration process, and
   wherein the at least one processor prevents the automatic driving control being executed based on a detection result of the direction.

2. The vehicle control system of claim 1,
   wherein the at least one processor performs one of a process of stopping automatic driving control that is already being executed, a process of prohibiting execution of automatic driving control from now on, or a process of reducing the automation rate of automatic driving control, for the prevention of automatic driving control.

3. The vehicle control system of claim 1,
   wherein the at least one processor detects an arousal degree indicating a degree of an arousal of the occupant based on the image;
   wherein, in a case where the automatic driving mode is the first automatic driving mode, the at least one processor prevents the automatic driving control executed under the first automatic driving mode in a case where the direction of a face or a line of sight of an occupant is not within a predetermined angle range or in a case where the direction of the face or the line of sight of the occupant is not detected, and in a case where the automatic driving mode is the second automatic driving mode, the at least one processor prevents the automatic driving control executed under the second automatic driving mode in a case where the arousal degree of the occupant detected by the second detector is equal to or greater than a threshold value or in a case where the arousal degree of the occupant is not detected.

4. The vehicle control system of claim 3, wherein the at least one processor extracts a feature of the occupant from the image, and wherein the at least one processor detects the direction of the face or the line of sight of the occupant based on the feature extracted from the image and detects a degree of opening of the eyelids of the occupant as the arousal degree.

5. A vehicle control method for a computer, comprising a processor, mounted in a vehicle including at least one camera configured to capture an image of a face of an occupant of the vehicle, the vehicle control method comprising:

detecting, by the processor, a direction of the face or a line of sight of the occupant based on the image;

executing, by the processor, automatic driving control that automatically controls travelling of the subject vehicle;

switching, by the processor, an automatic driving mode for executing automatic driving control to one of a plurality of automatic driving modes including a first automatic driving mode in which predetermined tasks are required of the occupant or a predetermined automation rate is provided and a second automatic driving mode in which a degree of tasks required of the occupant is lower than a degree of predetermined tasks in the first automatic driving mode or an automation rate is higher than a predetermined automation rate of the first automatic driving mode;

performing, by the processor, predetermined image processing on the image and extracting a feature of the occupant from the image;

performing, by the processor, a calibration process as the preliminary process of the predetermined image;

preventing, by the processor, the automatic driving control executed from a start of the calibration process to an end of the calibration process; and preventing, by the processor, the automatic driving control under the second automatic driving mode based on a detection result of the direction.

6. A computer-readable non-transitory storage medium storing a vehicle control program for causing a computer, comprising a processor, mounted in a vehicle including at least one camera configured to capture an image of a face of an occupant of the vehicle to execute:

detecting a direction of the face or a line of sight of the occupant based on the image;

executing automatic driving control that automatically controls travelling of the subject vehicle;

switching an automatic driving mode for executing automatic driving control to one of a plurality of automatic driving modes including a first automatic driving mode in which predetermined tasks are required of the occupant or a predetermined automation rate is provided and a second automatic driving mode in which a degree of tasks required of the occupant is lower than a degree of predetermined tasks in the first automatic driving mode or an automation rate is higher than a predetermined automation rate of the first automatic driving mode;

performing predetermined image processing on the image and extracting a feature of the occupant from the image;

performing a calibration process as the preliminary process of the predetermined image;

preventing the automatic driving control executed from a start of the calibration process to an end of the calibration process; and preventing the automatic driving control under the second automatic driving mode based on a detection result of the direction.

7. A vehicle control system, comprising:

at least one camera configured to capture an image of a face of an occupant of a subject vehicle; and at least one processor configured to execute a program to:

detect a direction of the face or a line of sight of the occupant based on the image;

execute automatic driving control that automatically controls traveling of the subject vehicle: and switching an automatic drive mode to execute an automatic driving control to one of a plurality of automatic driving modes including a first automatic driving mode in which predetermined tasks are required of the occupant or a predetermined automation rate is provided and a second automatic driving mode in which a degree of tasks required of the occupant is lower than a degree of predetermined tasks in the first automatic driving mode or an automation rate is higher than the predetermined automation rate of the first automatic driving mode, wherein the at least one processor performs predetermined image processing on an image captured by the camera and extracts a feature of the occupant from the image, wherein the at least one processor to detects an object covering a specific portion of the face of the occupant in the image based on the extracted feature, and wherein the at least one processor prevents the automatic driving control in a case where the object covering the specific portion of the face of the occupant is detected.

8. The vehicle control system of claim 7, wherein the at least one processor extracts a feature of the occupant from the image and prevents the automatic driving control executed from a start of a calibration process as a preliminary process of the predetermined image processing to an end of the calibration process.

9. The vehicle control system of claim 7, wherein the at least one processor performs one of a process of stopping automatic driving control that is already being executed, a process of prohibiting execution of automatic driving control from now on, or a process of reducing the automation rate of automatic driving control, for the prevention of automatic driving control.

10. The vehicle control system of claim 7, wherein the at least one processor extracts a feature of the occupant from the image, and wherein the at least one processor detects the direction of the face or the line of sight of the occupant based on the feature extracted from the image and detects a degree of opening of eyelids of the occupant as an arousal degree.

* * * * *